US008751339B2

(12) United States Patent
Pinkava

(10) Patent No.: US 8,751,339 B2
(45) Date of Patent: Jun. 10, 2014

(54) METHOD OF ACCESSING EXACT OTC ISDA TYPE OVERNIGHT INDEXED SWAP EXPOSURES WITHIN AN ELECTRONIC FUTURES EXCHANGE ENVIRONMENT

(75) Inventor: Pavel Pinkava, Clapham (GB)

(73) Assignee: Liffe Administration and Management, London (GB)

( * ) Notice: Subject to any disclaimer, the term of this patent is extended or adjusted under 35 U.S.C. 154(b) by 2372 days.

(21) Appl. No.: 11/179,382

(22) Filed: Jul. 12, 2005

(65) Prior Publication Data

US 2006/0224492 A1 Oct. 5, 2006

Related U.S. Application Data

(60) Provisional application No. 60/667,878, filed on Apr. 1, 2005.

(51) Int. Cl.
*G06Q 40/00* (2012.01)
*G06Q 40/04* (2012.01)
*G06Q 40/06* (2012.01)

(52) U.S. Cl.
CPC ............... *G06Q 40/00* (2013.01); *G06Q 40/06* (2013.01); *G06Q 40/04* (2013.01)
USPC ............................. 705/35; 705/36 R; 705/37

(58) Field of Classification Search
CPC ........ G06Q 40/04; G06Q 40/08; G06Q 40/00
USPC ............................................ 705/36 R, 35–37
See application file for complete search history.

(56) References Cited

U.S. PATENT DOCUMENTS

| 4,674,044 A * | 6/1987 | Kalmus et al. ............ 705/37 |
| 4,903,201 A * | 2/1990 | Wagner ..................... 705/37 |
| 5,802,499 A * | 9/1998 | Sampson et al. .......... 705/35 |
| 5,873,071 A * | 2/1999 | Ferstenberg et al. ..... 705/36 R |
| 6,144,947 A * | 11/2000 | Schwartz ................. 705/36 R |
| 6,274,000 B1 * | 8/2001 | Koivukunnas et al. ... 162/193 |
| 6,304,858 B1 * | 10/2001 | Mosler et al. ............ 705/37 |
| 6,421,653 B1 * | 7/2002 | May ....................... 705/36 R |
| 6,876,982 B1 * | 4/2005 | Lancaster ................ 705/37 |
| 7,149,720 B2 * | 12/2006 | Shepherd ................. 705/37 |
| 7,225,153 B2 * | 5/2007 | Lange ..................... 705/37 |
| 7,310,616 B2 * | 12/2007 | Sugahara ................. 705/37 |
| 2001/0049649 A1 * | 12/2001 | Baecker et al. .......... 705/37 |
| 2002/0010670 A1 * | 1/2002 | Mosler et al. ............ 705/37 |
| 2002/0099641 A1 * | 7/2002 | Mills et al. .............. 705/37 |
| 2002/0103744 A1 * | 8/2002 | Llewelyn ................. 705/37 |
| 2002/0116317 A1 * | 8/2002 | May ....................... 705/37 |
| 2002/0161693 A1 * | 10/2002 | Greenwald ............... 705/37 |
| 2003/0093356 A1 * | 5/2003 | Kaufman ................. 705/37 |
| 2004/0030638 A1 * | 2/2004 | Dwin ...................... 705/38 |
| 2004/0064391 A1 * | 4/2004 | Lange ..................... 705/36 |
| 2004/0143535 A1 * | 7/2004 | Hirani et al. ............ 705/37 |
| 2004/0143536 A1 * | 7/2004 | Haberle ................... 705/37 |
| 2005/0080734 A1 * | 4/2005 | Lynch et al. ............. 705/40 |
| 2005/0114255 A1 * | 5/2005 | Shields et al. ........... 705/37 |
| 2006/0080208 A1 * | 4/2006 | Harrison ................. 705/37 |

* cited by examiner

*Primary Examiner* — Ryan D Donlon
(74) *Attorney, Agent, or Firm* — Leydig, Voit & Mayer, Ltd.

(57) ABSTRACT

A set of linked methods allows one to access derivative products (other than traditional futures and options) within an electronic futures exchange. In an embodiment of the invention, exchange members are given access to exact OTC ISDA type interest rate swap and FRA related exposures. Another In another embodiment, exchange members are given access to exact OTC ISDA type overnight index swap related exposures. In a further embodiment, exchange members are given convenient access to credit spread and\or interest rate swap embodiments via deliverable credit rate linked and swap rate linked bond-like futures.

5 Claims, 22 Drawing Sheets

| 3-Oct-05 | Spot Bid/Ask | Dec-05 Fwd | Mar-06 Fwd | Sep-06 Fwd | Mar-07 Fwd | Etc. |
|---|---|---|---|---|---|---|
| Dec-05 | 15.50 | 16.00 | | | | |
| Mar-06 | 17.50 | 18.00 | 18.75 | 20.25 | | | |
| Sep-06 | 22.50 | 22.75 | 24.25 | 25.00 | 26.50 | 27.75 | |
| Mar-07 | 28.25 | 28.75 | 30.25 | 31.25 | 32.75 | 38.75 | 41.00 | 42.25 | 45.00 | Etc. |
| Sep-07 | 32.25 | 32.50 | 34.00 | 34.75 | 36.50 | 40.25 | 41.25 | 42.25 | 45.00 | Etc. |
| Mar-08 | 32.50 | 33.00 | 34.00 | 34.75 | 35.75 | 39.00 | 38.75 | 40.00 | 40.00 | Etc. |
| Sep-08 | 31.25 | 31.50 | 32.25 | 32.75 | 33.50 | 36.00 | 35.25 | 36.00 | 34.75 | Etc. |
| Mar-09 | 31.50 | 31.75 | 32.50 | 33.00 | 33.50 | 35.75 | 34.75 | 35.50 | 34.50 | Etc. |
| Sep-09 | 33.25 | 33.50 | 34.00 | 34.75 | 35.25 | 37.00 | 36.50 | 37.25 | 35.75 | Etc. |
| Mar-10 | 35.00 | 35.25 | 35.75 | 36.25 | 36.75 | 38.50 | 38.25 | 39.00 | 38.75 | Etc. |
| Sep-10 | 36.50 | 36.75 | 37.25 | 37.75 | 38.25 | 40.00 | 39.75 | 40.25 | 40.50 | Etc. |

METHOD OF ACCESSING EXACT OTC ISDA TYPE OVERNIGHT INDEXED SWAP EXPOSURES WITHIN AN ELECTRONIC FUTURES EXCHANGE ENVIRONMENT

CROSS-REFERENCE TO RELATED APPLICATION

This patent application is related to and claims benefit of U.S. Provisional Patent Application No. 60/667,878 filed Apr. 1, 2005, entitled "Trading and Settling System" which is incorporated herein in its entirety by reference for all that it teaches without any exclusion.

FIELD OF THE INVENTIONS

This invention relates to a set of linked methods, system upgrades, computer program products and financial product designs for enabling trading and settling of new product types on what where hitherto only futures exchanges and their clearing houses.

More particularly, the present invention relates to a method, a system, and a computer program product for trading and settling:—exchange traded credit derivatives, exchange traded interest rate swaps, exchange traded money market derivatives plus other exchange traded structured derivative contracts and also equivalents of more traditional non-derivative debt products e.g. deposits etc

BACKGROUND TO THE INVENTION

Broad Context of the Invention

The Evolving Landscape for Financial Risk

This section comments on the advantages of financial futures exchanges put inside the context of the evolving landscape for financial risk. The financial risk content relies heavily on extracts from a speech by Malcolm Knight, the General Manager of the Bank for International Settlements (BIS). The BIS is an international organisation which fosters international monetary and financial cooperation and serves as a bank for central banks:

The financial system has undergone a profound transformation over the past three decades, driven by the combined impact of liberalisation and technological innovation. This in turn has driven a significant transformation in the nature of financial risk. The industry has gained enormously in richness, depth and variety. The large number of new derivative financial instruments that have developed, partly in the wake of breakthroughs in pricing theory and advances in computing technologies, attest to this transformation.

The size of the financial sphere of developed economies has increased tremendously along different dimensions but above all in terms of turnover. It is well known that monthly global turnover in the main asset classes far exceeds yearly global GDP. Within financial services, traded instruments have greatly outgrown traditional non-traded ones, such as loans or deposits. On the one hand, we have witnessed a broadening of the range of players engaged in the same type of financial activity. And on the other hand, the surge in cross-border activity has heightened the role of non-residents in domestic markets in many countries.

In line with growth in turnover, the management of financial risk has become a more important aspect of economic activity. This also means that problems in the financial system, if and when they emerge, can have larger consequences for the real economy than they did in the past. The message has been hammered home by the costs of the financial crises that have occurred in both industrial and emerging market countries over the past two decades. Not surprisingly, addressing financial instability has become a major policy concern, both nationally and internationally.

By contrast over the same period the appearance of financial futures and options exchanges have been welcomed by policy makers and regulators. These trading venues have the virtue of transparency and relative simplicity. They have also shown extreme robustness to stress for example during the Barings bank collapse. Unfortunately the growth of new derivative financial instruments both in terms of variety and turnover has mostly happened away from exchanges in the so called Over The Counter (OTC) market.

Unfortunately in this modern environment, financial risk has become more complex. In the OTC market derivative instruments that originally targeted market risk resulted, as a by-product, in a pyramiding of counterparty risk that required separate management. This opaque layering of direct and indirect links through the markets also profoundly complicates the assessment of the true underlying risks. By contrast counterparty risk issues do not arise on financial futures and options exchanges.

The old analysis of risk that was structured around traditional business lines has become increasingly irrelevant. In other words, the similarities in underlying risks are becoming more apparent, regardless of the type of financial firm incurring them. The ongoing consolidation in the financial sector is partly driven by the realisation that these similarities can lead to cost saving synergies. In the resulting large financial firms, a common capital base underpins on-balance sheet intermediation, capital market services and market-making functions. Globally, the smaller number of very large internationally active financial institutions has created potential concentration risks for the financial system. This is because losses in one activity can put pressure on the entire firm, affecting its activities in other areas. More fundamentally, what is sometimes referred to as the "endogenous" component of risk could be triggered by a large bank failure. This is the component that reflects the impact of the collective actions of market participants on the ultimate drivers of risk themselves i.e. the herd effect. The layering and pyramiding of counterparty risk in the OTC derivative market adds to these concerns.

Value Add of the Invention and Basle II

Financial futures and options exchanges contain a small but significant fraction of the liquidity of modern financial markets. These derivatives are superbly designed to manage their users' market risks efficiently and indeed to largely eliminate systematic operational and counterparty credit risks. However the exchanges' product ranges have historically been highly constrained to only futures and options. They have therefore remained at the periphery of the profound transformation of the financial system described in the previous section.

The purpose of the invention is to facilitate the overthrow of the traditional model and move derivatives exchanges firmly into the mainstream. Such a move away from the conventional OTC market, would rapidly achieve the goals of policy makers such as Malcolm Knight. This in turn should be good for economic growth and prosperity as generally speaking more efficient financial markets lead to a more efficient real economy. The invention should be particularly applicable to emerging market economies where both counterparty credit risk and operational issues have held back the development of efficient financial markets.

Several objectives that at present appear remote dreams of policy makers can come closer to reality by harnessing the infrastructure of a futures and options exchange for broader purposes. For example:—

The general principle that similar risks should be measured and managed in a similar way across a firm, irrespective of their location, would largely and automatically be met. This is because an increasing number of positions would be held at the same exchange venue and therefore risk margined consistently; and also The long-term ideal of a fully integrated treatment of risk, based on a common metric, would inevitably be met for the same reasons; and also The condition of a financial firm with regard to its risk profile, would become easier to identify. This is because with all positions held and risk margined at the same exchange venue the leveraged value at risk (i.e. initial margin) would become objectively measurable for each firm; and indeed The treatment of the endogenous component of risk could be revolutionalised, with improvements in both systematic risk measurement and systematic risk management made possible for policy makers.

On the last point it is conceivable that if a dominant central advanced derivatives exchange emerged in each developed economy, then policy makers could gain control of some drivers of the endogenous component of risk. With sufficient academic research some equivalents of reserve requirements and reserve policy could be created but applied to the initial margin held at the exchange's central counterparty rather than to bank lending. These hypothetical reserve requirements (or "hair cut" rates) would be the equivalent of creating an intelligent dynamic element in the capital adequacy framework. Policy makers could for the first time manipulate the markets' risk appetites directly by raising or lowering the official hair cut rate(s) counter-cyclically. Such an advanced policy would empower the natural incentive of market participants to instil self discipline indirectly and efficiently, especially when dealer performance is evaluated and rewarded using risk-adjusted returns.

Whilst the invention has potential to go a very long way towards meeting the needs of policy makers and regulators in the longer term, they have until now adopted their own approach.

On 26th Jun. 2004 central bank governors and the heads of bank supervisory authorities in the Group of Ten (G10) countries met and endorsed the publication of the "International Convergence of Capital Measurement and Capital Standards: a Revised Framework", the new capital adequacy framework commonly known as Basel II. The meeting took place at the Bank for International Settlements in Basel, Switzerland, one day after the Basel Committee on Banking Supervision, the author of the text, approved its submission to the governors and supervisors for review.

Nearly all jurisdictions with active banking markets require banking organisations to maintain at least a minimum level of capital. Capital serves as a foundation for a bank's future growth and as a cushion against its unexpected losses. Excessively low levels of capital increase the risk of bank failures which, in turn, may put depositors' funds at risk. If on the other hand capital levels are too high, banks may not be able to make the most efficient use of their resources, which may constrain their ability to make credit available and hence hurt the economy.

The Basel II Framework builds on the first Basel Accord which in 1988 created the basic structure for setting capital requirements. It is more reflective of the underlying risks in banking hence improving the capital framework's sensitivity to the risks that banks actually face and providing stronger incentives for improved risk management. These improvements will be achieved in part by aligning capital requirements more closely to the risk of credit loss and by introducing a new capital charge for exposures to the risk of loss caused by operational failures.

The credit risk is the larger part of the Basle II capital charge, and requires a lot of work to sort out. Getting credit risk wrong can be costly for banks, but over the longer term, getting operational risk wrong can be costlier. In either case there will be stronger incentives for trading on organised markets with central clearing than ever before. This can only be good for the uptake of the invention.

A Brief on Financial Markets Before Derivatives

Before financial derivatives existed 'the financial markets' could be defined as the general term covering the separate markets in the debt, foreign exchange and equity traded asset classes. Since the advent of financial derivatives trading this picture has been both split into new asset classes (e.g. implied volatility, credit etc) and blurred by the growth of cross asset products (e.g. forex swaps, convertible bonds etc). In order to understand derivatives fully one most first have a good working knowledge of their underlying (so called 'cash' markets) and this is the purpose of this background section.

The Basic Concept of Interest

The current invention is mostly concerned with derivatives of the debt markets only. Raising debt (i.e. getting new money) is important. Having money is an advantage as it can be used to buy goods and services. Alternatively consumption can be deferred and the money invested in a business either by buying shares or more directly. In either case investing in a business always carries some considerable risk but with the hope of receiving a risk proportionate positive return on the investment. Taken as an average over the whole economy but depending on prevailing conditions such equity investments will tend to grow.

Forgoing both consumption and investment in a business is thus a significant opportunity cost. Lenders of money to others should therefore be compensated. Traditionally this is done by payment of interest on such loans as well as the eventual repayment of principle. The interest charged will differ depending on the currency (hence economy) of issuance and also on the term of the loan.

Borrowing and lending is clearly at the very heart of the financial system. The level of interest is clearly important to the fair treatment of creditors but making interest payments and the return of principal is fundamental. The risk of default being triggered will vary with the borrower's circumstances. The consequences of default depend on the seniority, the legal structure and collateralisation or otherwise of the debt. The debt markets can be broken down according to these and other criteria. Nonetheless the simple rule is that a borrower perceived to have a higher risk will have to pay lenders higher interest to attract their funds.

Negotiable Securities

There are many ways to raise money differing in interest type charged, source of finds, principal repayment schedule etc. Another significant difference is that between loan agreements (usual bilateral contracts) and negotiable securities. In the former case the lending party or parties will probably not change during the life of the loan. Negotiable securities can also be referred to as "financial paper" as they are documents (or merely registry entries) indicating creditor-ship in the case of debt securities or ownership in the case of equities.

By contrast to loans debt securities are specifically designed to encourage the easy transfer of title. The existence of a secondary market make both the borrower to creditor relationship and the risks to lenders different for securities. In addition the accounting and tax treatment may not be the same for loan agreements and debt securities. The appropriate interest rate required in each market may therefore differ significantly.

Credit Ratings

A credit rating agency is a firm that provides its opinion on the creditworthiness of an entity and the debt securities issued by an entity. Several well established agencies exist to assign credit ratings and often find managers will be barred from purchasing securities from issuers below a certain rating. Issuers will pay the agencies to rate their company or specific issues. The rating scales are different for short term and longer term debt and different ratings may apply depending on who the legal borrower is e.g. parent or subsidiary.

When an issuer's credit rating deteriorates the price of its debt securities can fall substantially in the secondary market. A worsening perception among investors and the risk of downgrades form part of the credit risk of a security. An investor can thus still be exposed to credit risk even if the security he holds does not default.

Different fund managers will be subject to different rules thereby segmenting the investor community. Important sectors are investment grade and sub-investment grade (junk) bonds in each major currency. For example, a credit rating agency may assign a "triple A" credit rating as its top "investment grade" rating for corporate bonds and a "double B" credit rating or below for "non-investment grade" or "high-yield" corporate bonds. A foreign company's credit rating will typically not exceed that of it's government.

Interest rates are to a large extent determined by supply and demand factors and these may differ from one investor community to another. Thus in times of crisis emerging market bond price drops can be correlated across the world despite no obvious link between the particular national economies concerned. In emerging markets effective default can occur if the local currency is devalued thereby making any bonds denominated in that currency worth much less to outside investors. This kind of credit risk is called country risk.

One final point worth noting is that during total bankruptcy shares and bond prices will obviously become correlated by both tending to zero (ignoring recovery valuations of debt etc). By extension lower rated credits will have bonds correlating with their issuers' stock prices even if there is only a probability of bankruptcy. As a result bear (bull) stock market moves tend to be associated with widening (narrowing) credit spreads.

Money Markets and Capital Markets

Another important way to categorise interest rate products is according to their final repayment date, known as their maturity:—

Debt instruments with less than one year (or occasionally two years) to go before maturity are part of the so called "short term" or "money markets"; but Debt instruments with more than one year to go before maturity are part of the so called capital markets.

The distinction is partly due to the different purposes for which loans are typically required. The money markets are a major source (and sink) of funds for cashflow management i.e. corporate treasury operations. By contrast the primary capital markets are usually used for raising money required for investment in a company's business plans and include equities as well as debt. A debt security issued into the money markets is generally known as a "bill" whilst a debt security issued into the capital markets is often referred to as a "note" or "bond".

An additional distinction between money markets and capital markets is the role of the central banks. Central banks actively manage and seek to dominate supply and demand in the short term rate environment of their respective currencies. They do so in an attempt to control economic activity. The bond markets on the other hand are freer to find their own level occasionally frustrating central bank short rate moves by shifting in the opposite direction.

Annualised Interest and Day Count Conventions

For ease of comparison between instruments of different maturity the percentage by which an investor's money will grow in a single year is often quoted. This is known as the interest rate. Where an instrument has less than one year to go before maturity the percentage growth until maturity is "annualised" upward. For example if an investor is quoted 4% per annum when placing funds on deposit in the interbank market for 3 months that gives a total return of approximately 1% as there are actually 12 months in a year.

An alternative to quoting annualised interest rates which measure total return of initial money lent is quoting the discount rates on total money due to be paid at maturity. The latter are conventionally used for certain money market securities. Thus a 3 month T-bill trading at 99.00% of face value at maturity is discounted by 1% of face and hence has a discount rate of approximately 4% per annum as there are actually 12 months in a year.

The exact annualised rate depends on the day counting conventions used in the relevant market. The US interbank deposit market for example uses an "Actual/360" day count convention which means that a 4.00% interest rate for a 3 months period that turned out to actually be 92 days when counted, gives a total return of $4\% * 92/360 = \sim 1.022\%$. In the financial markets transactions tend to be so large that a little bit of confusion can cause disagreements to arise over substantial amounts of money hence the importance of day count conventions. In the above example an investor depositing $100 million would earn twenty two thousand dollars more than would be expected by just counting three months as ¼ of a year. Getting it right is clearly worth worrying about. Of course there are various different day count conventions in the many different markets. They are important but are no harder to understand than the example above.

Money Market Debt Instruments and the Money Market Convention

Amongst securities "T-bills" are of the best credit quality possible and are issued by the treasury department. Other significant money market securities include the "commercial paper" issued by large companies especially banks. "Certificates of deposit" which give the holder a right to money already deposited at a bank at whatever interest rate was negotiated at the time of issue also exist. "Bills of exchange" and "bank accepted bills of exchange (bankers acceptances)" are used for the financing of commerce in commodities or manufactures products and are also transferable especially the acceptances as they are guaranteed by a bank.

In the loan markets, interbank deposits ("depos") and repurchase agreements ("repos") are standardised and very liquid. As well there being no doubts surrounding day count convention interbank liquidity resides at certain predetermined points on the maturity curve. Overnight (O/N) lending supplies funds for today to be repaid on the next business day (T+1), thus overnight will earn at least three days of interests every Friday and more if Monday is not a business day. "Tomorrow-next" or "tom-next" (T/N) is simply the next business day's overnight but traded today. Historically money took time to transfer so all lending terms are calculated relative not to the trade date but to the so-called spot date which is simply trade date plus two business days (T+2).

Typically the interbank market will only quote active two way markets at maturities of a whole number of weeks, months or years i.e. spot plus 1 week, spot plus 2 weeks, spot plus 3 weeks, spot plus 1 months, spot plus 2 months, spot plus 3 months, spot plus 4 months, spot plus 5 months, spot plus 6 months, spot plus 7 months, spot plus 8 months, spot plus 9 months, spot plus 10 months, spot plus 11 months, spot plus 1 year etc. There is an accepted and rigidly defined market standard called the money market convention for these so called on-the-run points, which depend on the currency traded (because of national holidays):—

Business days—A working day in the principal financial centre of the currency (i.e. New York for US Dollars). In the case of Euro-Currencies it must also be a working day in London (e.g. a Euro-Dollar business day must be a business day both in New York and in London). Business days for € are any days when the TARGET system is running.

Spot date—Two business days after trade date.

N-week date—Is N*7 days after the spot date but if this is not a business day the next business day after that.

N-month/years date—Is the same calendar day in the month or the nearest to it as the spot date but N months or years afterwards (e.g. If spot is 31st March then 1-month later is 30th April). If this is not a business day the next business day after that applies unless this takes us into the wrong (i.e. next) month in which case it's the previous business day that applies As we shall see the money market convention is also used for certain derivatives.

Longer Term Debt Instruments and Yield

There are many medium and long term debt securities including government notes and bonds, promissory notes, corporate bonds, floating rate bonds etc. Because T-notes and T-bonds carry no credit risk they are by far the most liquid longer term debt instruments.

Where an instrument has more than one year to go before maturity the relevant annualised interest rate is not easy to compute. Clearly day count conventions will still come into play but there are other complications. Most longer dated debt will pay fixed interest at regular intervals either annually, semi-annually or even monthly not just at maturity. An intermediate payment for a bond or note is called a coupon payment.

If they were all traded separately the coupons and the principal repayments could each have a uniquely defined discount rate or interest rate associated with them just as money market securities do. Such zero coupon bonds do indeed exist and are traded in the market. The relevant formula for calculating the annual rate of return will be slightly more complex than for bills to take account of compounding i.e. a notional annual reinvestment.

Clearly as the secondary market price of the whole bond varies the return on investment will vary too even though it may be hard to compute. Crucially the rate at which the coupons may be reinvested in the future is unknown beforehand. Consider the case of investors expecting a rising reinvestment rate in the near future as an example. In such circumstances a higher coupon bond will become preferable as the sooner the funds are available the sooner they may be reinvested.

A conventional solution uses the same rate to calculate reinvestment as the return on investment that is itself being calculated. The relevant calculation is non trivial but can be applied to a bond's market price without reference to any other data, such as reinvestment rates implied by other instruments in the market. The single assumed return and reinvestment rate when correctly annualised becomes known as the yield to maturity. The conventional yield in a particular market will depend on the day counts used etc.

Convexity in the Price Versus Yield Relationship

The advantage of yield is that it gives a quick idea of value for money. Bond prices will differ simply because of factors like maturity and coupon rate. Yet in general the higher the yield of one bond relative to another the better the relative value offered by that bond, when all else is equal. Of course yields can be legitimately higher on a bond due to it's higher risks e.g. lower credit rating etc. The coupon effect alluded to previously should not however be neglected in that if two bonds have the same yield and maturity the higher coupon one may be preferred in a rising rate environment. Conversely the lower coupon one can have a slightly higher yield and still not offer best value.

Although yield is non-trivial to calculate it is nonetheless a straightforward indicator of value for money. Better value in the context of the secondary market will of course mean cheaper so it is hardly surprising that a price against yield graph for a single bond will show its price dropping as yield goes up. However since holding the bond represents rights to positive cashflows on future coupon payment dates and at maturity, the bond's price can never go negative however high its yield goes. This means that the bond price will drop off more and more slowly as yield goes up and this effect is referred to as "positive convexity".

Yield is such a useful concept that traders will often appear more interested in it than price especially when switching from one bond into another i.e. selling a previous holding to buy a new one. However traders will never lose sight of price because that is what their profits and losses are measured in.

Clean Price and Accrued Interest

As stated previously most notes and bonds will pay interest at regular intervals typically annually or semi-annually. In either case from time to time coupon payments will actually be made. Clearly the value of a bond will drop the moment it becomes traded in the secondary market without the coupon attached (known as going "ex-div"). This means that even at a constant yield the price of a bond will show cyclical variations in price with a kind of 'saw-tooth' pattern.

These oscillations over time in the price of the bond tend to cloud the simple relationship between the yield and the quoted price at any one time. The situation is made more manageable by a market convention that has been created to make them less prominent. Dealers in the market place do not quote the full price when trading in price terms but instead quote a so-called "clean price". In this framework the full price is known as the "dirty price" and the clean price is the dirty price less "accrued interest" which is defined below.

Each day the front coupon should earn the bond holder interest so when the bond is traded in the secondary market the buyer must compensate the previous holder for the fraction of the next coupon payment that is rightfully theirs. This fraction is known as the accrued interest and is proportional to the number of days that have passed since the previous coupon payment date. Accrued interest must be calculated using the relevant day count convention. Since accrued interest is taken into account the graph of clean price at a constant yield does not show the 'saw-tooth' pattern of dirty price. Where the bond goes ex-div several days before the notional coupon payment or is newly issued with a long first coupon period it may trade with negative accrued interest.

The Yield Curve and Credit Spreads

One of the most fundamental concepts of interest rate products is the yield curve. This is sometimes grandly referred to as the term structure of interest rates but in reality it is a simple graph of yield against maturity for many different issues of equal credit class. To be meaningful the yields must all be quoted under the same convention and at the same time (since the curve moves). Coupon effect, tax and liquidity differences notwithstanding the points will form an obvious curve.

There are higher curves for lower quality credits corresponding to the higher yields that investors demand. The spreads between the different credit curves are closely traded entities in their own right. The risk associated with a particular borrower is conventionally expressed in terms of credit spreads over benchmark (i.e. government bond yields or interbank swap rates) in both the primary and secondary markets. Another way to express risk is typically in terms of credit ratings and these will therefore have prevailing credit spreads associated with them for each type (sector) of issuer. Issuer type is important as credit ratings give the risk of default but not the expected recovery rates which are part of the overall risk and hence credit spread.

However it is spread trading along each credit that maintains the curve structure. Consider for example supply and demand imbalances making a particular T-note's yield higher than it's neighbours. If the T-note becomes cheaper in this way traders will most probably sell the neighbouring T-notes to buy this cheaper one. They will therefore drive the prices of the neighbouring notes lower and that of the cheapened note itself higher. In this way the original anomaly in the yield curve is quickly smoothed out. Because the curve maintains its integrity as it moves interest rate products can be highly correlated across maturities, not just across credit quality and currencies as discussed previously.

The yield curve is important to traders because money can be made from predicting the shape changes it undergoes and indeed by borrowing and lending at different maturities. It is important to note that rates may move but with no change in shape of the yield curve. This parallel shift up or down in the curve is a neutral assumption that is often applied by traders when setting up their curve related strategies.

Structured Products and Special Purpose Vehicles

Collateralised Debt Obligations (CDOs) are investments collateralised by or referenced to a diverse portfolio of debt rather than other assets (e.g. rents etc).

Asset backed securities including CDOs are generally issued by Special Purpose Vehicles (SPVs) or entities set up to allow for the transfer of risk from the originator to an entity that is generally thinly capitalised, bankruptcy-remote and isolated from any credit risk associated with the originator. To limit the universe of an SPV's potential creditors, it is usually a newly established entity, with no operating history that could give rise to prior liabilities. The SPV's business purpose and activities are limited to only those necessary to effect the particular transaction for which the SPV has been established (for example, issuing its securities and purchasing and holding its assets), thereby reducing the likelihood of the SPV incurring post-closing liabilities that are in addition or unrelated to those anticipated by rating agencies and investors.

The costs of the infrastructure and services associated with the establishment and management of SPVs are part of the context of this invention.

CDOs are designed so that investors can directly benefit from the diversification inherent in the underlying portfolio. This underlying collateral pool is repackaged so that they have the choice of buying junior, mezzanine, senior and super senior segments etc. The exact tiering depends on the deal but typically tranches are defined by two percentage face value numbers—The lower number known as the attachment point defines the minimum losses to which the investor is exposed while the higher number known as the detachment point defines the maximum losses. An alternative method of tranching is achieved by defining tranches in terms of the defaulting entity i.e. the first to default, second to default tranches etc.

CDO tranches are invariably rated in order to make them saleable to funds whose rules demand only credit rated assets of certain quality are purchased i.e. the majority of traditional funds. As tranches are exposed to portfolio losses above and below certain thresholds, each tranche must carry an attractive coupon relative to its credit ratings or investors will not buy it. Issuers therefore work closely with credit rating agencies to "ramp-up" the value of each tranche relative to the risk it carries i.e. to package the diversification benefits as attractively as possible.

In summary buying into a CDO can give investors exposure to a well-diversified range of credits, industries, geographical regions or structures that they may have been unable to access independently. An additional attraction of the market for collateralised instruments is that they generally provide investors with exposure to an asset with low correlation to other securities such as vanilla bonds and equities. Indeed it has been argued that the equity tranches of certain CDOs should warrant consideration as an alternative asset class (alongside investments such as hedge funds and private equity) for pension funds to consider. However the principal attraction for investors has been and will continue to be the greater yield CDOs offer compared to corporate issues with similar credit ratings.

MORE DETAILED CONTEXT OF THE INVENTION

Definition of Derivatives

A derivatives contract can be defined as an agreement between two counterparties in which rights and obligations are set up whose economic value, either by direct reference to a benchmark price quote or by operation of the contract in its delivery phase, can be derived from one or more underlying (often called 'cash') products. Typically the exposure obtained by entering into a derivatives contract creates the equivalent of a highly leveraged position in the cash underlying so that traders can gain or lose large amounts of money without putting up large amounts of actual capital i.e. without being fully funded.

Derivatives on other derivatives can also exist in which case the underlying is often still called the cash in the appropriate context. Despite the high leverage typical of derivatives there exist certain low risk trading strategies which involve taking derivative positions and their underlying cash positions together. The strategies can and are employed to lock in even relatively small pricing anomalies between these related markets whenever they arise. Such trading strategies are known as arbitrages and are often quite mathematically complex in nature. This is particularly true for the financial derivatives markets with which the present invention is mostly concerned.

Financial derivatives therefore have a well deserved reputation for complexity as far as arbitrage fair pricing and hence position risk management theory is concerned. In practice however the theoretical complexity is relatively easy to manage using affordable desktop software applications which take the strain. This allows dealers who rely on such pricing models and so called trading tools to operate with the same degree of confidence as others dealers do in less theoretically demanding markets.

In any case not all aspects of financial derivatives can be labelled as complex since for example their legal structure, the protocols of transacting business and the product designs themselves are often easy to understand, relatively straight forward and indeed highly standardised even where they are slightly intricate. The present invention is largely concerned with this simpler infrastructural side of the business.

Liquidity and the Purpose of Derivatives

Although they are hard to understand fully nonetheless the activities of arbitrageurs play a very significant part in overall market activity. This is because their strategies ensure there is a close link between the value of derivatives and the market price of their underlying cash. Trading a derivative thus becomes a viable alternative to using the related cash market at least for exposure management purposes as opposed to inventory management purposes. Furthermore the capital efficiency of derivatives resulting from leverage means that real money cashflow concerns can be set aside from exposure requirements in these markets. This in turn means that base liquidity is less constrained and as a result is often higher in derivative markets than in the underlying cash.

In a competitive open market increased liquidity will typically appear as tighter average bid to offer price spreads. The lower bid/ask spread represents a reduced cost of doing business to exposure managers as they enter and exit their trading positions. Thus increased liquidity in derivatives markets make them attractive to traders on cost grounds alone regardless of what real money constraints (if any) they may have.

Consider for example a trader who wishes to temporarily exit a long cash position (i.e. they have previously bought the underlying). The trader may fear a drop in the market price of this cash asset but knows he will eventually need to re-establish the long position for inventory purposes. Such a trader can chose to bear the full cash market exit and re-entry costs if they so wish. Alternatively they can go to the more liquid associated derivatives market and take a new short position whose profit during the expected drop in the market price will fully offset any losses on the cash because its value is so closely related to it. The trader may then when the time is right return to the derivatives market buying back the short and as a result will have churned his position more cheaply yet with the same results. Such activity is known as hedging and a key raison d'être of most derivatives markets.

As well as those hedgers who wish to lay off risk the derivatives markets also attract so called scalpers or market makers who seek to benefit from the bid/ask spread in the knowledge that liquidity is usually so good they can exit quickly if the market moves against them. Liquidity thus breeds liquidity in a virtuous circle as risk is transferred around many market participants.

The History and Trading Microstructure of Futures Exchanges

The earliest derivatives were listed on commodity exchanges as so called futures contracts. These were used by farmers to secure their selling price far in advance of harvest (thus ensuring their annual profitability) but were also used by the food production processing, manufacturing, marketing and retailing industries to secure their buying price for their future inventory needs. In addition to arbitrageurs the leverage available also attracted specialist scalpers and speculators called local traders with no actual inventory to shift but whose presence at the exchanges further added to liquidity.

To access the liquidity pool in such exchange traded futures products required either for dealers to be exchange members themselves or for them to be customers of members acting as so called futures brokers. As well as restricting who could execute business, exchanges also set the trading rules and policed them to create high profile reputable markets. During the predefined trading hours for each market an orderly centralised continuous and competitive public auction known as open outcry was maintained under these trading rules. Open outcry as the name implies involves verbal bids and offers being made face to face in the trading rings or pits. To facilitate customer order flow phone booths lined the arena around the pits. In open outcry verbal bids, offers and trades were supplemented by hand signals in the pits themselves and the same signals were used for communication between booth brokers and pit brokers. Open outcry was made even more efficient by participants wearing jackets colour coded to their job role or brokerage firm. Pit dealers would also sport large badges etched with their individual trader mnemonic (a three or four letter code) and exchange member ID. In most commodity types there was never more than one contract expiry available to trade per calendar month, thus each month could be allocated a unique single letter code.

In open outcry after a trade was agreed and checked each counterparty in the pit would fill in an order ticket with their own half of the trade details i.e. bought or sold, price, number of lots, futures expiry month code and counterparty trader mnemonic. These so called filled orders would be handed from the pit to so called runners who would process the paperwork in order that matched trades could be efficiently registered with the exchange.

Much later in their history certain US based commodity exchanges began listing financial derivatives that were designed in analogy to commodity futures. These products quickly became extremely successful and effectively transformed their hosts into financial futures and options exchanges. To try and emulate these successes in foreign financial centres around the world entirely new financial futures and options exchanges have been set up since the early 1980s. Some of these newer exchanges were however established using electronic order matching rather than open outcry. It was argued at the time that the lack of locals was detrimental to liquidity. Though it was not immediately obvious it has since become clear that independent scalpers can trade just as effectively from offices in an electronic market however. History has since shown that it is the electronic financial futures and options exchanges that deliver the greater liquidity and so have a competitive advantage over the more traditional open outcry model.

In recent years open outcry has been largely or completely supplanted by electronic order matching even at the oldest exchanges. Despite this prior to the present invention the superior power of computer based matching over human infrastructure to deliver new types of products has remained unrecognised and unharnessed. Indeed modern electronic derivative exchanges without exception have limited themselves to listing financial futures and options that could just as well be (and in many cases historically once were) traded via open outcry.

The International Swaps and Derivatives Association (ISDA)

Formation of ISDA

Bilaterally negotiated derivative contracts between banks and their larger customers or indeed other banks also began to appear in the early 1980s. This was partly as a result of the futures exchanges' lack of ability to innovate in order to fully meet the exact needs of hedgers and speculators because they were at the time still constrained by their traditional human infrastructure.

Initially each bilateral deal took a lot of organisation to set up and complete with every bank having its own slightly different legal documentation. Yet by the mid 1980s genuine bid ask inter dealer markets had emerged in some key financial products. These became commonly referred to as the Over The Counter or OTC markets to distinguish them from exchange traded financial futures and options. Paradoxically perhaps a significant part of the early growth of OTC derivatives can be attributed to the ability of banks to hedge their private financial derivative exposures on futures and options exchanges.

In 1985 as a result of the increased frequency of bilaterally negotiated derivative trading a group of banks set up the International Swaps and Derivatives Association (ISDA) as a global trade organisation. Since its inception ISDA has tried to streamline and efficiently reorganise the microstructure of the OTC market by for example reducing dealer legal overheads and by attempting to address their back office (i.e. trade confirmation and post trade management) overheads too.

Legal Structure

A schematic representation of the legal structure of a single ISDA based derivatives trading relationship is shown in FIG. 1. Since OTC derivatives are leveraged any legal or other operational failings can result in substantial losses. Therefore among ISDA's most notable accomplishments was the development of its Master Agreement (see item 106 of FIG. 1) and the publishing of a wide range of related documentation materials and instruments covering a variety of transaction types (see item 108 of FIG. 1). Note however the clumsy way that each new trade has to be confirmed by appending a trade confirmation contract to the ISDA master agreement (see items 110, 112 and 114 of FIG. 1). Note also that there must be at least one master agreement between any pair of counterparties (see items 100 and 102 of FIG. 1). ISDA therefore failed to address in a meaningful way the scalability of trade confirmation and new counterparty workload even as it addressed the legal robustness of each instance of the contracts concerned.

To address the markets present failings on legal scalability ISDA has long argued in favour of electronic straight through processing (STP). It is also fair to say that ISDA has pioneered efforts to identify and reduce all the sources of risk in the derivatives and risk management businesses of its members. After ISDA's formation and the legal streamlining of the OTC derivatives markets the interest rate swaps markets grew exponentially for a decade and came to dominate exchange traded financial futures and options in terms of notional turnover.

Counterparty Credit Risk and its Reduction

Although individual OTC counterparties would revalue their positions on a daily basis yet still all of the gains or losses associated with a position were originally exchanged only at some future predefined payment dates. This introduced a very significant level of 'counterparty credit' risk as market moves caused unrealised gains or losses to build up ahead of the date of ultimate payment. Hence even before trading potential counterparties each had to consider if the other would be capable of paying what might become very substantial sums by the deferred date. The high degree of potential credit risk requires prudent firms to expend resources investigating each other's financial conditions in order that they set credit lines and limits for each potential counterparty.

Enormous investments in credit screening were thus required by the early 1990s. Regulators and central banks were at this time often voicing concerns over the impenetrable jungle of bilateral counterparty credit exposures within the financial system as a result of OTC derivatives growth. Given the growth in the importance of its markets, ISDA responded by taking a lead in promoting the understanding and treatment of derivatives and risk management from both public policy and regulatory capital perspectives. ISDA also further developed its documentation and by the mid 1990s ISDA had introduced optional but legally enforceable netting and collateral arrangements into its documentation structure (see item 104 of FIG. 1). There has been a substantial uptake of these optional arrangements ever since.

Operational Risk

The promotion of the risk-reducing effects of netting and collateral has remained at the heart of ISDA's activities since they were first introduced. By contrast straight-through processing for both interest-rate derivatives and particularly credit derivatives remains even today a vision rather than an achievement. Indeed new post trade utilities, such as the DTCC Matching Service, Swapswire and SwapsClear, and other services are also trying to promote efficiency in the OTC derivatives market to some extent independently of ISDA.

In 2002 ISDA responded to these trends by focussing again on STP. It did this by absorbing the hitherto independent trade organisation responsible for the development of FpML (Financial products Markup Language) into ISDA's organisational structure. Ultimately FpML which is now used by all the new post trade utilities just mentioned should allow for the total electronic integration and operational streamlining of the entire industry. As by design the FpML format is flexible enough to accommodate all possible ISDA based derivative trade descriptions, direct communication across the full range of OTC trade services from electronic trading and confirmations to portfolio specification for risk analysis (yet regardless of the specific software or hardware infrastructure supporting these transaction related activities) will finally become possible.

One weakness of FpML in practice is that it is more flexible than is needed for most transaction purposes. The flexibility to accommodate all possible ISDA based derivative trade descriptions whilst useful in principle is of practical benefit only when all of a bank's systems have been upgraded to this standard. Indeed only when all other banks have also fully installed FpML can the dream of a seamless operational infrastructure across the industry become a reality. It is of course expensive to implement FpML across even a single bank's entire range of trading systems and such a spend is hard to justify when the existing systems are already adequate for their tasks and there is no guarantee that all other banks have made equally strong investments in FpML.

In December 2003 the ISDA strategy paper entitled 'Going Forward: A Strategic Plan' announced that a unified approach to directing investment by industry participants and service providers in developing new services was needed. This paper was followed by another one in March 2004 entitled 'The Implementation Plan' which highlighted specific considerations for implementing the goals set out in the Strategic Plan. The ISDA Operations Committee has thus created a blueprint for the operational evolution of the OTC derivatives industry and launched an aggressive schedule for achieving improvements in processing.

The ISDA Operations Committee has conceded that over 80% of ISDA based transactions are highly standardised so the schedule for processing improvements is starting with these most 'plain vanilla' products. It remains to be seen if this latest ISDA initiative will yield benefits to all market participants as quickly as it hopes.

ISDA Today

Today ISDA is at its zenith covering all asset classes from 'traditional' derivatives on interest rates, currencies, equities and even commodities through to relatively new derivatives on energy and credit. The OTC markets have grown very substantially from their beginnings in the 1980s mostly as a result of the increasing participation in and acceptance of ISDA based derivatives by all sectors of the trading community. Another key factor has of course been the more general availability of computer based derivative valuation tools but nonetheless it is fair to say the financial markets have been transformed as a result of ISDA. Indeed more often than not today's cash markets are being driven by supply and demand changes in derivatives rather than the other way around.

The Modern Futures Exchange Explained

Legal Structure

FIG. 2 shows a schematic representation of the legal structure of exchange based derivatives trading. It is clearly more intricate than FIG. 1 but crucially is far more scalable especially for smaller clients.

Brokerage agreements (see items 208 and 210 of FIG. 2) give customers (see items 202 and 204 of FIG. 2) access to exchange (see item 200 of FIG. 2) via members (see items 220 and 222 of FIG. 2) acting as their main futures broker and executing trades on their behalf (see item 218 of FIG. 2). Such 'clearing' members must therefore be members of both the futures exchange and its clearing house (see item 230 of FIG. 2). This is achieved via exchange membership agreements (see items 214 and 216 of FIG. 2) and clearing membership agreements (see items 224 and 226 of FIG. 2) respectively. Members acting as brokers are required to collect margins calls from customers and to enforce the rules of the clearing house as regards maintenance of sufficient margins in customer accounts. Clients funds are protected because funds held in fulfilment of margin rules and requirements must be kept separate from, or segregated from, the member firms' own funds.

Not shown on the diagram are so called non clearing exchange members because to access the market such members need a relationship with a clearing member in any case. They thus appear similar to clients. Shown separately in FIG. 3 is the process permitted by exchange rules and systems that allows a customer (see item 300 of FIG. 3) to use several different brokers. One broker may be used for execution of trades (see item 304 of FIG. 3) but another broker may be used for clearing (see item 306 of FIG. 3). The assigned filled orders are transferred from the responsibility of the executing member to the clearing member within the clearing house (see item 310 of FIG. 3) via a process called a "give up" (see item 308 of FIG. 3), governed by a so called give up agreement (see item 302 of FIG. 3). Such give up instructions are usually handled by post-trade exchange or clearing house software. The give up process for short positions is not shown in FIG. 3 but is identical.

Other documents shown in FIG. 2 include the exchange's trading rules (see item 206 of FIG. 2) and master product specification (see item 212 of FIG. 2). Such incorporation by reference is extremely efficient allowing for example the contract specifications of all existing positions in a product to be efficiently updated if necessary from time to time. A final contractual link that is worth mentioning is that between an exchange and its clearing house (see item 228 of FIG. 2), for although this relationship is traditionally very stable exchanges such as the Chicago Board of Trade have been known to switch from one clearing house to another.

Overall the exchange's legal structure is extremely robust and therefore beloved of regulators. In these circumstances and in stark contrast to ISDA based derivatives, legal battles from disgruntled end users trying to recover losses made on exchange traded derivatives are practically unheard of and never affect the exchange itself.

Trade and Risk Management Information

FIG. 4 shows a logical representation of operational information flow in existing exchange based derivatives. Item 400 of FIG. 4 represents just one of the many dealers trading on the exchange. The dealers decisions will be informed by general activity observable across various markets and news as published by quote vendors (see item 402 of FIG. 4) such as Reuters, Bloomberg etc. The dealer shown also has direct access to the market place and via their own front office trading system (see item 404 of FIG. 4) they are therefore likely to be a broker or a high volume trader. Low volume traders will tend to place orders by telephone via a broker (not shown). The front office trading system typically connects to the exchange via a so called exchange gateway (see item 408 of FIG. 4) which forms the physical and logical boundary to the exchange maintained systems.

There are typically two methods through which a trade can be occur on the exchange a) a pre-matched bilaterally negotiated pair of trades can be registered directly via so called wholesale trading facilities; or b) orders can be placed in the matching engine (see item 414 of FIG. 4) in the hope that a counterparty can be found. In either case valid half trades are entered into the trade registrations system (see item 418 of FIG. 4) which forms part of the logical boundary between the exchange and the clearing house systems. Whilst within the trade registration system "give ups" can be executed by the appropriate back office (see item 416 of FIG. 4) before half trades are passed to the appropriate accounts within the clearing house (see item 422 of FIG. 4).

To assist with generating a steady flow of matched trades the matching technology also calculates market status information (see item 412 of FIG. 4) such as the lowest unmatched sell orders known as the best ask or offer and the highest unmatched buy orders known as the best bid. These are published via quote vendors (see item 402 of FIG. 4) and of course to the trading screens themselves (see item 404 of FIG. 4). The volumes of unfilled bids and asks at each permissible price respectively below and above the best bid and ask are known as the orderbook and are often also publish. The market supervision function (see item 410 of FIG. 4) is one of the most important in the exchange. This is usually performed by skilled individuals in the exchange's market control centre who continually monitor the market status and whose principle roles are a) to enforce exchange rules; b) maintain an orderly market and c) set the daily settlement prices (see item 420 of FIG. 4). For example market supervisors will be able to reject attempts to register wholesale trades that do not conform to the appropriate exchange rules.

Daily settlement prices (see item 420 of FIG. 4) are used by the clearing house (see item 422 of FIG. 4) to calculate variation margin calls to or from members (see item 416 of FIG. 4) and because of their importance are also published by quote vendors (see item 402 of FIG. 4). Another important set of published information is related to total outstanding contracts on which initial margin is collected and is known as open interest (see item 424 of FIG. 4).

Perhaps most importantly straight through processing (STP) is completely standard and in fact mandatory in the modern electronic futures exchange model. The back office trading reports (see item 406 of FIG. 4) are these days likely to be in electronic format and both these and the front office trading systems can therefore be linked into front office position keeping, risk management and reconciliation systems if deemed necessary (not shown). Much of the infrastructure for STP is nonetheless provided by the exchange and its clearing house for relatively modest and totally transparent fees per lot charges. The modern electronic futures exchange model therefore not only provides good cost effective STP infrastructure but upgrades are automatically enforced across the user base as they are centrally managed by the exchange and its clearing house.

In addition a free risk management service is provided via daily settlements greatly reducing internal risk management costs of smaller or less sophisticated financial institutions. Exchanges also publish certain trading information and so their markets are generally far more transparent than their OTC equivalents The supervisory environment of a genuine exchange is such that a customer is protected by the exchange's trading rules and members are appropriately punished for breaches of best practice conduct. This protection is not available in the OTC derivatives markets.

Margining and Anonymity

Margining is the deposit of cash or collateral placed with the clearing house when you create a futures or options position. Unlike ISDA's collateral management and other independent initiatives within the OTC based market the use of clearing and central counterparty services provided by the clearing house is mandatory at a futures exchange. In a process known as novation the web of bilateral counterparty credit exposures is first replaced by all members' contracts becoming with the clearing house. In a process known as margining collateral is then deposited at the clearing house and topped up on an as needed basis to guarantee performance of the contract and thus eliminate counterparty credit risk.

The exchange's margining system provides important protection to the market. This protection is arranged by the clearing house which guarantees performance of contracts registered with it by its members. Any exchange member who is not a member of the clearing house must therefore have a clearing agreement with a clearing member in order to transact business on the exchange. To become a clearing member certain minimum financial requirements laid down by the exchange and clearing house must be met. Members are monitored to ensure that they continue to meet specified criteria. There are usually different categories of clearing membership depending on whether the member clears only its own business or can act as a broker etc.

After novation the clearing house ensures the financial performance of trades through to final cash settlement or delivery. To assess and control the risk associated with its position as central counterparty, the clearing house calculates and collects of initial and variation margin payments. These are explained below.

Novation and margining together put all exchange trades in a single product on the same footing regardless of originating counterparties and derivative contracts therefore behave just like negotiable securities when viewed from within the exchange's membership and clearing structure. The combination of the clearing house with electronic trading means that anonymous trading is standard practice when dealing on a modern futures exchange and this is especially attractive to larger customers. The anonymous trading advantage cannot be replicated in the traditional bilaterally negotiated market. Margining services were once a unique distinction between exchange traded futures and options and the way the OTC derivatives market worked. However new post trade central counterparty utilities, such as the DTCC Matching Service and SwapsClear, have emerged in recent years and blurred this distinction.

Variation Margin and Daily Settlement Prices

At a fixed time of the trading day, usually after the close of trading of in a contract series, the exchange determines and then publishes so called daily settlement prices for each expiry (and where applicable strike) within the series. Daily settlement prices are simply a set of reference prices consistent with market activity at settlement time. The key to the variation margin process is the exchange's determination of an accurate daily settlement price for each and every futures and options contract. If at settlement time there is insufficient trading activity to observe a settlement price directly, market supervision can use prices generated by a relevant pricing model based on prices from a related market. Settlement prices are automatically transmitted to member back offices.

Based on the daily settlement prices the open positions all participants are market to market and money to cover losses is collected by clearing member firms and presented to the clearing house. Such accounting and collection is followed by a disbursement of day to day gains to clearing member firms. This process ensures that all members' customers receive the gains (and pay the losses) associated with their positions each day. This process is known as variation margining and means that all historical profits and losses are immediately realised. Hence the stresses caused by past negative performance on losing positions are not allowed to build unchecked to levels that may threaten the good performance of profitable positions going forward. The protection afforded by variation margin is augmented by the collection of initial margin which effectively eliminates the residual counterparty credit exposure between the clearing house and any of its members.

Fungible Contracts and Regular Trading Hours

It is worth noting the fact that different exchanges can use the same clearing house which allows positions to be initiated on one exchange and closed on another.

The most straight forward example of fungible contracts in practice is the way in which the Options Clearing Corp (OCC) has since 1975 been used as the central clearing corporation for all US exchange-listed equity options. The Chicago Board Options Exchange (CBOE), The American Stock Exchange (AMEX), The Philadelphia Stock Exchange (PHLX), The Pacific Exchange (PCX) New York Stock Exchange (NYSE), The National Association of Securities Dealers (NASD), The International Securities Exchange (ISE) and The Boston Stock Exchange are all OCC participant exchanges. Where contracts are dual listed a position initiated on one exchange can be closed on another.

A more interesting example of fungible contracts is the system of Mutual Offset (MOS) pioneered in 1984 by the Chicago Mercantile Exchange (CME) and the then Singapore International Monetary Exchange (SIMEX). This electronic linkage effectively allows give-ups between the two exchanges so for example a Eurodollar future executed in Singapore can be cleared in Chicago and hence closed out against an open position already established there. The two exchanges remained separate with distinct clearing houses and because of their different closing times distinct daily settlement prices. As a result of the mismatch of regular trading hours between the two exchanges daily variation margin call imbalances must be absorbed by the two clearing houses.

Initial Margin

The collection of initial margin provides protection to members and the clearing house in the event that sufficient client funds are not readily available to satisfy day to day variation margin requirements. Both longs and shorts must have paid initial margin in order to hold open a position. In effect initial margin is the prepayment of worst case variation margin calls associated with all members' customers positions.

Initial margin thus guarantees in advance that all those due to receive gains will continue to get them even on a day when someone defaults. In this way the initial margin acts as a deposit which may be used by the members and the clearing house to satisfy the customer's or clearing member's obligations if the customer or clearing member fails to do so.

The amount of this initial margin is set by the clearing house based on historical trends in terms of market price volatility as well as forthcoming events which may further affect volatility. An account's initial margin requirement is calculated as the largest possible loss (including all futures and options positions) that a trading account would face in the worst case scenario of market events. The details of these calculations vary from clearing house to clearing house but often recognise that customers' portfolios may hold offsetting positions. However clearing houses must remain conservative as excessively low levels of initial margin risk the integrity of the exchange. If on the other hand offsetting positions are not recognised appropriately, traders may not be able to make the most efficient use of their resources, which may lead to their exiting the market in favour of OTC or another exchange venue. Good quality margining is thus essential to maintaining liquidity.

Cheap Custody and Valuation Services

Typically exchanges and their clearing houses charge a per lot fee at time of trade as do their members when acting as brokers. However there are services that are provided effectively for free. For example the futures clearing house is not only a central counterparty but acts ipso facto as a central depository with members acting as custodians for their clients. No direct fees are charged for holding positions however. Also the calculation of variation margin calls represents a free valuation service and the calculation of initial margin represents a free value at risk calculation (albeit often an overly conservative one).

Competition Between ISDA and Financial Exchanges Increasing ISDA Dominance?

The story of exchange based financial derivatives trading is that of enormous growth but also of decline relative to OTC derivatives. It is true that exchange traded interest rate products have apparently shown strong growth in absolute terms, but their relative decline is remarkable. The OTC Interest Rate Swaps market has ballooned into by far the biggest derivatives markets in the world. Thus, apart from a one-off boost to liquidity when rate futures became electronic, the picture of increasing marginalisation is clear. As ISDA continues its crusade to streamline the OTC market microstructure by setting STP standards the value add of electronic futures exchanges will be further eroded.

Already some exchange traded equity options are increasingly under threat from competing OTC 'look alike' business which is also quoted in exactly the same way as the exchange options. However this is largely an artefact of investment bank equity options dealers not being properly charged for the full cost of their OTC back office whilst being fully charged for exchange brokerage. Nonetheless certain futures and options exchanges appear unable to promote the true benefits of exchange derivatives over bilateral negotiation of contracts in this particular product group.

If as a result of operational streamlining electronic trading of Interest Rate Swaps takes hold in the ISDA based markets an absolute decline in exchange traded interest rate products could also result. The conservative market microstructure retained by exchanges since their open outcry days would be strongly implicated in this sorry state of affairs if that happened.

Liquidity and the Exchanges

Despite the apparent negative picture from historical trends a proper analysis of these shows that ISDA based OTC markets are actually evolving towards the electronic futures and options exchange central markets model or at least as closely as they can to it. Thus OTC markets now have (a) centrally designed contract specifications via the ISDA definitions; and (b) some central clearing via SwapsClear, the DTCC etc; and even (c) a centrally designed API's via the FpML and FIX protocols. Clearly the derivatives exchange model has some true merit. By contrast ISDA based negotiation of contracts clearly has scalability problems from both the mountain of confirmations and the bilateral master agreements required. These scalability problems have recently come very sharply into focus with the advent of credit derivatives but are also present in more established ISDA based products.

Whilst the back office operational difficulties with confirmations can be addressed via STP the bilateral master agreements required pose a more fundamental scalability problem. The setting up of ISDA master agreements and the monitoring of bilateral counterparty credit risk are both costly non trivial tasks. There are therefore many smaller traders excluded from the ISDA based market.

The contrast with exchange traded financial futures could not be more stark where even in the electronic age office based independent traders (the modern 'locals') can constitute up to 40% of the daily turnover.

One can therefore remain quite optimistic for futures exchanges as a group. They remain structurally better positioned to deliver superior scalability of participation and in the electronic age have vastly increased their reach and distribution. With broad participation and distribution can come superior liquidity and liquidity is key in any competition between derivatives markets.

Unfortunately many for futures exchanges have used the opportunity of electronic trading simply to compete with exchanges in other financial centres. However most exchanges have also worked hard to offer alternative access to their infrastructure via so called wholesale trading facilities that allow dealers to agree transactions over the phone OTC-style and then register these as futures or options on the exchange.

The true benefits of exchange derivatives over bilateral negotiation of contracts are best observed in the growth of electronic foreign exchange futures, most notably at the CME. It is no mere coincidence that foreign exchange futures already meet the needs of forex hedgers and speculators properly as evidenced a) by the fact that OTC foreign exchange forwards are quoted in exactly the same way as them; and b) the universe of currency pairs is small enough to be fully represented on exchange (contrast equities at most exchanges).

The Exact Context of the Present Invention

The exact context of the present invention can only be properly understood in the context of the legal and operation structure of the modern electronic futures exchange and its ISDA rival, as already described. The well known historical inability of futures exchanges to deliver product innovation has also already been alluded to. Yet it is a very poorly understood fact that many operational, legal and organisational advantages existing in a futures exchange model cannot easily be recreated even in the best practice bilateral OTC model. The true context of the present invention is simply the observation that the converse is not true i.e. exchanges can be adapted to recreate the advantages of OTC products even though this has never been done before.

The invention aims to reengineer the existing electronic futures exchange model in order to establish convenient on exchange access to spot and forward derivatives normally only available on the ISDA based OTC market. Thus electronic futures and options exchanges can become truly worthy of the title 'derivatives exchanges' by fully meeting the exact needs of hedgers and speculators for the first time as ISDA has now been doing for the past twenty years.

The ability of office based independent traders to participate in the invention's new ISDA-like derivatives products plus the release of existing OTC participants from ISDA's scalability problems (particularly in credit derivatives) can be expected to lead to an explosion in liquidity. In short the invention aims to deliver a far better way of trading. Also the problems of exchange traded equity options will come to be seen as a temporary aberration and an artefact of a mispricing of infrastructural services.

Given the stated aim of the present invention it can only be properly understood together with some basic details of the major ISDA based derivatives markets as compared to existing exchange traded financial futures and options products. We therefore now turn to these matters.

Major Exchange Traded and ISDA Based Debt
Derivative Products Interest Rate Financial Futures
and Options There are two established types plus one less established type:—
Short Term Interest Rate (STIR) futures such as CME three month Eurodollar, LIFFE three month EURIBOR etc; and
Bond futures such as the CBoT ten year T-note and the EUREX Bund
The relatively new swap related futures like the LIFFE Swapnote.
There are other less typical types like the SyFE products.

Short Term Interest Rate (STIR) Futures

Mainstream STIR futures are cash settled futures (see FIG. 5) and we therefore will take this opportunity to explain how this process works in general. In step 500 of FIG. 5 the exchange determines whether the last trading day has arrived. If the last trading day has not arrived then normally daily settlement occurs and the position remains as a futures or options one as indicated at endpoint 502 of FIG. 5. However if the last trading day has arrived then the final daily settlement price known as the Expiry Day Settlement Price (EDSP) is set at step 504 of FIG. 5 via a predefined formula (see 506 of FIG. 5) linked to external data related to the underlying market. As a result of this at the endpoint 508 of FIG. 5 the final variation margin is called, the position is deleted from the clearing house register and initial margin is returned.

For mainstream STIR futures the external underlying market data for cash settlement is an appropriate fixing taken from the deposit market. For example CME Eurodollar futures EDSP at 11 am London time to a price related to the London Inter-Bank Offer Rate (LIBOR) for three month dollar deposits trading at that time as calculated by the British Bankers Association and published as a benchmark fixing. Specifically the formula linked to this external underlying (see 506 of FIG. 5) is simply:—

CME Eurodollar EDSP=100 minus *BBA* 3-month $ LIBOR

Deliverable Bond Futures

Mainstream bond (or note) futures are physically delivered, see FIG. 6. In step 600 of FIG. 6 the exchange determines whether the last trading day has arrived. If the last trading day has not arrived and there is no option to make early delivery as indicated at step 602 of FIG. 6, or indeed the option exists but is not exercised then position remains as a bond future (see 604 of FIG. 6).

The specified criteria for the bonds deliverable into a futures contract listed on an exchange can be found in its contract specifications. The exchange will publish an initial list of the bonds, as shown at step 612 of FIG. 6, which it believes form the complete list of deliverables in time for market feedback. Such a list is commonly known as the basket. The basket contains different bonds which vary in their characteristics but match a set of criteria specified by the exchange for each different type of bond future.

Most often the bonds in a particular futures basket will only differ in their coupons and times to maturity. The bonds deliverable will be of the credit quality defined in the contract specifications of the particular bond future under consideration. This usually means a restriction to a single named issuer for each bond futures contract. In principle the issuer could be anything from a small entity up to the US government but a contract will only maintain its integrity if the supply of the underlying is sufficiently great i.e. it becomes hard to engineer a "short squeeze". For this reason and because of their benchmark status in the cash bond markets, government bond futures predominate in their domestic futures exchanges around the world.

Having published the initial list of deliverables and taken into account market feedback (see 610 of FIG. 6), any errors made can be corrected or new issues included in the deliverable list. Eventually the exchange will close the basket at the time it publishes the final list of deliverables (see 608 of FIG. 6). This final list is definitive and any remaining mismatches with the official selection criteria for picking deliverables as laid out in the contract specifications become moot.

The process of delivery established by the exchange gives traders holding a short futures position the choice to deliver any bond from the list of deliverables. Each bond is assigned a conversion factor which is applied to the final invoice price calculation should it be delivered and is also published in the lists of deliverables together with accrued interest information (see 608 and 612 of FIG. 6). This conversion factor is the mechanism which brings the maturity and coupon differences of the deliverable bonds onto a common base and is intended to make all of the bonds almost equally attractive for delivery. In practice however difference remain and a particular bond known as the cheapest to deliver is the most attractive.

If the last trading day has arrived or an early delivery option has been exercised then the short futures holder must notify the clearing house which deliverable from the list they have elected to deliver (see 606 of FIG. 6). The clearing house can then assign a long futures holder (see 614 of FIG. 6) either at random or according to some other rule to take delivery.

During the deliverable period of the futures contract, which may be a month or just a single day, the daily settlement price is known as the Exchange Delivery Settlement Price (EDSP) but is set by the market supervisor according to prevailing conditions in the futures market as normal (see 616 of FIG. 6). For each lot short the bond seller delivers the same face value of bond as the notional size of the futures contract (e.g. $100,000 for CBoT ten year T-note future) in return for the proceeds of the sale as calculated by the clearing house (see 618 of FIG. 6). The proceeds of the sale resulting from a single delivery are determined by the EDSP multiplied by the delivered bond's conversion factor and adjusted for accumulated accrued interest at delivery. This is called the invoice amount:—

Invoice amount=Nominal Size*(EDSP %*Conversion factor+accrued interest %)

Finally as shown at the endpoint 620 of FIG. 6, the long futures holder pays this invoicing amount to short futures holder in exchange for elected bonds, relevant futures positions are closed and initial margin is returned. This transaction in the cash bond market prompted by the choice of bond to deliver by the short futures holder is called making delivery.

It is worth noting that when a bond futures contract is bought or sold, it is not always with the intention of holding the contract until expiry and then making or taking delivery of an underlying bond. A considerable proportion of the market use bond futures only for exposure management. Accordingly as a deliverable futures contract nears expiry, the open interest (number of open positions) in the contract begins to decline as positions are transferred into the next available contract. This is known as the 'roll'.

Swap Related Futures

These products are relatively new and are cash settled (see FIG. 5).

Swap related futures give cash settled exposure akin to what would be achieved by a bond future whose underlying CTD carried the credit quality of the OTC Interest Rate Swap market and also had a perfect maturity match i.e. CBoT ten year Swap future is linked to an exact 10 year term of the swap market.

There are actually two competing designs but both behave essentially similarly:
1. The CBoT Swap future design; and
2. "Swapnote"—Arguably the most sophisticated futures contract in the world.

Swapnote is traded under license (see the patent U.S. Pat. No. 6,304,858 B1, Oct. 16, 2001) on the LIFFE and TIFFE markets and exactly emulates the exposure already described.

By contrast the M-year CBoT Swap future design has a much simpler expiry day settlement formula (see 506 of FIG. 5):—

$$CBoT \text{ Swap Future } EDSP = \frac{C}{S} + \left(1 - \frac{C}{S}\right) * \left(1 + \frac{S\ \%}{2}\right)^{\frac{1}{2*M}}$$

where,
S represents the ISDA Benchmark Rate for the M-year U.S. dollar interest rate swap on the last day of trading, expressed in percent terms; and
C represents the notional coupon for the future, expressed in percent terms (currently C=6 for both the 5-year and 10-year Swap futures that are listed)

The advantage of both Swapnote and CBoT Swap futures over deliverable bond futures is the fact that being cash settled there is no possibility of a short squeeze of the cheapest to deliver cash bond . . . However there can be problems with cash settlement too—These swap futures are designed to give access to swap exposures for participants who cannot normally trade ISDA IRSs (see below). Such participants will normally want continuing exposure after futures expiry and the only way to achieve this for them is to rollover rather than go to cash settlement. Because of this captive market 'the roll' has a tendency to be priced away from fair value as market makers cash in on their relative advantage, caused by the fact they can trade OTC whilst their captive counterparties cannot.

Cash Settled Options

Often options are cash settled as in FIG. 5 with the EDSP for calls being the premium quotation equal to the maximum of zero or the value of a purchase at strike followed by a sale at the underlying reference fixing. Thus if the options tick size is the same as the futures as is often the case the formula (see 506 of FIG. 5) is:—

Call EDSP=Max(0, Reference Price−Strike Price)

Likewise the EDSP formula (see 506 of FIG. 5) for a put is:—

Put EDSP=Max(0, Strike Price−Reference Price)

Deliverable Options

The alternative to cash settlement for options is physical delivery into futures (see FIG. 7) which is for example used in so called serial and mid-curve options in the CME Eurodollar and also in most options on bond futures. In step 702 of FIG. 7 the exchange determines whether the option is in the money at expiry using a reference price (see 700 of FIG. 7). This check is simply the same as checking if the option EDSP would be greater than zero were it a cash settled one. If not the option reaches endpoint 704 of FIG. 7, remains as an option and expires worthless. Alternatively for American exercise style options, the option holder has the additional right to manually exercise at any time prior to expiry (see 706 of FIG. 7) but if the option is not exercised in this way either we are again at endpoint 704 of FIG. 7.

Exercise of options either automatically or manually has different delivery implications depending on whether the option held is a put or a call (see 708 of FIG. 7). Call option holders receive upon exercise a long futures position at the option's strike price from the call options sellers, who therefore has a short futures position, and at the same time the call options positions are deleted from the clearing house register and initial margin returned (see 710 of FIG. 7). Likewise put option holders receive upon exercise a short futures position at the option's strike price from the put options sellers, who therefore has a long futures position, and at the same time the put options positions are deleted from the clearing house register and initial margin returned (see 712 of FIG. 7).

Financial Futures Quotation and Design Standards

In traditional futures exchanges products are highly standardised. Generally speaking the contract quotation for front office trading purposes and its valuation for back office purposes are identical up to a constant factor i.e. what you see is what you get.

Thus short term interest rate futures such as CME Eurodollar futures and options products have a constant tick value i.e. a move in price of a single lot of 0.005 is always worth $12.50 regardless. No proper account is taken of:—
a) Convexity so overall forward interest rate levels are ignored (in fact given the design of the CME Eurodollar futures in the unlikely event of three month rates going above 100% the futures would be trading at negative price); and also
b) Time value of money is ignored so tick value is the same regardless of how far away an expiry is and what the relevant spot interest rate levels would be to properly value a corresponding forward; and also
c) The actual days in the deposit market fixing that underlies each contract expiry is ignored i.e. day count is simplified to three months equals ¼ of a year.

Even in the exceptional case of the Sydney Futures Exchange (SyFE) where convexity has been included the relationship between quotation and valuation remains relatively simple, inflexible and standardised. Any variable parameters however relevant are ignored and specifically factors b) and c) are not taken into account.

Such conventional constraints on financial futures price quotations and valuations can largely be put down the exchanges' history as open outcry markets where what you see is what you get was the most appropriate model. Also before the advent of computers more sophisticated quotations would have been difficult to implement manually. The limitation to one expiry per calendar month per product is also a relic from those bygone days. In the age of computer based trading such constraints can be set aside.

A final constraint that is certainly counterproductive and again merely conventional is the fact that all term futures products are listed as so called forward-forward products. Thus for example every point on the price curve defined by the CME Eurodollar future represents a three month term exposure. If forward-forward curves are filled in to include all possible expiry dates you will have a single contract going to final completion each day. By contrast spot market curves will contain different maturity terms but all for 'immediate' delivery whilst true forward market curves will also contain different maturity terms but all for deferred delivery on the same forward date.

OTC Interest Rate Derivatives

There are three mainstream interbank OTC interest market types:—
The money market derivatives known as Overnight Indexed Swaps (OISs) and their associated options; plus
The money market derivatives known as Forward Rate Agreements (FRAs).
The long term derivatives known as Interest Rate Swaps (IRSs).

There are a large number of other less actively quoted products or variants on the above e.g. asset swaps which are simply a variant of standard IRSs linked to the cash flows of a particular bond.

According to ISDA the total notional outstanding in OTC interest rate derivatives grew almost 16 percent in the first half of 2004 to $164.49 trillion, mirroring growth in the second half of 2003.

Overnight Indexed Swap (OIS)

In an OIS one side pays a money market term deposit interest at a level negotiated at time of trading and the other side the relevant overnight index (e.g. the Fed funds rate) compounded over the same term. An OIS thus replicates off-balance sheet a mismatched deposit position of 1) a short term loan funded by an overnight deposit; or 2) an overnight loan funded by a short term deposit, depending on whether you are receiving or paying the term rate. Both rates are calculated on an agreed notional principal which does not however change hands.

Forward Rate Agreement (FRA)

In a FRA one side pays a term deposit interest at a level negotiated at time of trading and the other side a market rate for the deposit at contract maturity. On the day the FRA is priced the market rate is defined by the relevant interest rate fixing (e.g. the BBA 1-month $ LIBOR rate). Crucially both payments are discounted using this same interest rate fixing. Because of this a FRA, as the name implies, truly allows traders to lock in a forward rate as they can simply use the deposit market to complete their hedge. Both rates are calculated on an agreed notional principal which does not however change hands. Three month and six month FRAs are the most common.

Interest Rate Swap (IRS)

In an IRS one side regularly (e.g. every three months) pays a fixed interest rate while the other side makes regular payments based on a floating interest rate (e.g. the BBA 3-month $ LIBOR rate). The fixed interest rate is struck at a level negotiated at time of trading and depends on the term of the contract. Both rates are calculated on an agreed notional principal which does not however change hands at final maturity. An interest rate swap is thus very similar to a sequence or strip of FRAs all struck at the same fixed rate.

The purpose of an IRS is these days usually to manage fixed income (i.e. bond) portfolios effectively. However the earliest transactions of this type where used by issuers to take advantage of imbalances between their standing amongst investors in the capital and money markets respectively i.e. to achieve minimum cost of funds.

The Money Market Convention and Beyond

As might be expected both FRAs, OISs and certain forex derivatives known as swap points are quoted based on the money market convention as used in the cash depo and repo markets. This has a number of advantages for users:—
  No need to remember complicated expiry date formulas (contrast with CME Eurodollars which expire two business days prior to third Wednesday of delivery month!)
  Liquidity is concentrated at the same on-the-run points across different product types thereby maximising the ability to arbitrage. For example forward swap points versus depo market versus spot FX and outright FX forwards form a so called box trade arbitrage.

IRSs are also quoted in this manner but at longer term maturities. Thus the IRS market will only quote active two way markets at maturities of a whole number of years i.e. spot plus 1 year, spot plus 2 years etc. out to 30 or even 50 years in the futures.

OTC Credit Derivatives

In the traditional debt markets poorer credit (higher risk) borrowers must pay higher rates than lower risk borrowers. Conversely investors may generally assess the risk of a particular borrower in terms of the higher or lower market rates prevailing for their debt. However prevailing rates have to be seen in the context of the general supply and demand conditions that affect all debt. In particular the general level of riskless government or IRS yields will underlay movements in market rates for all other borrowers' debt. For this reason liquidity has tended to concentrate in these two markets at the expense of corporate debt.

Credit derivatives have become increasingly popular since the mid-1990s and according to ISDA notional outstanding grew 44 percent in the first half of 2004 to $5.44 trillion, compared with 33 percent growth reported during the second half of 2003. These are impressive growth rates but the market is still small compared to OTC interest rate derivatives.

As a result of these growth rates the theory and quantitative measurement of credit has had a tremendous boost in recent years and it is now apparent to bank strategists that credit derivatives have only just begun to create truly liquid markets in pure credit exposure. As understanding of these products has grown the market has come to realise that pure credit exposure represents a separate asset class from both equity and interest rate products and due the large amount of outstanding underlying debt the potential of this sector is vast in principle.

The main credit derivative market types are:—
  Single name Credit Default Swaps (CDSs)
  Index CDSs, tranched indices and correlation
  Synthetic CDOs Although there are several other we will not discuss here.

Single Name Credit Default Swap (CDS)

Most of these products are first created at the 5 year maturity point. In a single name CDS one side (protection seller) regularly pays a fixed rate called the "spread" (e.g. every three months) while the other side (the protection seller) makes payments only in the event of a credit default. As the name implies the spread premium of a single name CDS is closely associated with the credit spread over benchmark for the same borrower's actual debt. In return for receiving the spread premium the protection seller contracts to pay the buyer the full face value plus accrued interest for whichever qualifying debt (i.e. the loans, bonds, convertibles etc from the defaulting issuer) the protection buyer chooses to deliver after a credit event i.e. in the event of a default by the issuer.

Index CDSs, Tranched Indices and Correlation

A CDS Index is just a set of single name CDSs traded as a group. However the importance of this class of derivatives arises from their being designed to promote liquidity. Indeed credit derivative index products are comprised of the most liquid names in the single name market at the time they are first issued. Another liquidity promoting feature is that every six months the existing benchmark CDS index is rolled into a new five year CDS index "on the run" benchmark at which time also newly active names can enter the index. Indices of this type have therefore become liquid benchmarks and have thus become essential tools for managing risk in other credit derivatives.

The index tranche market is also very interesting. The concept is the same as for cash CDOs i.e. tranches are defined by two percentage face value numbers with the attachment point defining the minimum losses to which the protection seller is exposed and the detachment point defining the maximum losses.

As the attachment and detachment points are standard (i.e. 0%-3%, 3%-6%, 6%-9% etc in Europe, 0%-3%, 3%-7%, 7%-10% etc in North America) a liquid market for correlation has developed.

The fair spread premium for an index depends on the overall risk which is a function of the individual names in the underlying portfolio and how diversified the it is. In other words the default correlation must be known in order to fair value an index CDS. Interestingly index tranches have different exposures to correlation. For example higher correlations makes the risk within different tranches more equal which benefits investors in the most junior tranche whilst hurting investors in the higher seniority tranches.

The Credit Market Convention

Since Q2 2003 market makers decided to concentrate CDS liquidity by quoting only four value dates in the year namely 20th March, 20th June, 20th September and 20th December or the next available business day if the standard date falls on a weekend or holiday. Despite this you can in principle trade any dates according to ISDA documentation.

Synthetic CDOs

The development of synthetic CDOs is a logical extension of securitisation and credit derivatives. A synthetic CDO is then simply a tranched portfolio-linked credit derivative (i.e. non standard CDS index) packaged inside an SPV and rather confusingly isn't directly collateralised with actual debt. The first synthetic CDOs were reported as typically being used in order to exploit regulatory and tax arbitrages of one kind or another. However by 2000 the profile of deals changed from balance sheet driven to value driven. In a synthetic CDO, no legal or economic transfer of bonds or loans take place, with the underlying reference pool of assets remaining on the balance sheet of the originator. The impact on the single name CDS market has been to build up liquidity in those names that were common reference names in synthetic CDOs.

SUMMARY OF THE INVENTION

The invention is based on the modification of the components that make up a modern electronic futures exchange in order to vastly extend the range of products and services supported. Although some of the new products described are designed to mimic existing products the modified electronic futures exchange has significant structural advantages in any case over rival methods of delivering similar exposures.

Accordingly, it is an object of the present invention to provide a novel and highly efficient method for accessing and managing exact OTC ISDA type credit default swap like exposures within a fully integrated broad based organized credit derivatives market that also includes novel recovery based product and novel options.

It is an additional object of the present invention to provide a novel and highly efficient method for accessing and managing exact OTC ISDA type interest rate swap and FRA like exposures It is an another object of the present invention to provide a novel hybrid bond like futures that deliver exact OTC ISDA type interest rate and credit exposure upon expiry.

It is a further object of the present invention to provide a novel and highly efficient method for accessing and managing exact OTC ISDA type overnight index swap exposures It is yet another object of the present invention to provide an upgraded clearing cycle capable of dealing with these new products and existing exchange traded products in a truly global market place.

Additionally, it is another object of the present invention to provide a novel and highly efficient interbank deposit market that removes the need for counterparty credit calculations.

Furthermore it is another object of the present invention to provide a new kind of securities market based for a broad range of products including those normally only issued by so called special purpose vehicles.

Ultimately it is the aim of this invention to provide a fully integrated, operationally efficient, broad based and organized market for the full spectrum of financial instruments.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 shows how a front office screen for an exchange traded credit derivative might appear on 3 Oct. 2005;

DETAILED DESCRIPTION OF THE INVENTION

Overview of the Whole Invention

Figure 1:
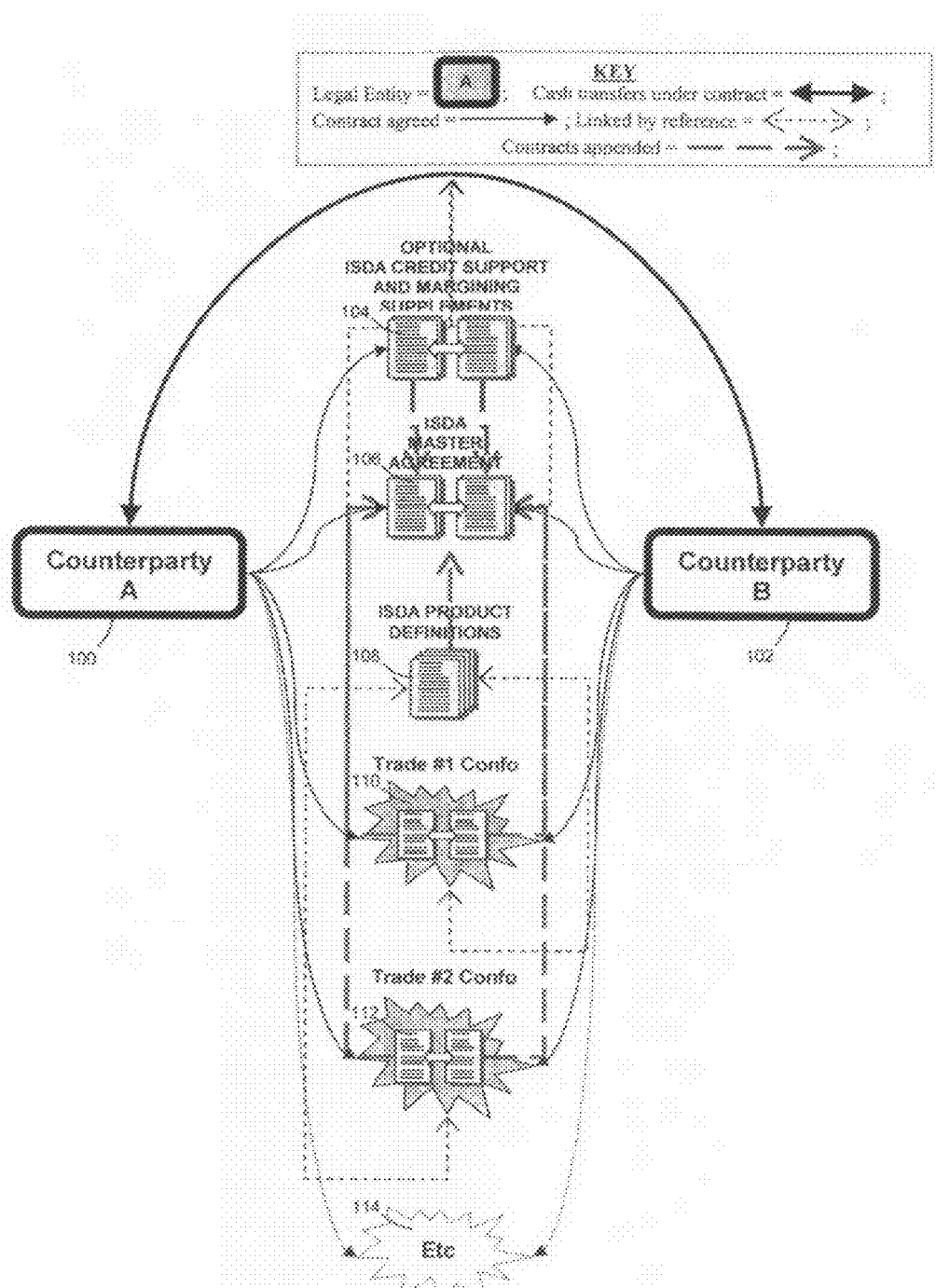
FIG. 1 is a schematic representation of the legal structure of ISDA based derivatives trading.
Figure 2:
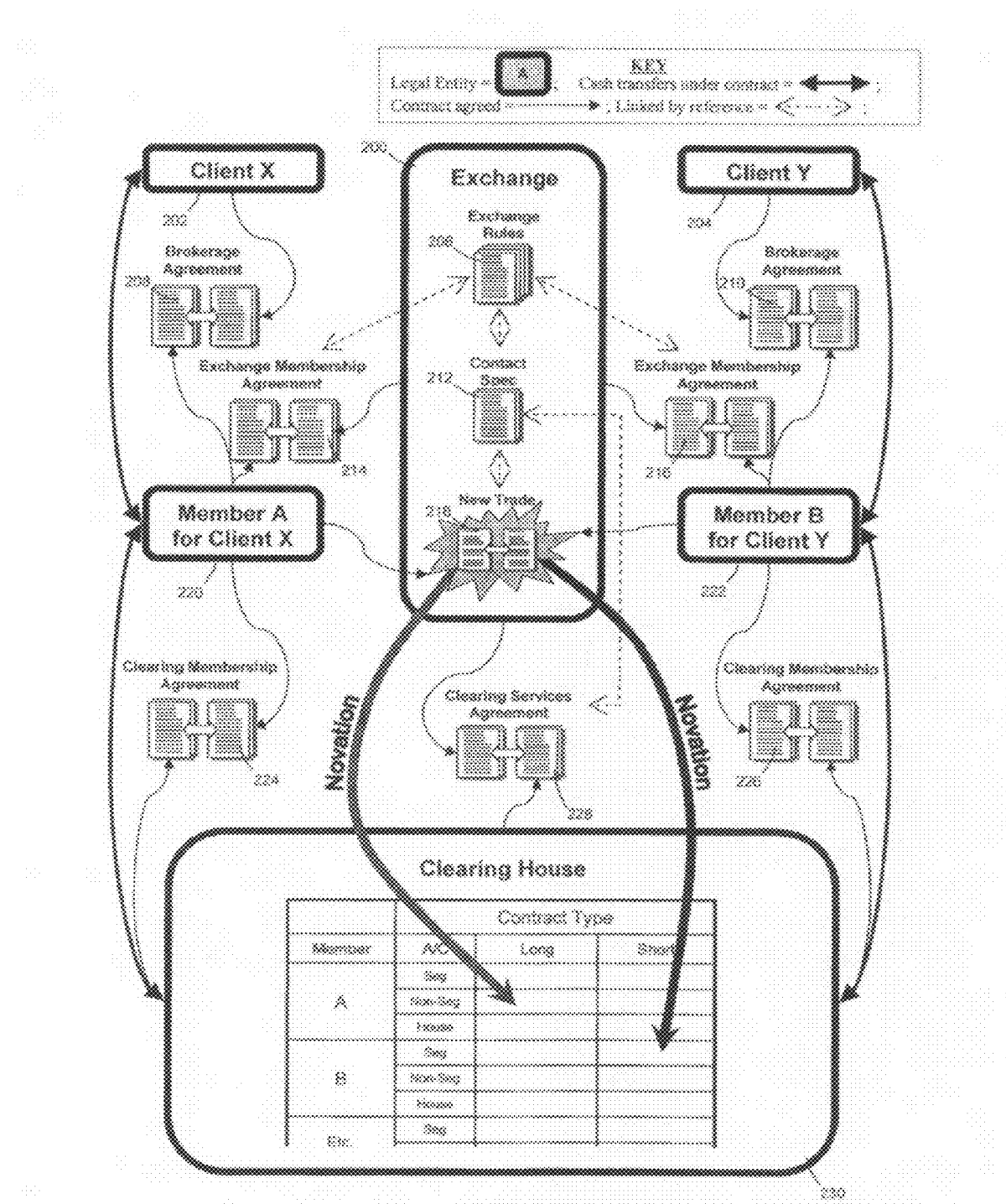
FIG. 2 is a schematic representation of the legal structure of exchange based derivatives trading.
Figure 3:
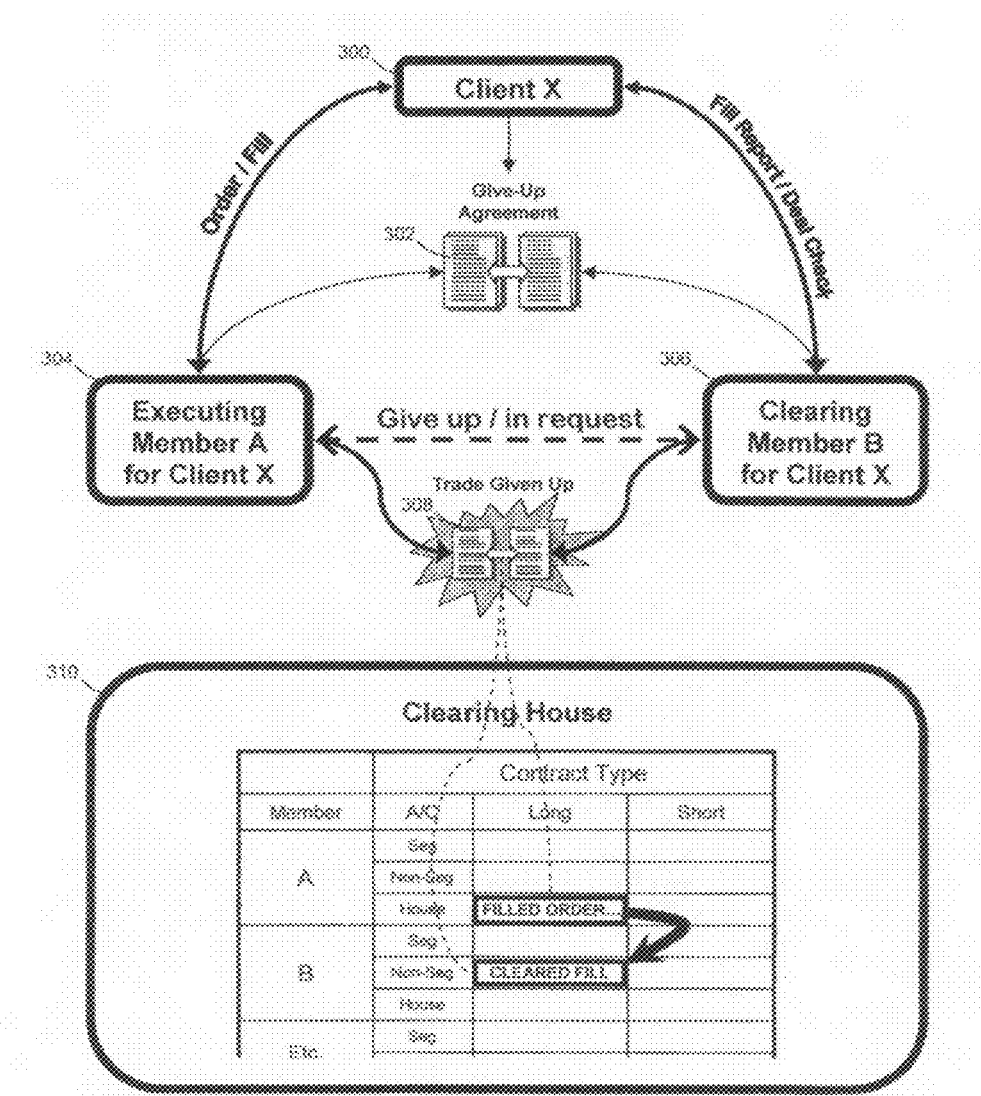
FIG. 3 is a schematic representation of the give up/in process of exchange based derivatives trading.

The invention consists of a number of linked innovations in product design, product management processes, pre and post trade systems design, product settlement processes and the role of the clearing house that when applied to an existing electronic futures exchange lead to the establishment of convenient on exchange access to spot and forward derivatives normally only available on the ISDA based OTC market. Not all products will rely on all the innovations.

In addition an innovation which involves the role and business processes of the exchange's clearing house can also be extended to a number of further inventive applications distinct from the trading of ISDA-like products on exchange yet potentially extremely useful to the financial markets.

Introduction to the ISDA-Like Derivatives Product Exchange Part of the Invention Description of this Part of the Invention Specifically the ISDA-like invention exists in three forms Adapted For Exchange New Credit Derivatives, Adapted For Exchange New Interest Rate Swaps and Adapted For Exchange New Money Market Derivatives.

Novelty of this Part of the Invention

The invention can be clearly distinguished from all others which merely try to create exchange-like electronic central market trading systems and/or post trade clearing systems that remain within the ISDA based OTC markets' legal structure or analogues to it. Existing inventions of this first type typically show no recognition of the advantages of the traditional futures exchange model. There are numerous examples such as those dealing with central markets for ISDA based products (e.g. the patent application USPA 20040143535, Jul. 22, 2004) or those dealing with counterparty credit arising from the ISDA market structure (e.g. the patent U.S. Pat. No. 5,802,499, Sep. 1, 1998) or those dealing with the post-trade confirmation process so unnecessary in a futures market model (e.g. the patent U.S. Pat. No. 6,274,000, Jun. 21, 2001).

The invention can also be clearly distinguished from all others which merely try to create genuine exchange traded futures that indirectly reference the ISDA based OTC markets either via a cash fixing on those markets or indeed via structured negotiable securities with ISDA based products embedded in them e.g. via credit linked notes. Inventions of this type have typically shown complex innovations in product design and product settlement processes whilst retaining the historically straightforward link between pre and post trade of traditional futures markets. A leading example of this approach is "Swapnote" (see the patent U.S. Pat. No. 6,304,858 B1, Oct. 16, 2001) which although it is traded under license on the fully electronic futures exchanges of LIFFE and TIFFE would have been perfectly capable of being traded in the old open-outcry markets. It is basically an advanced type of cash settled bond future. There is also a more recent example involving credit linked futures which is nonetheless equally traditional and equally dependant on the ISDA market to provide a credit linked note underlying (see the patent application USPA 20050080734, Apr. 14, 2005).

The invention can also be distinguished from certain already existing exchange traded futures which merely introduce convexity into the standard futures environment in a non-parametrical and non time-valued way e.g. interest rate futures and options as currently traded on the Sydney Futures Exchange.

General Note on Novelty

The CFTC glossary on their web site has the following relevant entries:

Exchange:
A central marketplace with established rules and regulations where buyers and sellers meet to trade futures and options contracts or securities. Exchanges include designated contract markets and derivatives transaction execution facilities.

Futures Contract:
An agreement [on exchange] to purchase or sell a commodity for delivery in the future: (1) at a price that is determined at initiation of the contract; (2) that obligates each party to the contract to fulfil the contract at the specified price; (3) that is used to assume or shift price risk; and (4) that may be satisfied by delivery or offset."

Traditional exchange derivatives (i.e. futures and options contracts) trading in a single product can therefore have been expected to always result in:—
- a single type of post trade contract (c.f. "An agreement") but this is not the case with the present invention.
- contracts that have a standard fixed notional term (c.f. "a commodity for delivery" e.g. CME Three month Eurodollar) but this is not the case with the present invention.
- either physical or cash settled deliverables (c.f. "by delivery or offset" but not both) but this is not the case with the present Adapted For Exchange New Credit Derivatives invention.
- a definite not merely a potential underlying delivery or offset (c.f. "a commodity for delivery in the future" i.e. both the commodity and the time of delivery are normally known at time of trading) but this is not the case with the present Adapted For Exchange New Credit Derivatives invention.

The invention is therefore clearly innovative in all these dimensions at the least.

The General Advantages of this Part of the Invention

The object of this part of the invention is to give access to genuinely ISDA-like derivative exposures within a purely electronic futures exchange-like environment. Two key points to notice about this invention are:—

Spot market—That it gives daily spot not forward exposure for the first time on a futures exchange-like environment. Most ISDA based credit, interest rate swaps and money market products are spot derivatives not forwards. This means that they give exposure to the relevant term structure from the very beginning of the curve. This contrasts with futures which are analogous to ISDA based forwards.

Flexibility—That it dramatically increases the flexibility of a purely electronic futures exchange-like environment to play host to products whose quotation value and tick value are not immediately deducible from the quotation itself without reference to any external variable parameters.

The general view has been historically that ISDA-like derivative exposures cannot be transferred onto a genuine exchange. This invention is significant in that it shows this perception to be wrong and that all the advantages of a futures exchange-like environment can be brought to bear for a significant fraction of ISDA based products.

The advantages of using a genuine exchange for trading are readily apparent from the "Background To The Invention" section above. Specifically the advantages include but are not necessarily limited by the following:

Quasi-negotiable securities—By moving away from the current ISDA based bilateral model onto a futures exchange-like environment the products behave similarly to negotiable securities when viewed from within the exchange's membership and clearing structure. However a 'transfer' of title when it happens is in fact achieved by one client closing their position with the clearing house while their counterparty opens an identical new position.

Robustly fair marketplace—The supervisory environment of a genuine exchange is such that a customer is protected by the exchange's trading rules and members are appropriately punished for breaches of best practice conduct. Both the central marketplace at the exchange and also the central depository at the exchange's clearing house provide easy access to the audit trails required whenever an investigation is commenced.

Comprehensive access to central counterparty—Unlike certain existing initiatives that seek to provide clearing and central counterparty services within the ISDA based market the exchange's clearing house will provide these services to all users of ISDA-like products based on the invention. This is because it is impossible to access the invention based products except via the exchange.

Anonymous trading—The combination of a universal central counterparty and electronic trading means that anonymous trading is standard.

Decreased systematic risk—Regulators and central banks have often voiced concerns over the non transparent nature of the existing ISDA based derivatives markets. The web of bilateral counterparty credit exposures is so complex and vast that it is impossible to rule out a domino effect of defaults via contagion within the financial system should a major institution get into serious difficulties. A large scale move to the alternatives created by ISDA-like products based on the invention would eliminate these fears. Also in the event of extreme financial stress there would be a single point of application for the injection of funds from lenders of last resort, namely into the exchange's clearing house.

Decreased operational risks and costs—The legal and operational structure of a genuine exchange decrease operational risks to a minimum compared to the existing cumbersome ISDA based market. A large scale move to the alternatives created by ISDA-like products based on the invention would dramatically reduce costs as key operational processes cease to be duplicated across the industry instead becoming centralised.

Efficient product structure—The legal structure of a genuine exchange is such that all positions in a product exist by reference to a master product specification. This allows the contract specifications of all existing positions in a product to be efficiently updated if necessary from time to time.

Risk management via daily settlements—A key concern of regulators is that derivatives positions may be mispriced by uninformed or indeed fraudulent dealers within less sophisticated or indeed careless financial institutions. The exchange's mark to market procedures via daily settlements should greatly reduce this problem for internal compliance officers of smaller or less sophisticated financial institutions.

Efficient counterparty structure—The legal structure of a genuine exchange is such that access to all the exchanges products can be achieved via any member that is allowed to offer such a service under the exchange and clearing house rules and any other relevant regulatory constraints. The prospective customer must simply sign a single brokerage agreement with that member to access all products.

Access via brokers—As many brokers are members of several different exchanges a single brokerage agreement can give a customer access to the entirety of exchange traded derivative products regardless of exchange. Exchanges also typically allow customers to use a different broker for execution purposes than for clearing purposes via an assignment process called a "give up". There is therefore a broad competitive market for both execution and clearing brokerage services which will typically result in low brokerage costs.

Permission to trade—Many regulators recognise the high quality of markets provided by exchanges in allowing broader access to them than to the ISDA based market. In addition the rules of many funds themselves forbid trading in OTC derivatives while allowing trading on exchanges.

Liquid and transparent central market—Historically for all the above reasons those financial futures and options products that became moderately successful on derivatives exchanges have gone on to become extremely liquid indeed. Of course not all products are successful. A significant uptake of the alternatives created by ISDA-like products based on the invention seems likely to lead on to a large scale move onto exchange and eventually far superior liquidity than currently exists in ISDA based products.

Exchanges are thus by virtue of this revolutionary invention able to mimic the advantages of the existing ISDA based market whilst deepening liquidity, broadening access and reducing operational, counterparty, legal and systematic risks. Two final points to note concern how relatively undisruptive this invention can be:—

OTC-style trading—Many exchanges have worked hard to offer alternative access to their trade registration infrastructure via so called wholesale trading facilities, including block trades and basis trades. Wholesale trading facilities allow dealers to agree transactions over the phone OTC-style and then register these in a timely fashion as futures or options on the exchange. They are particularly suited for transactions contingent on a cash trades or transactions where liquidity is too limited to absorb a very large order in a continuously quoted market or indeed wherever market makers quote on an ad hoc basis. Thus where appropriate the new ISDA-like products based on the invention can still be traded in an OTC-style.

Risk management—Intraday risk management systems will need very little modification to deal with ISDA-like products based on the invention rather than the existing ISDA based products they mimic.

Furthermore specific advantages are included in the relevant sections below.

Outline of System Changes Required for the ISDA-Like Derivatives Exchange Part of the Invention In traditional futures exchanges generally speaking contract quotation is identical for front office and back office purposes. Where occasional exceptions to this rule do exist they consist of trivial or at least deterministic transformations taking no account of the actual term of the cash product underlying the traded derivative.

The present invention does away with this traditional futures exchange constraint thus allowing ISDA-like debt related products to be listed on a genuine exchange for the very first time. This is achieved via modifications to the trade information flow diagram as shown in FIG. 8 at the points indicated by the circles numbered 1-5.

Figure 4:
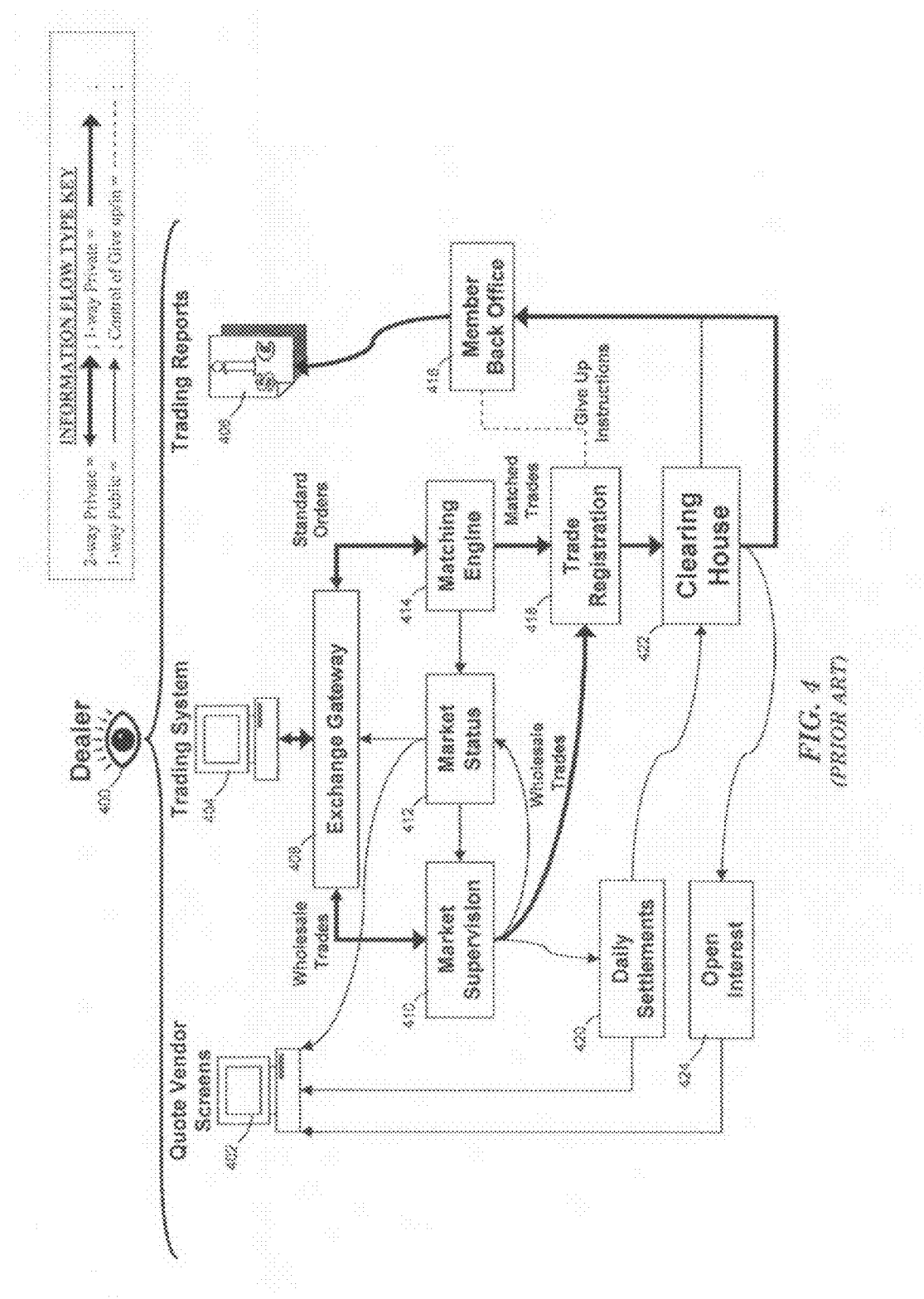
FIG. 4 is a logical representation of information flow in existing exchange based derivatives.
Figure 8:
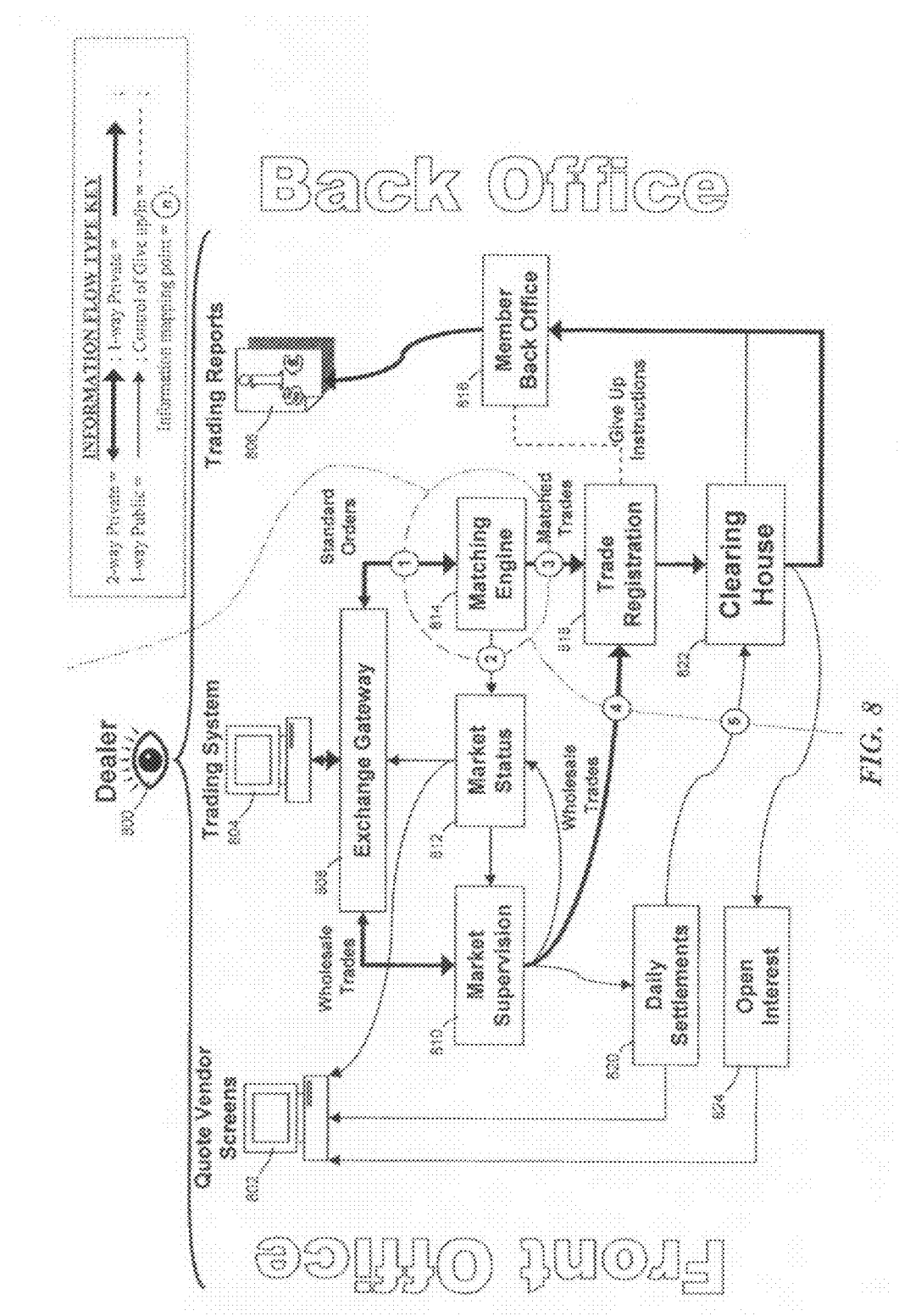
FIG. 8 shows the transformation of information flow in the invention based derivatives exchange.

FIG. 8 is essentially a modified version of FIG. 4. It therefore shows a logical representation of operational information flow in trading the adapted exchange based derivatives. Item 800 of FIG. 8 represents just one of the many dealers trading on the adapted exchange. The dealers decisions will be informed by general activity observable across various markets and news as published by quote vendors (see item 802 of FIG. 8). The dealer shown also has direct access to the market place and via their own front office trading system (see item 804 of FIG. 8). The front office trading system connects to the adapted exchange via a so called exchange gateway (see item 808 of FIG. 8) which forms the physical and logical boundary to the exchange maintained systems. Orders can be placed in the matching engine (see item 814 of FIG. 8) in the hope that a counterparty can be found and valid half trades are entered into the trade registrations system (see item 818 of FIG. 8) and are passed to the appropriate accounts within the clearing house (see item 822 of FIG. 8). Market status information is calculated and published (see item 812 of FIG. 8) and monitored by the market supervision function (see item 810 of FIG. 8) who also set the daily settlement prices (see item 820 of FIG. 8) used by the clearing house (see item 822 of FIG. 8) which calculates variation margin calls to or from members (see item 816 of FIG. 8) and open interest (see item 824 of FIG. 8). Finally trading reports (see item 806 of FIG. 8) are produced by the member back office.

We now considered the modifications proposed by the present invention which take the form of mappings and reverse mappings between three separate groups of products:—

- A front office product that is used on dealer trading and information systems. The quotation convention here is the one most suitable for the dealers in the product.
- An internal matching product that exists only within the infrastructure of the electronic exchange. The representation here is the one most suitable for the matching engine when combining strategy and outright orders.
- One or more back office products that exists only within the clearing infrastructure of the clearing house, it's members and the dealer's back office. The representation here is the one most suitable for expressing profit or loss and risk exposure.

Returning to FIG. 8 we see that each mapping exists between the boundary of the above products at points indicated by circles numbered 1-5. Since the exact boundary is to some extent arbitrary the mappings can be implemented in different places yet have the same effect. As shown:—

1. Mapping 1 (see circle point 1 in FIG. 8) is a two way mapping that converts the dealer's front office quotation orders into the internal matching representation, and the dealer's fills back from this representation into the front office product.
2. Mapping 2 (see circle point 2 in FIG. 8) is similar to the dealer's fills mapping but converts the whole order book from the internal matching representation back into the front office product.
3. Mapping 3 (see circle point 3 in FIG. 8) is the conversion from the internal matching representation into the back office product.
4. Mapping 4 (see circle point 4 in FIG. 8) is similar to the dealer's orders mapping but converts wholesale trades agreed over the telephone into the back office product representation directly.
5. Mapping 5 (see circle point 5 in FIG. 8) is the conversion of front office product settlement reference prices into actual back office product daily settlement prices. The former are set by the market supervisor each day from front office market activity on the close but the latter are what are actually needed for variation margin calls.

The details of the mappings will vary with the particular ISDA-like invention i.e. Adapted For Exchange New Credit Derivative or Adapted For Exchange New Interest Rate Swap or Adapted For Exchange New Money Market Derivatives. Indeed not all the inventions require all the mappings. The mappings may also vary with the particular money market product. We now go on to describe the details of these mappings and the associated products for each ISDA-like invention subset.

Reconciliation, Efficient Give Ups and Open Interest Markers

Where a product design leads a single front office trade to be split into several back office positions this may pose operational difficulties. It should be noted therefore that for reconciliation purposes between front office and back office systems and for open interest reporting purposes the preferred embodiment of the invention will conserve information appropriately.

It is envisaged that all front office product fill reports on a dealer's trading system (see item 804 of FIG. 8) are accompanied by the relevant back office product breakdowns to help with front office versus back office reconciliation.

It is also envisaged that front office product matched trades will be passed through to the clearing house (see item 822 of FIG. 8). These matched front office trades will appear on the clearing house's trade register as normal contracts simply for convenience. However the economic significance of these trades is carried by the associated back office products and not by these front office position markers themselves e.g. matched front office trades will not be charged margin.

Front office position markers held at the clearing house can be used to assist with front office versus back office reconciliation. They will also be used for calculating open interest reports (see item 824 of FIG. 8) for front office systems. Another important usage is for efficient give ups. The preferred embodiment of the invention will allow back office managers (see item 816 of FIG. 8) to give up and take in products by reference to the front office position markers held in the clearing house's trade registration systems (see item 818 of FIG. 8) alone i.e. the associated back office products referenced to a particular front office trade would be transferred as a group simply by transferring their front office position marker.

The Details of the Adapted For Exchange New Credit Derivatives Invention

Overview

The Adapted For Exchange New Credit Derivatives invention falls naturally into two halves:—

1. The Traded Credit Product that exists whether or not there is a credit event; and
2. The Event Protection Products and Processes that are created in order to generate efficient credit protection if there is a credit event.

Recovery Rate Products can be viewed as part of point 2 but could also in principle be listed independently to assist hedging in existing ISDA based credit derivatives.

Advantages

Several of the advantages already mentioned in the general advantages section will be of particular benefit in tackling barriers to growth in the existing ISDA based Credit Derivatives market. For example great benefits can be expected in the following areas:—

Permission to trade—Customer orders flowing towards large banks within the existing ISDA based Credit Derivatives market are limited by regulatory restrictions. In particular access tends to be restricted from large but traditional funds. Often the managers of such funds will nonetheless recognise the benefits of credit derivatives, so if access were improved a significant uptake of the invention would seem likely.

Daily settlements and counterparty structure—Barriers to entry caused by concerns over marking to market and other concerns internal to smaller less sophisticated banks or large but traditional funds are very large in the existing market. A significant uptake of the invention therefore seems likely and will result in slashed documentation overheads and middle office costs.

Access via brokers—The existing ISDA based market has shown tremendous growth even though it is relatively hard to access. The Adapted For Exchange New Credit Derivatives invention will however bring to bear the already broad and competitive network of futures brokers and the already broad end user access to exchange trading screens. A significant uptake of the invention therefore seems likely and will result in reduced brokerage costs in the longer term.

Decreased operational risks and costs—No fully established straight through processing standard exists in the current ISDA based market. By contrast futures exchanges have had straight through processing as part of their standard business model for decades. A significant uptake of the invention therefore seems likely and will result in slashed back office costs.

As a result of the above benefits as well as those set out below a step change in market turnover growth is likely to result.

Other advantages already mentioned in the previous section will result in significant but less dramatic benefits over the existing ISDA based market. Some examples of these include:—

Quasi-negotiable securities—Although the new ISDA-like products based on the invention will appear familiar to dealers used to trading their ISDA based equivalents post trade anonymity will be possible for the first time via the exchange's membership and clearing structure. This should encourage larger orders to be placed.

Efficient product structure—The development of the existing ISDA based Credit Derivatives documentation has been an iterative process as the market gradually became aware of definitional issues that might lead to legal and market risks. The need to refine documentation will no doubt continue. A significant uptake of the invention will result in the market benefiting from the exchange's ability to efficiently update contract details of all open positions in a product simultaneously if necessary.

The benefits already mentioned in this section are generally applicable to exchange traded derivatives although they may be of particular importance for credit derivatives. However such benefits can only come into play when a workable Adapted For Exchange New Credit Derivative design exists.

In addition are benefits that result from the product designs, product management processes, pre and post trade systems design, product settlement processes and the enhanced role of the clearing house that are specific to the Adapted For Exchange New Credit Derivatives invention itself. Several other major weakness of the existing ISDA based Credit Derivatives market are addressed by the invention. These additional advantages include the following:—

Legal certainty—In the ISDA based market legal costs can be particularly high as credit events result in high value obligations which are worth contesting in the courts if as a result payment can be avoided. The Adapted For Exchange New Credit Derivatives invention does not allow for such opportunistic legal challenges.

Robustness in pricing—The product designs give both the convenience of cash settlement and the robustness of physical delivery to market participants. Also by virtue of the product designs certain participants who cannot or do not want to take physical delivery are insulated from the risk of delivery being made.

Reference Obligations—The product designs bring to an end the need for the trade confirmations that form an important part of the legal structure of the existing bilaterally negotiated ISDA based market. Trade confirmations are a particular problem for Credit Derivatives where the reference obligation named by counterparties often do not match exactly. The real problem is that the exact choice of reference obligation is in many, but crucially not all, cases to some extent arbitrary. This problem is completely eliminated by virtue of the product designs which give the exchange sole authority to define deliverable obligations.

Central treatment of credit events—The product designs bring to an end bilateral manual exercise of rights after a credit event. Instead by virtue of the product designs the exchange has sole authority to call a credit event.

Consistent treatment of credit events—In the existing ISDA based Credit Derivatives OTC market relative value trading can be affected by definitional mismatches between deliverable obligations from the same reference entity. Also cumbersome delivery cascades can result from credit events being triggered. Such problems are eliminated in the Adapted For Exchange New Credit Derivatives invention which should therefore boost relative value and arbitrage trading opportunities.

Consistent treatment of credit events in options—In the existing ISDA based Credit Derivatives OTC market, default swap options treat credit events differently depending on whether the option have a single name or multiple names underlying it. Single name European style credit options are designed to help manage movements in the spread not to give exposure to default itself and so they 'knock out' if a credit event occurs in the referenced entity. By contrast European style index options deliver the entire index upon exercise at expiry to avoid complications close to expiry time but as a result retain exposure to defaults themselves thereby creating the potential for complexities arising further from expiry. Such problems are eliminated in the Adapted For Exchange New Credit Derivatives invention which should therefore boost credit index option trading.

Gaps in the term structure—Apart from the 5 year (and increasingly 10 year) point in the credit term structure the existing ISDA based Credit Derivatives market is said to be illiquid. The product and trade systems designs of the Adapted For Exchange New Credit Derivatives invention will generate forwards and hence help create a full credit term structure.

Pure par credit spreads in and out—Cash adjustments are common practice in the existing ISDA based Credit Derivatives market whenever coupons have already been fixed e.g. when trading out of existing single name positions or indeed when trading both in and out of index positions. The cash adjustments are calculated using an assumed recovery rate convention and this clouds the pure credit exposure of the position. By contrast the product and trade systems designs of the invention will generate pure par credit spreads in and out.

Six monthly index rollovers—Every six months the bulk of the index market rolls from one index series to the next one but not all positions are rolled. One embodiment of the invention solves the problem of stale "off-the-run" series.

Traded Credit Products

The first part of the Adapted For Exchange New Credit Derivatives invention is the Traded Credit Product which makes full use of the three representations concept described in general terms above:—

The front office product is called the Traded Spread Product (TSP) that appears on trading and information systems is expressed in annualised basis points according to market convention. The quotation convention here is the one most suitable for showing this product's relationship to the spread between risky and riskless (i.e. government) debt. The Traded Spread Product can be traded as spot or forwards along the credit term structure.

The Internal Matching Product is basically the full de-annualised premium expressed in price percentage points and allows the simply creation of front office forwards using existing exchange implied book matching technology.

The back office product is the splitting of the Internal Matching Product into so called Credit Coupon Products (CCPs) for the clearing house etc. Credit Coupon Products are particularly suitable for making sure forward trades are margined efficiently.

There are many varieties of the Traded Credit Product depending on the protection exposure they yield if a credit event occurs i.e. depending on the Event Protection Products that are created by them. These include but are not limited to:—

Single name traded spreads
Industry standard indices and their sector indices
Nth to default baskets and standard indices
Tranched standard indices and synthetic CDOs
Resetting Indices However all these Traded Credit Products have basically the same structure.

When on exchange options of the above are also consider it becomes clear that Adapted For Exchange New Credit Derivatives can give dealers equally and possibly more comprehensive exposure to leveraged credits than does the existing ISDA based market.

Constituent Products Design Overview

Item 900 of FIG. 9 shows how a traded credit product might appear in the front office as a Traded Spread Product. Contract volume available on the bid and offer are not shown in the Figure but as with other exchange traded contracts the Traded Spread Product will have a standard notional unit of trading (e.g. $1 mln, € 1 mln etc).

The Traded Spread Products also obey a standard listing and expiry cycle. As the ISDA based market has already standardised to a large extent the appropriate listing cycle will mirror this i.e. ten years of products available for trading via March and September expiries plus one additional quarterly month so the nearest three expiry months are consecutive quarterly expiries. The market convention is that default protection expires on the twentieth calendar day of the expiry month or if such a day is not a business day on the next following business day.

Both the Internal Matching Products and Credit Coupon Products follow the same expiry cycle as the Traded Spread Products obey but include all consecutive quarterly expiries i.e. March, June, September and December and not just March and September plus one additional quarterly month expiry at the front of the curve.

In any exchange traded product concentration of liquidity is an important by-product of standardisation. One part of standardisation is the tick size which is the minimum price increment between different order price levels. The preferred embodiment of the Adapted For Exchange New Credit Derivatives invention has an orderbook tick size to help concentrate liquidity and displayed implied orders.

Two Step Implied Order Linkage in the Traded Spread Product

Consider a dealer interacting with the market as shown in FIG. 9 by lifting the 18.00 basis points per annum offer 25 times in the Mar-06 expiry. The dealer would be buying 169 days worth of protection from 3-Oct-05 to 20-Mar-06 on the relevant credit in $25 mln, assuming a standard notional unit of $1 mln. Conversely if the same dealer hit the 22.50 basis points per annum bid 25 times in the Sep-06 expiry they would have sold 353 days of protection in $25 mln. The dealer is then net neutral for the first 169 days but a seller of protection for the next 184 days i.e. he has sold the Mar-06/Sep-06 forward.

One of the stated advantages of the Adapted For Exchange New Credit Derivatives invention is that the product and trade systems designs will generate forwards automatically and hence help create a full credit term structure. This is achieved by harnessing in a novel way the implied order book technology already available for certain existing electronic futures exchanges via the mappings that will shortly be described below. Thus the dealer could have simply placed an order to hit the 26.50 bid also shown in FIG. 9 25 times to sell the same Mar-06/Sep-06 forward directly.

Unlike existing exchange traded products the orderbook tick size does not apply beyond front office orderbook purposes and in particular does not apply to filled orders. This allows the spot and forward markets in Traded Spread Products to be properly linked via the internal matching representation's implied orderbook. Thus if the dealer places the order to hit the Mar-06/Sep-06 forward directly as described above they would probably get an improvement to at least 26.633 (or better if it was available in the actual implied order book). The relevant mappings to achieve this will shortly be described below.

Traded Spread Product, Internal Matching Product, Credit Coupon Product and Associated Mappings The mappings that are part of the Traded Credit Product link the front office Traded Spread Product with the back office Credit Coupon Product via the Internal Matching Product as already described in general terms above. We now turn to specifics and describe these with reference to FIG. 8 where each mapping exists between the boundary of the three sub-products at points indicated by circles numbered 1-5.

Mapping 1—Inbound

Mapping 1 occurs at the numbered circle point 1 in FIG. 8.

Figure 10:
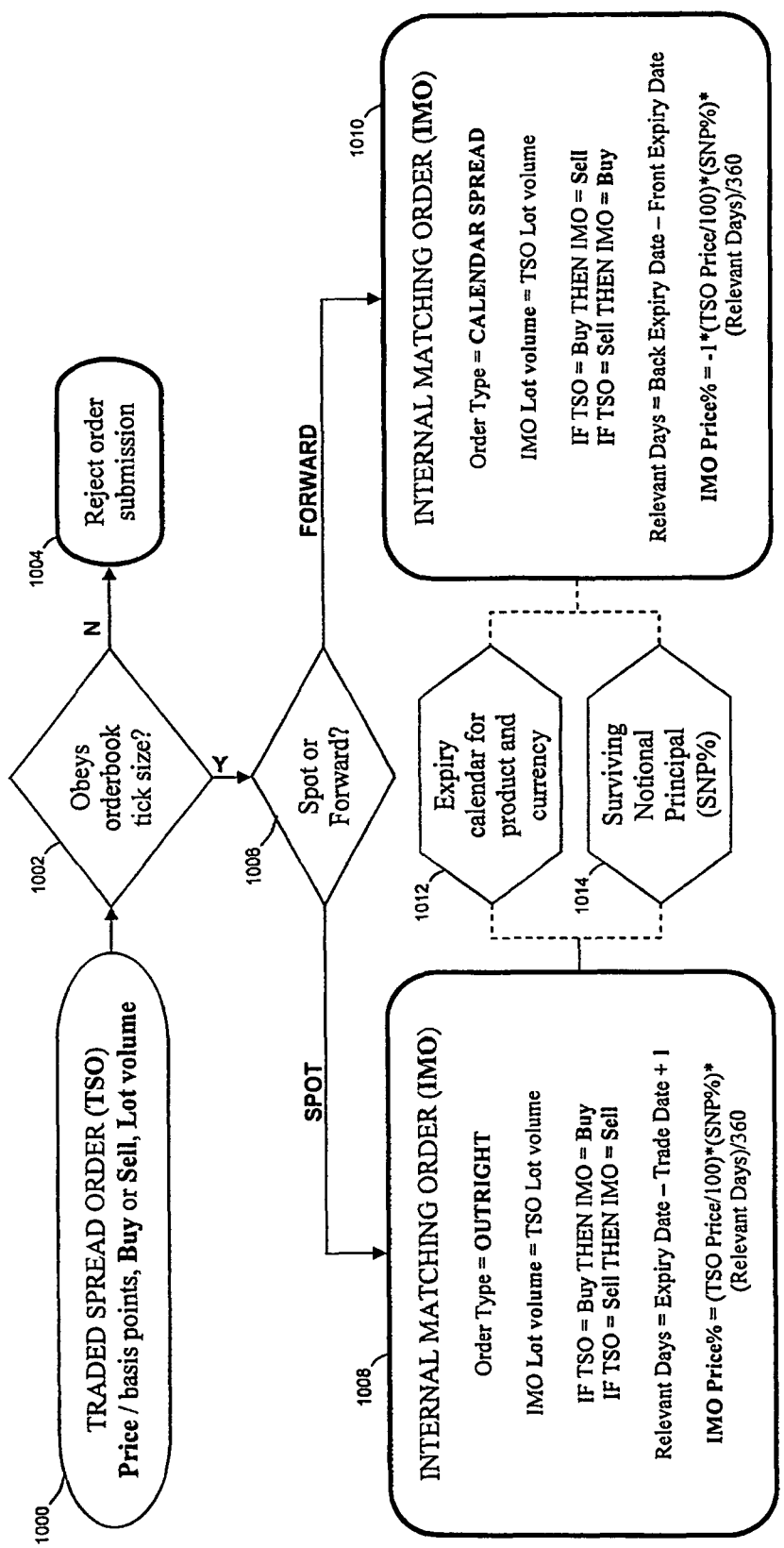
FIG. 10 shows the Adapted For Exchange New Credit Derivative invention mapping of Traded Spread Product orders onto Internal Matching Product orders.

FIG. 10 shows the details of the inbound mapping process as applied to the dealer's front office Traded Spread Product Orders (see 1000 of FIG. 10) which turns them into Internal Matching Product Orders (either 1008 or 1010 of FIG. 10). The first step consists of an initial check that the Traded Spread Product Order obeys the orderbook tick size as shown in branch point 1002 of FIG. 10 and if not the order is rejected as shown in endpoint 1004 of FIG. 10. If the orderbook tick size is legitimate there is next a branch point depending on whether the order is for the spot or a forward market (see 1006 of FIG. 10).

Traded Spread Product Orders (TSOs) that are spot orders are mapped onto outright Internal Matching Product Orders (IMOs) as outright orders and as follows (see 1008 of FIG. 10):—

IMO Lot volume=TSO Lot volume
IF TSO=Buy THEN IMO=Buy, ELSE
IF TSO=Sell THEN IMO=Sell
Define, Relevant Days=Expiry Date−Trade Date+1
IMO Price %=(TSO Price/100)*(SNP %)*(Relevant Days)/360

However Traded Spread Product Orders (TSOs) that are forward orders are mapped onto Internal Matching Product Orders (IMOs) as calendar spread strategy orders and as follows (see 1010 of FIG. 10):—

IMO Lot volume=TSO Lot volume
IF TSO=Buy THEN IMO=Sell, ELSE
IF TSO=Sell THEN IMO=Buy
Define, Relevant Days=Back Expiry Date−Front Expiry Date
IMO Price %=−1*(TSO Price/100)*(SNP %)*(Relevant Days)/360

The mappings have to be parameterised by the expiry dates of the products, the trade date and the Surviving Notional Principal (SNP) as stored in dynamic databases shown as 1012 and 1014 of FIG. 10 respectively. The SNP starts at 100% and drops after each notional credit event in the underlying basket or index. It is described in more detail later when we describe notional credit events. It is also not really relevant for the single name version of the Traded Credit Product where it can be taken to be 100% prior to a credit event having occurred and 0% after.

Mapping 1—Outbound Orderbook Reporting

Mapping 1 occurs at the numbered circle point 1 in FIG. 8.

Figure 11:
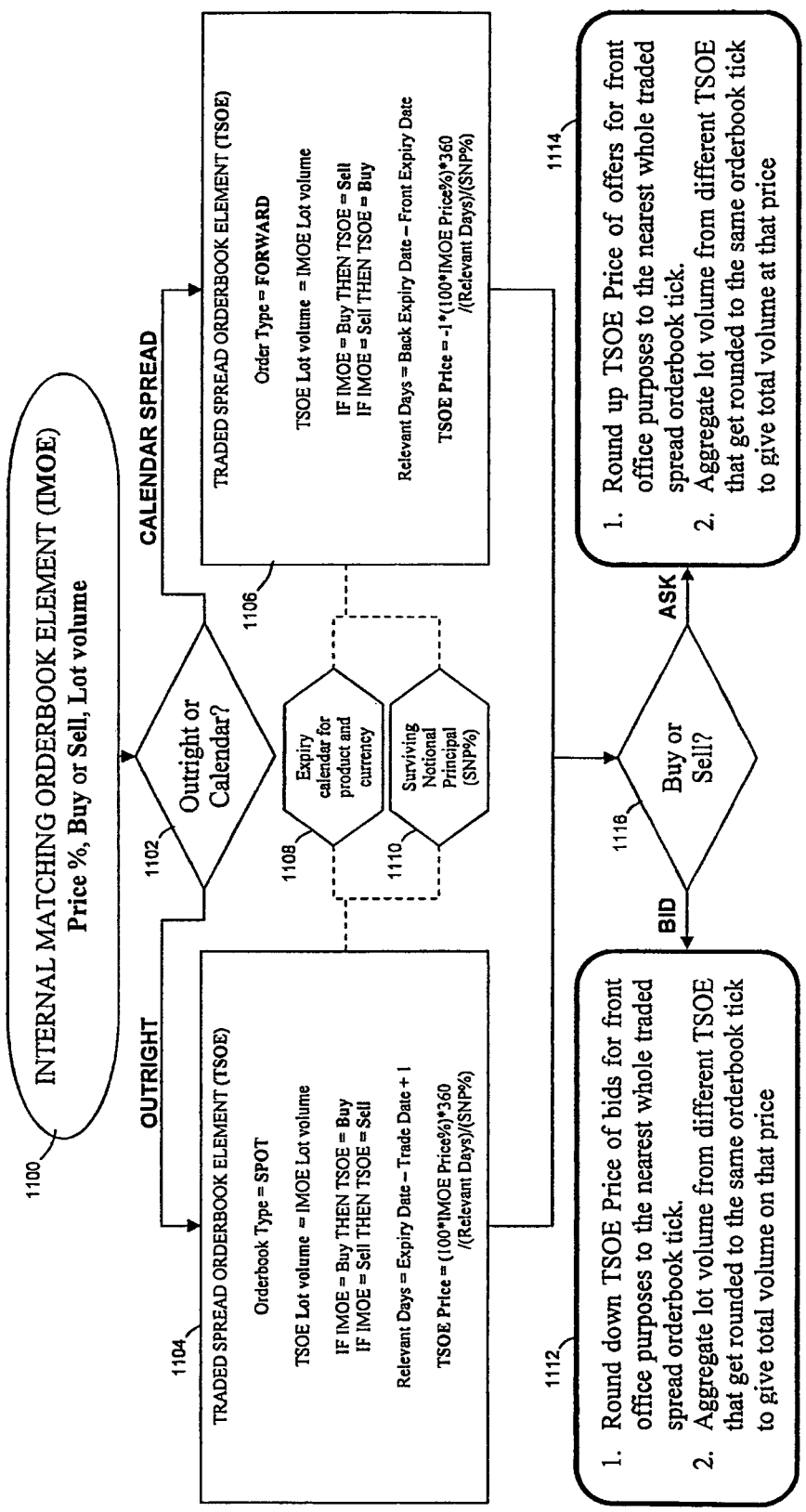
FIG. 11 shows the Adapted For Exchange New Credit Derivative invention mapping of Internal Matching Product orderbook for display as Traded Spread Product.

FIG. 11 shows the details of the outbound orderbook mapping which converts each Internal Matching Product Orderbook Element (see 1100 of FIG. 11) into a Traded Spread Product Orderbook Element (either 1112 or 1114 of FIG. 11) for display purposes.

The first step is a branch point depending on whether the orderbook element is an outright or a calendar spread strategy order (see 1102 of FIG. 11). This is because there is a different mapping depending on whether, an outright Internal Matching Product Orderbook Element (IMOE) is being converted into the relevant spot Traded Spread Product Orderbook Element (TSOE), see 1104 of FIG. 11:

TSOE Lot volume=IMOE Lot volume
IF IMOE=Buy THEN TSOE=Buy, ELSE
IF IMOE=Sell THEN TSOE=Sell
Define, Relevant Days=Expiry Date−Trade Date+1
TSOE Price=(100*IMOE Price %)*360/(Relevant Days)/(SNP %)

or whether a calendar spread Internal Matching Product Orderbook Element (IMOE) is being converted into the relevant forward Traded Spread Product Orderbook Element (TSOE), see 1106 of FIG. 11:—

TSOE Lot volume=IMOE Lot volume
IF IMOE=Buy THEN TSOE=Sell, ELSE
IF IMOE=Sell THEN TSOE=Buy
Relevant Days=Back Expiry Date−Front Expiry Date
TSOE Price=−1*(100*IMOE Price %)*360/(Relevant Days)/(SNP %)

As for the inbound mapping already described the two different mappings have to once again be parameterised by the expiry dates of the products, the trade date and the Surviving Notional Principal (SNP) as stored in dynamic databases shown as 1108 and 1110 of FIG. 11 respectively.

In either case there is a final rounding and aggregation step to make Traded Spread Product Orderbook Elements aggregate and appear to respect the orderbook tick size for front office display purposes which depends on whether the displayed orderbook element is a buy or a sell (see 1116 of FIG. 11). Bid prices are rounded down and volumes aggregated (see 1112 of FIG. 11):—

1. Round down the Traded Spread Product Orderbook Element price of bids for front office display purposes to the nearest whole traded spread orderbook tick.
2. Aggregate lot volume from different rounded Traded Spread Product Orderbook Elements if they have been rounded to the same front office display price to give total volume on that price Offer prices are rounded up and volumes aggregated (see 1114 of FIG. 11):—

1. Round up the Traded Spread Product Orderbook Element price of offers for front office display purposes to the nearest whole traded spread orderbook tick.
2. Aggregate lot volume from different rounded Traded Spread Product Orderbook Elements if they have been rounded to the same front office display price to give total volume at that price

Mapping 1—Outbound Filled Orders

Mapping 1 occurs at the numbered circle point 1 in FIG. 8.

Figure 12:
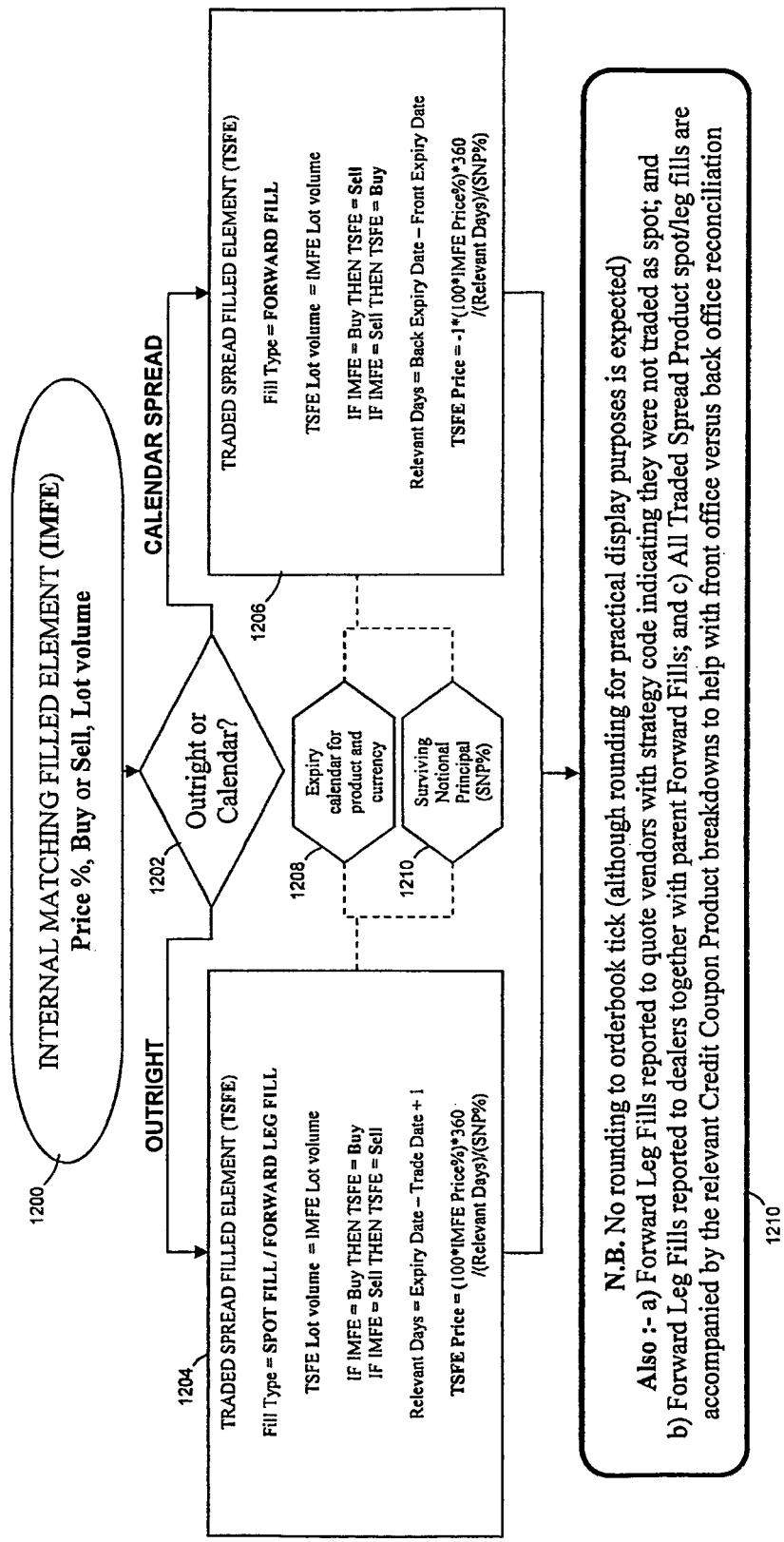
FIG. 12 shows the Adapted For Exchange New Credit Derivative invention mapping of Internal Matching Product fills into front office Traded Spread Product fills.

The outbound filled orders mapping converts order fills in the Internal Matching Product into front office fill reports in the Traded Spread Product. FIG. 12 shows the details of the outbound filled order mapping which converts each Internal Matching Filled Element (see 1200 of FIG. 12) into a Traded Spread Product fill (see 1210 of FIG. 12) for display purposes. It is essentially the same mapping as the outbound orderbook one minus the final rounding and aggregation step, but carrying additional information to help with front office versus back office reconciliation where relevant.

The first step is a branch point depending on whether the filled element is an outright or a calendar spread strategy order (see 1202 of FIG. 12). This is because there is a different mapping depending on whether, an outright Internal Matching Filled Element is being converted into the relevant spot Traded Spread Product Filled Element (see 1204 of FIG. 12), or whether a calendar spread Internal Matching Filled Element is being converted into the relevant forward Traded Spread Product Filled Element (see 1206 of FIG. 12). As for the other mapping already described both these mappings have to be parameterised by the expiry dates of the products, the trade date and the Surviving Notional Principal (SNP) as stored in dynamic databases shown as 1208 and 1210 of FIG. 12 respectively.

Mapping 2

Mapping 2 occurs at the numbered circle point 2 in FIG. 8.

This is identical to the first outbound mapping at numbered circle point 1 in FIG. 8 but for quote vendor screens. FIG. 11 shows the details.

Mapping 3

Mapping 3 occurs at the numbered circle point 3 in FIG. 8.

This is the conversion from the Internal Matching Product into the relevant back office Credit Coupon Products. It is typically a one to many mapping and is basically the splitting of the full de-annualised premium represented by the Internal Matching Product into an equal total premium value of Credit Coupon Products. As long as total premium value is unaltered by the split the details of the mapping do not actually matter too much.

Figure 13:
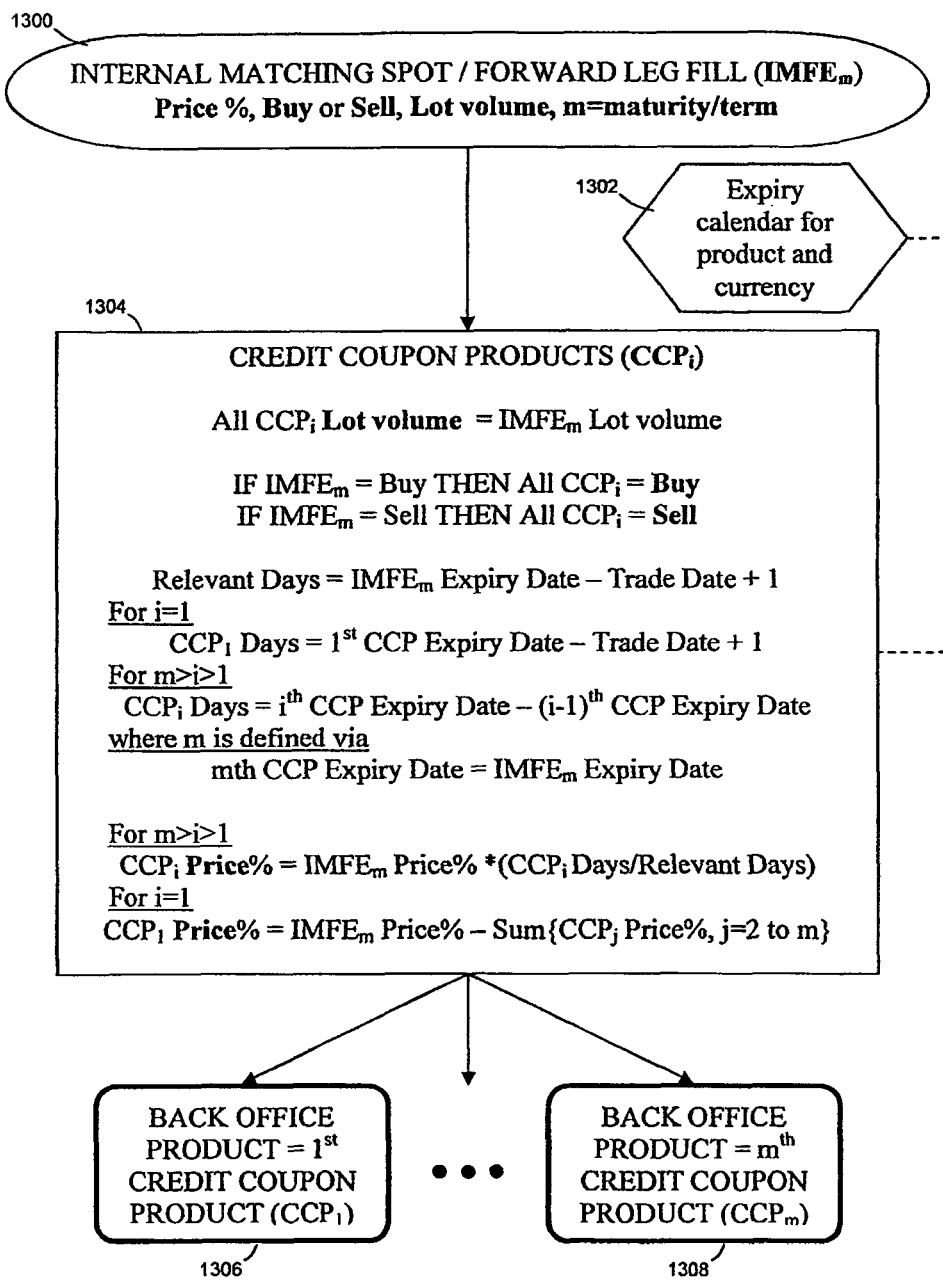
FIG. 13 shows the Adapted For Exchange New Credit Derivative invention flow diagram for pro rata Credit Coupon Product pricing breakdown.

FIG. 13 shows for example the pro rata Credit Coupon Product pricing breakdown converting the Internal Matching Filled Element shown as item 1300 in FIG. 13, into the relevant Credit Coupon Products shown as a set spanned by 1306 and 1308 in FIG. 13. The mapping itself is detailed in module 1304 in FIG. 13 which is parameterised as usual by the expiry dates of the products and the trade date as stored in database shown as 1302 in FIG. 13, the Surviving Notional Principal (SNP) having been already incorporated indirectly at time of matching. The advantage of this technique is that partial fills of Traded Spread Product Orders will all have the same leg prices for their respective Credit Coupon Products.

Figure 14:
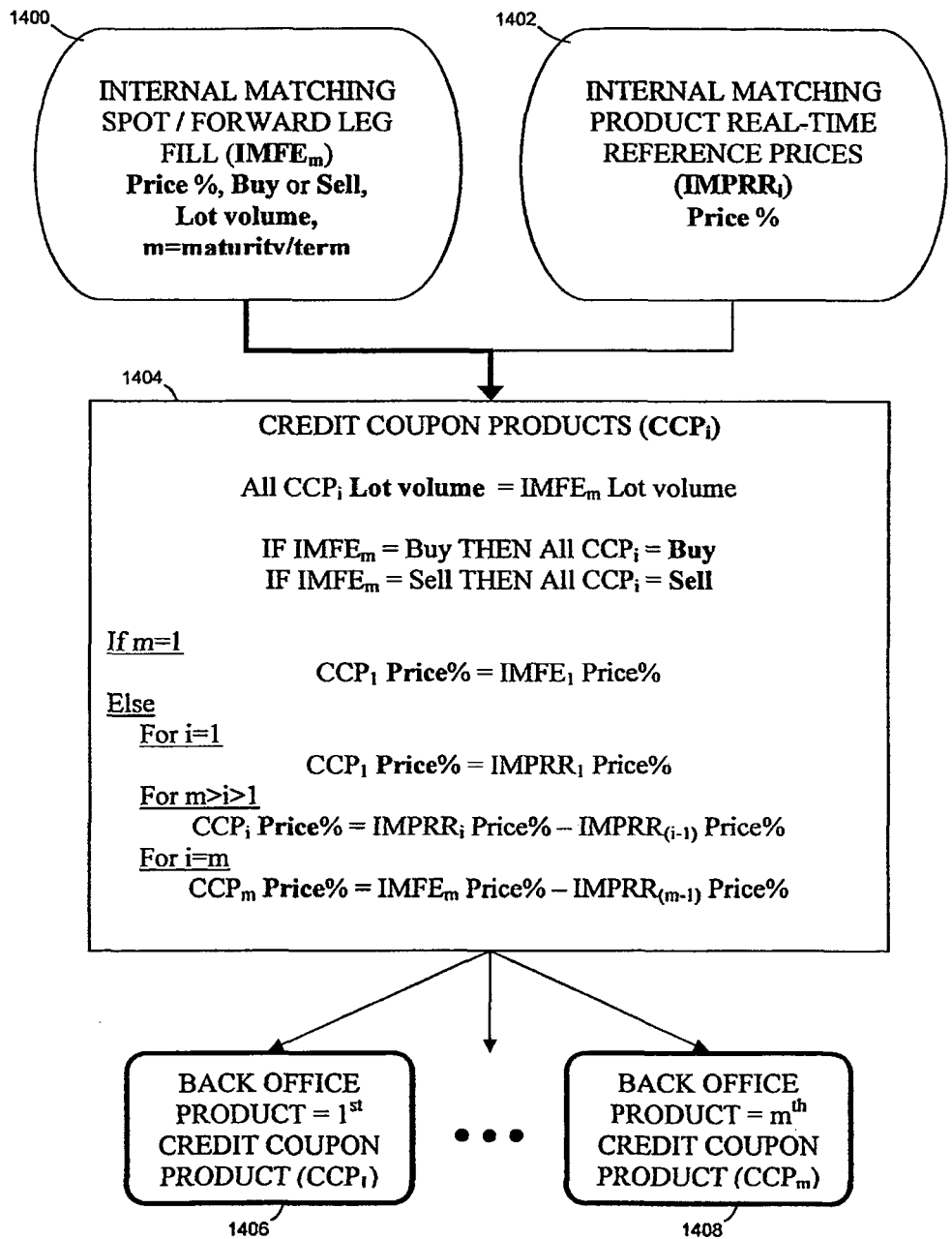
FIG. 14 shows the Adapted For Exchange New Credit Derivative invention flow diagram for Credit Coupon Product pricing breakdown from market prices.

If a sequence of instantaneous reference prices is available from the matching engine and that sequence covers the whole Credit Coupon Product sequence (possibly using interpolation) then the pricing breakdown method shown in FIG. 14 can be applied instead. This more advanced technique converts the Internal Matching Filled Element shown as item 1400 in FIG. 14, into the relevant Credit Coupon Products shown as a set spanned by 1406 and 1408 in FIG. 14. The mapping itself is detailed in module 1404 in FIG. 14 and is parameterised by the sequence of real-time reference prices shown as 1402 in FIG. 14, which already incorporated indirectly the expiry dates of the products, the trade date and the Surviving Notional Principal as they are related to the current Traded Spread Product market in the same way that daily settlement prices are related to the Traded Spread Product market on the close, see Mapping 5 below. The advantage of this technique is that traded leg prices for Credit Coupon Products will show less scatter and hence contain information suitable for front office predictive and historical analysis.

Mapping 4

Mapping 4 occurs at the numbered circle point 4 in FIG. 8.

This is identical to the inbound mapping at numbered circle point 1 followed immediately by the mapping at numbered circle point 3 in FIG. 8. It is used to convert wholesale trades agreed over the telephone into the back office representation directly.

Mapping 5

Mapping 5 occurs at the numbered circle point 5 in FIG. 8.

Figure 15:
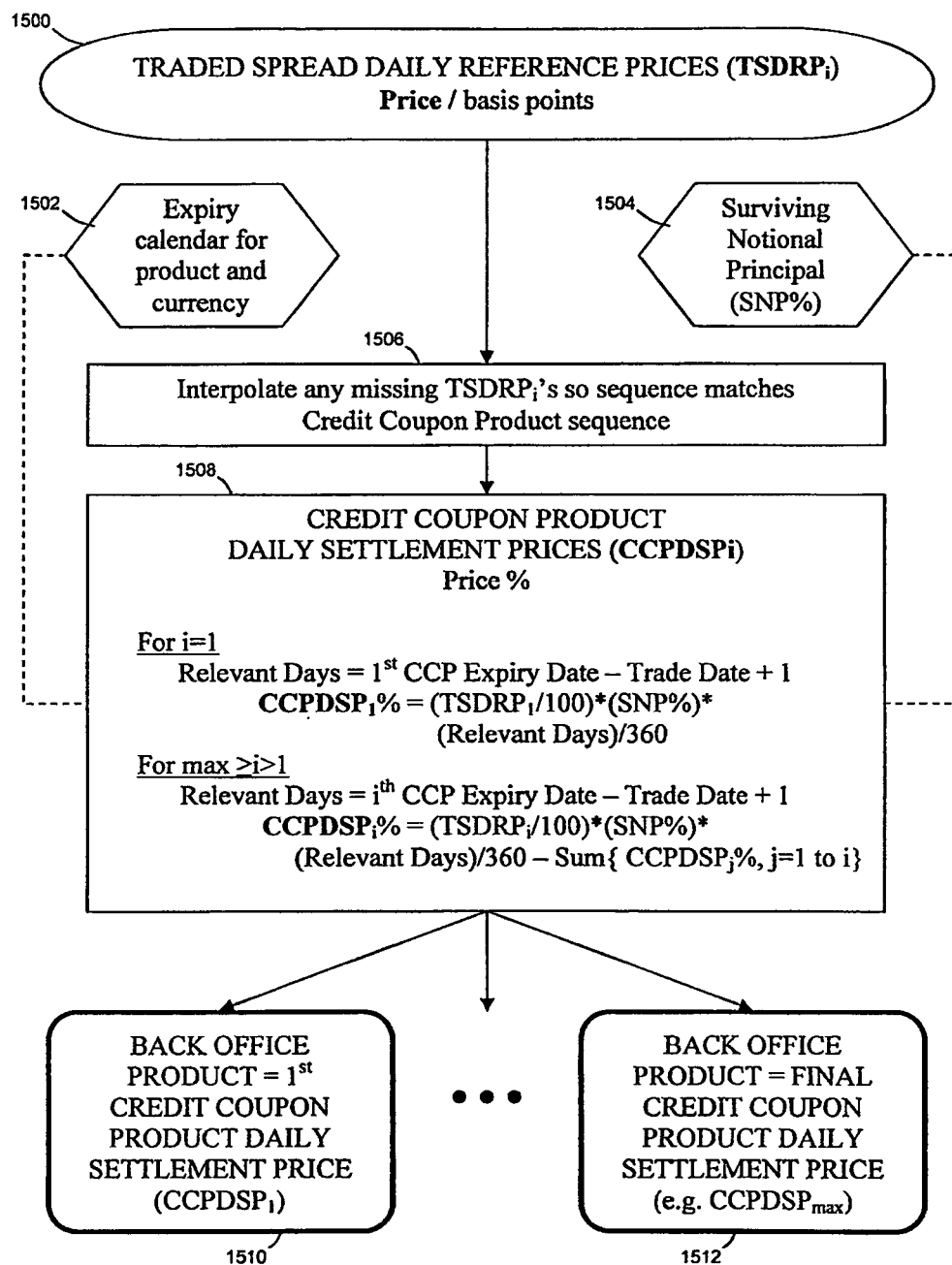
FIG. 15 shows the Adapted For Exchange New Credit Derivative invention flow diagram for Credit Coupon Product daily settlement calculation.

FIG. 15 shows the details of the mapping which converts of the set of front office Traded Spread Product Daily Reference Prices (TSDRP$_i$) as set by the market supervisor (see 1500 in FIG. 15) into the actual back office Credit Coupon Product daily settlement prices (CCPDSP$_i$) needed for variation margin calls (shown as spanned by 1510 through to 1512 in FIG. 15). The Traded Spread Product daily reference prices do not need to respect the orderbook tick size. The conversion mapping is of course once again parameterised by the expiry dates of the products, the trade date and the Surviving Notional Principal (SNP) as stored in dynamic databases shown as 1502 and 1504 of FIG. 15 respectively.

The first step is to interpolate any missing TSDRPi's so the expiry sequence matches Credit Coupon Product sequence (see 1506 in FIG. 15). This is needed as most June or December expiries are not listed for front office or matching purposes in the preferred embodiments of the invention.

The mapping itself is shown as module 1506 in FIG. 15. Thus for the first quarterly expiry (i=1):—

Relevant Days=1 st CCP Expiry Date−Trade Date+1

CCPDSP$_1$%=(TSDRP$_1$/100)*(SNP %)*(Relevant Days)/360

Whilst for all other quarterly expiries up to the maximum listed

Relevant Days=ith CCP Expiry Date−Trade Date+1

CCPDSP$_i$%=(TSDRP$_i$/100)*(SNP %)*(Relevant Days)/360−Sum{CCPDSP$_j$%, j=1 to i}

The mapping is essentially a bootstrapping combination of the inbound mapping at numbered circle point 1 and the FIG. 14 version of the mapping at numbered circle point 4 in FIG. 8 including an initial interpolation step to ensure a full sequence of Traded Spread Product settlement prices is available.

Daily Remapping of GTC Orders

This mapping occurs within the matching engine and its associated databases.

Because the mappings linking Traded Spread Product orders with Internal Matching Product orders are parameterised by the expiry date of the products, the trade date and the Surviving Notional Principal the persistence of Good Till Cancelled (GTC) Traded Spread Product orders must be handled carefully. Specifically these orders should be stored overnight in their Traded Spread Product order format and remapped into Internal Matching Product orders with the revised daily parameters prior to the open of each following trading day.

Expiry of Credit Coupon Product

Each Credit Coupon Product is a cash settled product (see FIG. 5) but with the unique feature that its Expiry Day Settlement Price (see 506 of FIG. 5) is predefined to be exactly zero and not linked by a formula to any external underlying market fixing. The Credit Coupon Product's value arises from the fact that it confers ownership rights of Event Protection Products that are created in order to generate efficient credit protection if there is a credit event. We discuss these Event Protection Products and Processes in the next section.

Event Protection Products and Processes

The second part of the Adapted For Exchange New Credit Derivatives invention is formed from the event protection products and processes which generate credit protection far more efficiently than the existing ISDA based market. These are shown schematically in overview in FIG. 16.

Credit Event Committee and the calling of Notional Credit Events etc

The Adapted For Exchange New Credit Derivatives invention depends on certain key product management processes namely the Credit Event Committee (CEC) (see 1600 of FIG. 16) and the Notional Credit Events (NCEs) (see 1604 of FIG. 16) it calls.

The Credit Event Committee is a body established by the Exchange in cooperation with significant market participants in a) the existing ISDA based market such as the shareholder banks of the IIC and CDS Index Co; and b) the Adapted For Exchange New Credit Derivatives made possible by the invention.

Figure 16:
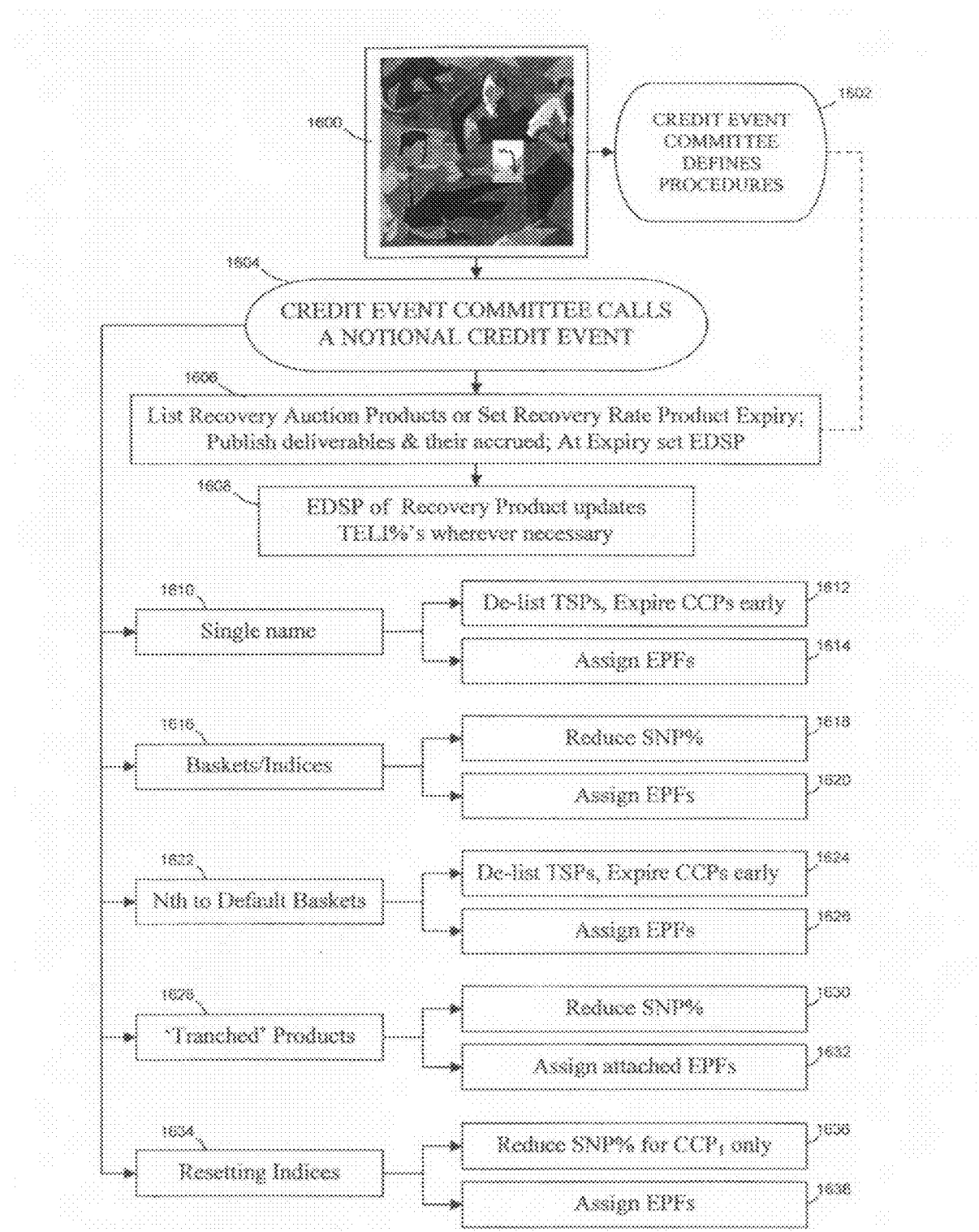
FIG. 16 shows a schematic overview of the event protection products and processes which generate credit protection within the Adapted For Exchange New Credit Derivative invention, including the calling of a notional credit event and its consequences.

The Credit Event Committee will generate and from time to time revise its own definitions, rules and principles concerning credit events that are nonetheless analogous to those existing in the current ISDA Credit Derivatives Definitions document (see 1602 of FIG. 16).

The Credit Event Committee in cooperation with open interest holders continuously monitor the entities referenced by Traded Credit Products listed on the Exchange and its Clearing House. By use of its own definitions, rules and principles concerning credit events but in any case entirely at its own discretion the Credit Event Committee will decide if and when a Notional Credit Event has been triggered (see 1604 of FIG. 16).

The Notional Credit Event decision is defined as final in the contract specification and cannot be changed. Dealers are generally aware of the fact, but in any case are obliged by the contract specification to accept the risk, that Notional Credit Events and "real" (or ISDA defined) credit events are technically distinct.

Since by the act of trading on Exchange dealers accept the risk that a Notional Credit Event may be called by the Credit Event Committee "inappropriately" the Adapted For Exchange New Credit Derivatives invention does not allow for legal challenges arising from the details of such credit events. This is a highly significant advantage over the existing ISDA based market but does put a heavy onus on the Credit Event Committee to develop a strong reputation as a trusted "calculating agent" of whether a credit event has occurred.

It should also be noted that the use of the Credit Event Committee as a central authority to call a Notional Credit Events is operationally far more efficient than the bilateral manual exercise of rights after a credit event that exists in the current ISDA based market. Since there can be several different Traded Credit Products listed on a single referenced entity, a single Notional Credit Event can affect a group of distinct products listed on the Exchange and its Clearing House in a consistent way (see for example products 1606, 1610, 1616, 1622, 1628 and 1634 of FIG. 16). This is also far more operationally efficient than existing ISDA based market.

The Credit Event Committee's definitions, rules and principles (see 1602 of FIG. 16) will also explain how the list of deliverables is set for the Recovery Auction Product or Recovery Rate Product (see 1606 of FIG. 16) as described below following a Notional Credit Event (see 1604 of FIG. 16). Thus the committee also acts as a trusted third party "calculating agent" for consequent obligations of derivative position holders after an event is called. By contrast the bilaterally negotiated ISDA based market places strong emphasis and often redundant effort in predefining reference obligations for what in practice often turn out to be strictly operational rather than economic purposes. This represents another important advantage of the Adapted For Exchange New Credit Derivatives invention over the existing market structure.

Consequences of Notional Credit Events

Regardless at what time of day a Notional Credit Events is announced in the preferred embodiment nothing happens until overnight after the market shuts normally. There are three immediate consequences of a Notional Credit Event:— a. The assignment of the correct number and type of Event Protection Futures (EPFs) to each effective Credit Coupon Product holder (see for example products 1614, 1620, 1626, 1632 and 1638 of FIG. 16); and b. The de-listing where relevant of Traded Spread Products with a final mark to market of the corresponding effective Credit Coupon Product to exactly zero with the others knocking out (see 1612 and 1624 of FIG. 16); and c. The reduction of each Surviving Notional Principal (SNP) number for each basket, index, sector index or synthetic CDO that includes the relevant reference entity (see for example products 1618, 1630 and 1636 of FIG. 16). Thus a Notional Credit Event one name from within an equally weighted 125 name index will result in that index's SNP dropping by $0.8\%=\frac{1}{125}^{th}$ e.g. from 100% to 99.2%.

Figure 7:
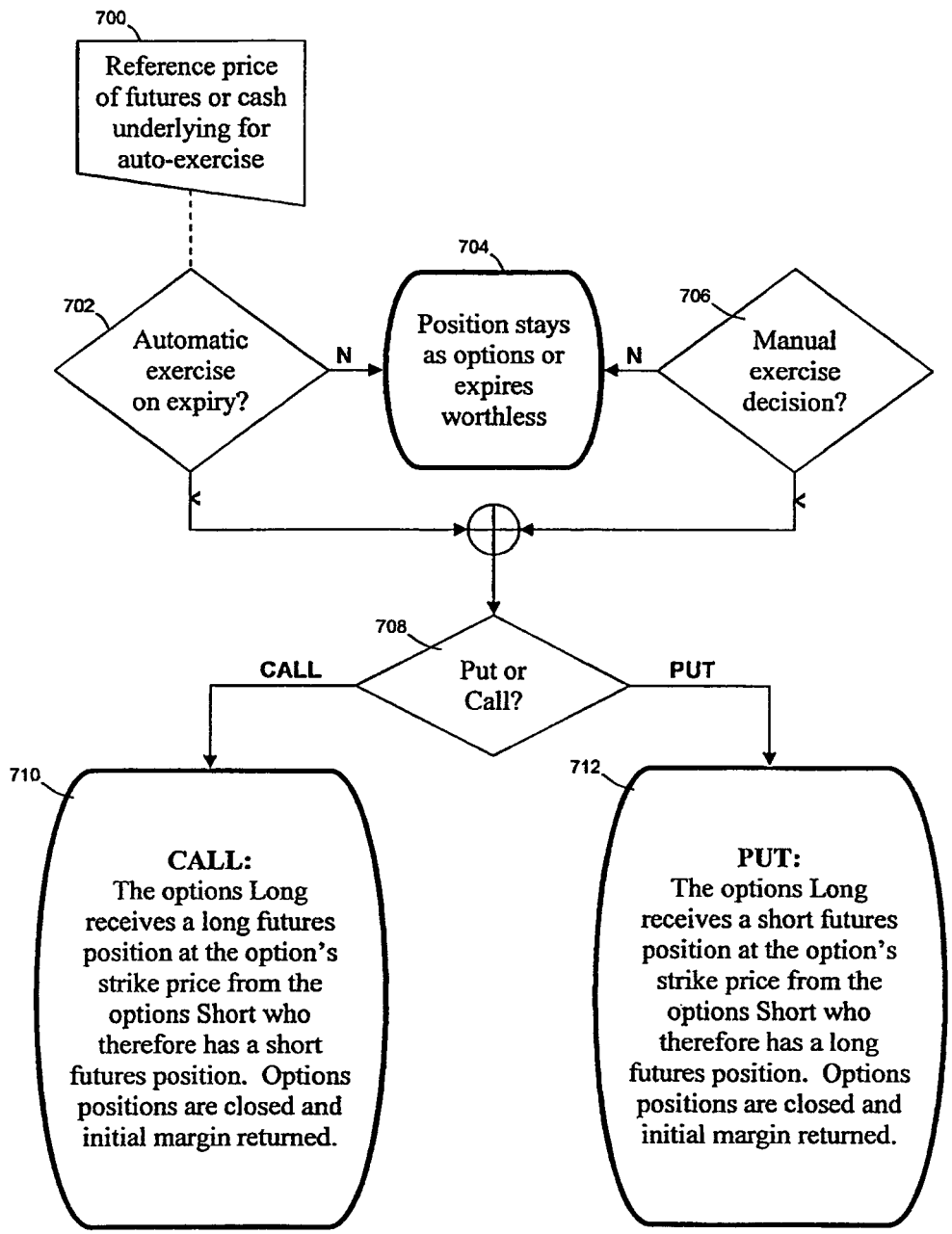
FIG. 7 is a flow diagram representing existing physical delivery into futures of exchange traded American options.

The role of the Credit Event Committee's as a trusted third party "calculating agent" may be contrasted against automatic options exercise in the existing exchange traded futures and options market (see FIG. 7) where the exchange acts as "calculating agent" of the reference prices (see 700 of FIG. 7), which though a far simpler calculation is nonetheless the closest analogous process prior to the present invention Assignment of Event Protection Future Event Protection Futures are cash settled products (see FIG. 5) with the unique feature that Expiry Day Settlement Price (see 506 of FIG. 5) is defined with reference to another physically delivered exchange traded product namely the Recovery Auction or Rate Product (see 1606 of FIG. 16).

The exact EDSP formulae will be explained in a later section but here we discuss the assignment process. Event Protection Futures positions are only ever assigned to the 'effective' Credit Coupon Product i.e. to the front expiry on the day the Notional Credit Event is called. Holders of long positions in the effective Credit Coupon Product receive long positions in Event Protection Futures from the holders of short positions in the effective Credit Coupon Product who take the corresponding short positions in Event Protection Futures. The Event Protection Futures are assigned at zero price on the day after the Notional Credit Event is called. These facts have important consequences for margin efficiency which we will discuss in due course.

The assignment of the correct number of Event Protection Futures to each effective Credit Coupon Product is based on the notional size of contracts and the weight of the reference entity in the basket underlying the particular Credit Coupon Product (obviously the weight=100% for single names):

Number of EPFs long=Number of effective CCP lots long*weight*Notional CCP lot size/Notional EPF size In the case of an equally weighted 125 name index, the reference entity weight would be 0.8% of original notional for each name within the index. Assuming a standard notional unit of $1 mln for the Credit Coupon Product and $1,000 for the Event Protection Futures, we can see that 8 lots of Event Protection Futures will be assigned to every 1 lot of Credit Coupon Product on the day after the Notional Credit Event occurs.

The overnight assignment of Event Protection Futures to each effective Credit Coupon Product is an important design feature that allows next day trading of basket Traded Spread Product 'clean' of the Notional Credit Event.

Recovery Auction Product

Figure 6:
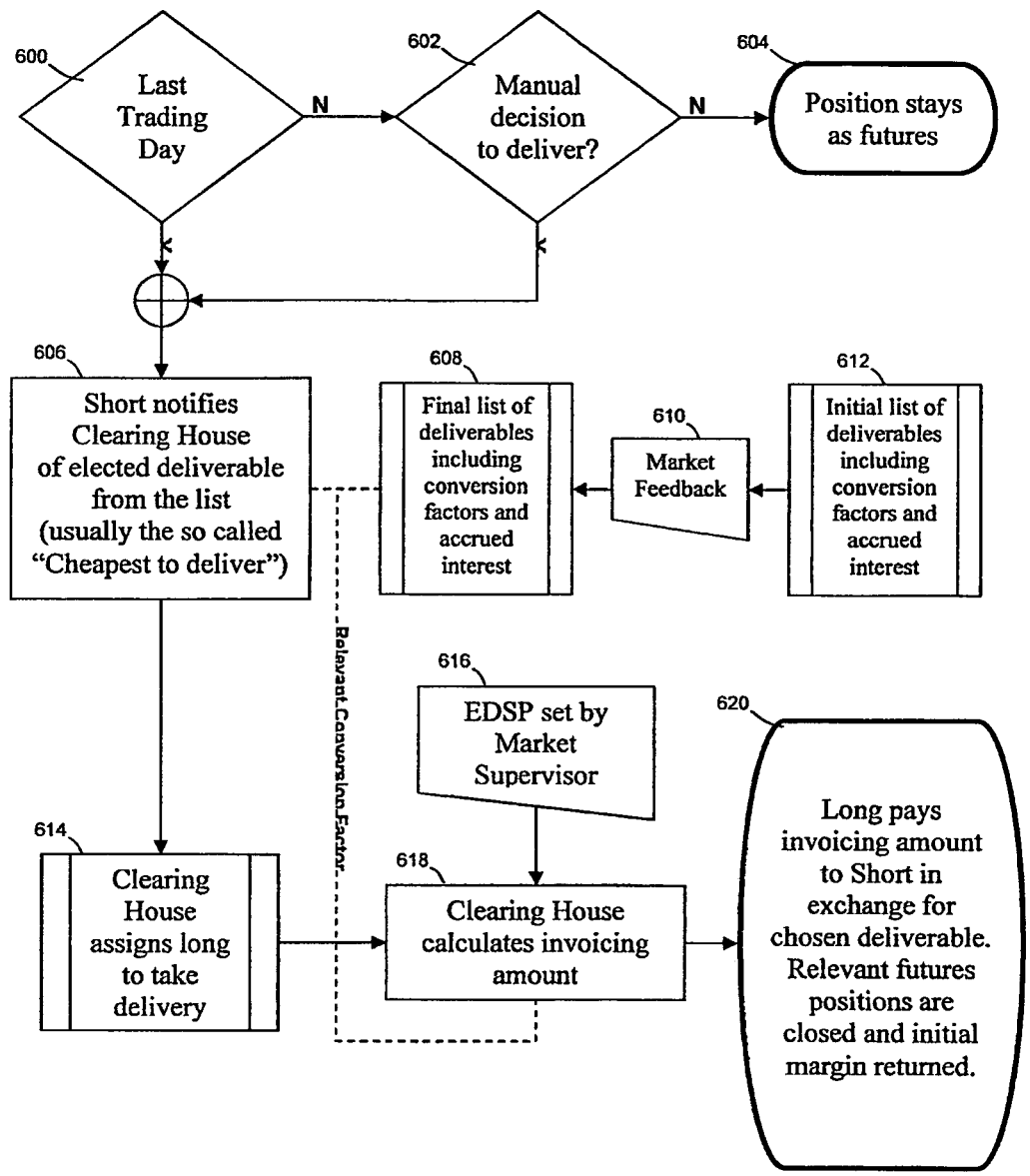
FIG. 6 is a flow diagram representing the physical delivery process for exchange traded futures as used for existing bond futures.

A Recovery Auction Product is a bond-like physically delivered exchange traded product (see FIG. 6). Unusual features include the fact that the Recovery Auction Product a) is listed only as a result of a Notional Credit Event; and b) is listed for only a short single trading day a fixed number of business days after the Notional Credit Event; and c) can in principle contain loans in its list of deliverables as well as bonds; and d) has all the conversion factors in its list of deliverables set to exactly 1.

The initial list of deliverables with accrued interest (see 612 of FIG. 6) is published as soon as possible after the Notional Credit Event (see 1604 of FIG. 16) is announced and the final list of deliverables with accrued interest (see 608 of FIG. 6) is published the day before the Recovery Auction Product is listed for trading. Indeed the fixed number of business days after the Notional Credit Event defining when a Recovery Auction Product is listed for trading will have been set in cooperation with the market by the Credit Event Committee in its definitions, rules and principles (see 1602 of FIG. 16) concerning credit events so as to allow sufficient time for market feedback (see 610 of FIG. 6).

The deliverability of loans will be discussed as part of the details of the clearing house securities part of the invention section below.

The Exchange Delivery Settlement Price for a Recovery Auction Product may be used to cash settle Event Protection Futures (the products assigned at 1614, 1620, 1626, 1632 and 1638 in FIG. 16) either directly or for certain basket products indirectly via Total Event Loss Indices (see 1608 of FIG. 16) as described in detail below.

Recovery Rate Product

The Recovery Rate Product is a variant of the Recovery Auction Product that is listed for trading even before a Notional Credit Event and has no pre-set expiry date. The Recovery Rate Product's expiry date only becomes set after a Notional Credit Event happens according to the definitions, rules and principles concerning credit events as laid down by the Credit Event Committee from time to time.

As with Recovery Auction Products the initial and then the final list of deliverables for The Recovery Rate Product are only announced after the Notional Credit Event but always so as to allow sufficient time for market feedback.

Where an pre-existing Recovery Rate Product is already listed The Exchange Delivery Settlement Price needed to provide fair cash settlement Event Protection Futures will be set by reference to that existing product and no Recovery Auction Product need be listed.

EDSP of Event Protection Futures

There are two kinds Event Protection Futures known as the Standard and Attached forms.

Standard Event Protection Futures (SEPF) are designed to give full protection and are delivered into non-tranched Traded Credit Products. Their EDSP (see 506 of FIG. 5) is given by:—

SEPF EDSP=Max(100−EDSP of Recovery Product, 0)

in which the Max function serves to prevent the Event Protection Futures ever giving negative protection.

By contrast an Attached Event Protection Future is designed to give protection only after a certain threshold of principal has been exposed to loss for the underlying basket, index, sector index or synthetic CDO. Because of these thresholds we will now need to define a Total Event Loss Index (TELI) number for each index or basket etc for which thresholds will be relevant.

Total Event Loss Indices depend on the historic EDSPs of the Recovery Auction or Rate Products referenced by each index or basket etc as shown schematically in item 1608 of FIG. 16. When a new basket is officially launched its TELI starts at 0% and is just the sum of the Max(100−EDSP of Recovery Product, 0) terms already described above multiplied by the weight of the relevant reference entity in the basket for all the Recovery Auction or Rate Products that have occurred since the basket's launch i.e.

TELI for basket=Sum{Max(100−EDSP of Recovery Product, 0)*weight of entity}

The TELI is used as described in detail below.

For Attached Event Protection Future the threshold is known as the attachment point. Their EDSP (see 506 of FIG. 5) is given by:

AEPF EDSP for basket=Max(new TELI−Max(Attachment Point, old TELI), 0)/weight of reference entity in the basket in which The old TELI is just the Total Event Loss Index as it stood before the latest Recovery Auction or Rate Product EDSP whilst the new TELI includes the latest Recovery Auction or Rate Product EDSP.

Once the old TELI exceeds the attachment point the Attached Event Protection Future behaves exactly like a Standard Event Protection Future so under these circumstances the preferred embodiment of the Adapted For Exchange New Credit Derivatives invention will allow the clearing house to net off standard Traded Credit Products and the relevant attached Traded Credit Products for margin efficiency.

In the current ISDA based market tranched products are very common. A tranched product has both an attachment point and a detachment point which is a threshold above which protection ceases. We have described only Attached Event Protection Futures as this is the preferred embodiment of the invention with tranched products being created from long versus short spread positions of attached products with different attachment points. Attached Event Protection Futures will therefore delivered into both attached and tranched Traded Credit Products.

Varieties of Adapted for Exchange New Credit Derivatives

As already stated there are many varieties of the Traded Credit Product depending on the protection exposure they yield if a credit event occurs i.e. depending on the Event Protection Products that are created by them. There are also some useful variants of the Recovery Rate Product to consider. The following is a survey of some of these different kinds of product.

Single Name Traded Credit Products

Single name Credit Default Swaps form the majority of trading activity in the existing ISDA based market. Single name Traded Spread Products will be de-listed after a Notional Credit Event in the reference name, Standard Event Protection Futures will be delivered against the relevant effective Credit Coupon Product positions and all effective Credit Coupon Products will be expired early with EDSP set to exactly zero as usual, with the others knocking out. After the fixed number of business days defined in the Credit Event Committee's definitions, rules and principles the Recovery Auction or Rate Product will expire and the required EDSP will be set.

Explicit Name Recovery Rate Products

In today's existing OTC market participants have tried to create an active market in so called recovery swaps to meet genuine hedging need but trading has failed to take off due to design and market structure issues. Explicit Name Recovery Rate Products are simply Recovery Rate Products as already described previously for which the underlying reference entity is fully specified explicitly at time of listing. These products and especially the options on them described below should better meet the needs of hedgers than the existing moribund recovery swaps market.

Standard Index and Sector Traded Credit Products

An obvious first application of the Adapted For Exchange New Credit Derivatives invention would be the listing of indices such as the Dow Jones CDX North America and iTraxx Europe.

A probable next step would be to list sub-sectors of these indices i.e. Autos, Consumer cyclicals, Consumer non-cyclicals, Energy, Industrials, Financials, Non-Financials and TMT. In the preferred embodiment of the invention sector Traded Credit Products would have notional contract sizes commensurate with the main index of which they form a part in order to facilitate spread trading. Thus for example a 1 lot short main index position versus a full set of 1 lot long sub-sector indices would carry zero event risk by design and would attract minimal or zero initial margin.

Index and sub-index Traded Credit Products will have their Surviving Notional Principal number reduced appropriately after a Notional Credit Event in a relevant reference entity and Standard Event Protection Futures will be delivered against the relevant effective Credit Coupon Product positions. After the fixed number of business days defined in the Credit Event Committee's definitions, rules and principles the Recovery Auction or Rate Product will expire and the required EDSP will be set.

Nth to Default Basket Traded Credit Products $1^{st}$ to default, $2^{nd}$ to default, $3^{rd}$ to default etc Traded Credit Products on baskets or indices of reference entities are common in the existing ISDA based market. They can of course just as easily be traded by application of the Adapted For Exchange New Credit Derivatives invention.

For an equally weighted index the different $N^{th}$ to default Traded Credit Products will have predefined Surviving Notional Principal numbers from when they were first listed. For example for $N^{th}$ to default Traded Credit Products on an equally weighted 125 name index the $1^{st}$ to default Traded Credit Products will have an SNP of 100%, the $2^{nd}$ to default Traded Credit Products will have an SNP of 99.2%, the $3^{rd}$ to default Traded Credit Products will have an SNP of 98.4%, etc.

After a Notional Credit Event in the $N^{th}$ relevant reference entity the $N^{th}$ to default Traded Spread Products will be de-listed, Standard Event Protection Futures will be delivered against the relevant effective Credit Coupon Product positions and all effective Credit Coupon Products will be expired early with EDSP set to exactly zero as usual, with the others knocking out. After the fixed number of business days defined in the Credit Event Committee's definitions, rules and principles the Recovery Auction or Rate Product will expire and the required EDSP will be set.

Tranched Index and Synthetic CDO Traded Credit Products

Synthetic CDOs were discussed in the background to the invention section and are clearly closely related to tranched index products. A full discussion of CDOs will be included as part of the details of the clearing house securities part of the invention section below.

The preferred embodiment of the invention has tranched Traded Credit Products being created from long versus short spread positions of Attached Traded Credit Products with different attachment points.

The index or sub-index on which Attached Traded Credit Products are listed will have its Surviving Notional Principal number reduced appropriately after a Notional Credit Event in a relevant reference entity. Also Attached Event Protection Futures appropriate to the defined attachment point will be delivered against the relevant effective Attached Credit Coupon Product positions. After the fixed number of business days defined in the Credit Event Committee's definitions, rules and principles the Recovery Auction or Rate Product will expire and the required EDSP will be set. This will be used to update the index or sub-index Total Event Loss Index number allowing the Attached Event Protection Futures to cash settle to their EDSP. Finally if the new Total Event Loss Index number exceeds the attachment point for listed Attached Traded Credit Products the clearing house will de-list them transferring all open Attached Credit Coupon Product positions and GTC orders into standard Traded Credit Products and allow netting to occur where possible.

Resetting Index Traded Credit Products

Every six months the bulk of the existing ISDA based index market is encouraged by market makers to roll from one index series to the next one. However not all positions are in fact rolled leading to older "off-the-run" series having to be operationally maintained in risk management systems etc until these stale positions expire. This costs resources for little practical benefit.

One embodiment of the invention is called the Resetting Index Traded Credit Product and solves the problem of stale off-the-run series by defining an index's current constituent names plus substitutes in the event of names dropping out after Notional Credit Events. As the old effective Resetting Index Credit Coupon Product expires the next effective Resetting Index Credit Coupon Product will reference the index's composition as it existed on at this date. Thus underlying index remains undefined until the effective date and is not set in advance on the date that the index was first created.

This Resetting Index Traded Credit Product will thus automatically keep track of changes in the index composition and will not need to be rolled. The design means that the Surviving Notional Principal number will only apply to mappings involving the effective Credit Coupon Product with all other Resetting Index Credit Coupon Products using 100% instead of the Surviving Notional Principal number. Also the Surviving Notional Principal number will be reset to 100% as each new effective Credit Coupon Product is finally referenced to the index's composition on its effective date. Otherwise this type of index product and its sub-sectors behave just like standard indices.

Tranched and $N^{Th}$ to Default Products

Tranched products are not really possible with the Resetting Index Traded Credit Product design but variants of $N^{th}$ to default products are.

Implicit Name Recovery Rate Products

In today's existing OTC market participants have tried to create an active market in so called recovery swaps to meet genuine hedging need but trading has failed to take off due to design and market structure issues. The market has certainly not evolved beyond the point where the underlying reference entity is not full defined and only known implicitly at time of trade. However we anticipate a hedging need for traders of $N^{th}$ to default Traded Credit Products on baskets or indices of reference entities. Implicit Name Recovery Rate Products are therefore Recovery Rate Products as already described previously for which the underlying reference entity is not fully specified at time of listing. For example using a $1^{st}$ to default Recovery Rate Product will allow traders to take a view on the recovery rate of the first reference entity to default within a given basket or index or sector index etc. These products and especially the options on them described below should better meet the needs of hedgers than the existing moribund recovery swaps market.

Traded Spread Options

Options on the Traded Spread Product are another possible extension of the listing of Traded Credit Products. Of the possible designs both cash settled and deliverable European style options on forward Resetting Index Traded Spreads (or equivalently on options referencing the index's composition as prevailing at expiry) are likely to be attractive to the market as they neither suffer from adverse premium loss after or excess volatility just before a Notional Credit Event in a relevant reference entity is announced.

Traded Spread Premium Protected Options

Similarly so called Premium Protected Knock Out Options on single name Traded Credit Products should be popular because of the premium return feature. As with normal options the time value component of the premium will decay as expiry approach whilst the intrinsic value will be a function of the prevailing spread. These products are designed to cope with the complication that after a credit event a single name Traded Spread Product effectively ceases to exist and is replaced by its corresponding Event Protection Future. There is therefore a 'knock out' if a credit event occurs in the referenced entity but as the name implies for Premium Protected Options no premium is lost at this point as a result of the knock out. This can be achieved in the exchange listed environment because Premium Protected Options can be traded in margined premium and not premium paid format there. Specifically the Premium Protected Knock Out Options simply expires early with no further variation margin calls being imposed, rather than the final variation margin call to zero that would be expected in a more traditional knock out variety.

Contingent Exercise Recovery Rate Options

Another potentially very popular product will be Recovery Rate Options. These have a new event contingent exercise style similar to European style options but with the exercise date left undefined unless a notional credit event occurs. If a relevant notional credit event occurs prior to option expiry, the Recovery Rate Option resets its exercise date and expiry date to be the same as the expiry date set for its underlying Recovery Rate Product and then becomes a European style option. If a relevant notional credit event does not occur prior to option expiry, all options knock out in the traditional manner i.e. with loss of premium.

Recovery Rate Premium Return Options

Traders who want to use standard Recovery Rate Product Options to trade their view on recovery rates should a credit event occur will be frustrated by the high premium time decay that occurs as knock out approaches i.e. if no credit event has occurred. Recovery Rate Premium Return Options solve this problem in a simple yet creative way by having as their name implies a premium return feature should no credit event occur by expiry time. As an example consider all the buyers throughout the lifetime of trading of a set of one year options struck on a $3^{rd}$ to default Recovery Rate Product. If at expiry after the one year has passed only two or less defaults have occurred in the referenced basket these buyers would have all their premium returned. Obviously these Recovery Rate Premium Return Options would have to be listed and traded in premium paid format. A further encouragement to trade would be if the premium paid attracted interest or could be posted with the clearing house through over collateralising with T-bills as is often done today with initial margin.

A Note on Other Event Driven Products

Credit event protection products can be viewed as just a another form of insurance. Other insurance products such as those that payout in the event of loss of life, accident etc rather than in the event of a default can therefore be generated using similar design principles. We therefore define a Post Event Contract to be any contract that is assigned to holders of another contract according to an objective triggering event. We also define Premium Return Knock Out Options as the generalized form of Recovery Rate Premium Return Options.

A Note on Initial Margin Calculations for the Adapted for Exchange New Credit Derivatives Invention Consider first an isolated single name Credit Coupon Product. Unless it is the effective Credit Coupon Product no Event Protection Futures can be assigned against the position so margining can simply be based on a statistical analysis of historical price movements as with existing exchange traded futures. However short positions in the effective Credit Coupon Product will require very large initial margin known as a spot month charge to cover for the large adverse variation margin call that might result if a Notional Credit Event in the reference name is announced. Since the member earns interest on initial margin held at the clearing house the short position holder is holding something closely akin to an on exchange credit-linked note. Construction of a genuine credit-linked note is discussed in the details of the clearing house securities part of the invention section below.

Now consider multiple short positions in effective Credit Coupon Products covering divers single names. Clearly the percentage initial margin requirements should plummet for even a small portfolio in full proportion to the low probability associated with two or more distinct Notional Credit Events in the relevant referenced names being announced on the same day i.e. as diversification kicks in.

In the example of Traded Credit Products on an equally weighted 125 name index the short position initial margin spot month charge is likely to be similar to the 0.8% weighting of each name in the index.

Clearly to deliver full benefit from the Adapted For Exchange New Credit Derivatives invention the exchange's clearing house will need to become sufficiently sophisticated at understanding diversification within portfolios of these products for cross margining purposes.

The Details of the Adapted for Exchange New Interest Rate Swaps Invention

Overview

The Adapted For Exchange New Interest Rate Swaps invention does not require any Event Protection Products and Processes and so is fundamentally less complex than the Adapted For Exchange New Credit Derivatives invention. It does however involve two distinct back office product types and in this sense is more complex.

Advantages

The ISDA based interest rate swap markets have been established far longer than the ISDA based credit derivative market. The former are thus correspondingly far more efficient than the latter. The invention nonetheless brings the significant benefits in the fields of:—
- Counterparty credit risk—The invention will effectively remove the need for counterparty credit lines via central clearing of the ISDA-like exchange traded products. It will therefore eliminate a costly and complicated part of the trading and risk management process and broaden access to these markets still further. This will find particular applicability in emerging market economies where counterparty credit issues are generally speaking far more significant than in the developed world. Indeed the invention will make the creation of benchmark rates for burgeoning corporate debt markets in such countries possible without the need for significant and costly government bond issuance.
- Netting—The invention is particularly efficient in netting exposures. This is because of both the breakdown into coupons and more significantly the separation of the fixed and floating exposures into separate products.
- Daily settlements and straight through processing—A significant uptake of the invention will result in slashed back office and middle office costs.
- Position and risk management—Perhaps the most striking feature of the invention is the simplifications the design brings to position and risk management with an entire 50 year curve covered in the preferred embodiment by as few as 400 separate Coupon Products. Even if the current ISDA market convention of quoting on-the-run spot plus one year, spot plus two years, etc. with a new on-the-run spot curve every trading day the Adapted For Exchange New Interest Rate Swaps invention design still ensures that individual trade ticket history does not dominate position accounting so that both within a large client portfolio and at the clearing house itself netting and margining will take place very efficiently The implications of a significant uptake of the invention for financial market stability are clearly great indeed.

Par IRS Product

The Standard Par IRS Product is the preferred embodiment of the Adapted For Exchange New Interest Rate Swaps invention. It does not utilise the full potential mapping points available in the generic ISDA-like invention design (see FIG. 8) there being no distinction between the front office and internal matching product:—
- The front office product is called the Traded Swap Rate (TSR) that appears on trading and information systems is expressed in annualised percentage points according to market convention. The quotation convention here is the one most suitable for showing this product's relationship to the yields in the long term debt markets.
- There are two distinct back office product types formed by the splitting of the front office Traded Swap Rate into so called Fixed Coupon Products (XCPs) and Floating Coupon Products (FCPs) for booking at the clearing house etc. The combination of Fixed and Floating Coupon Products are particularly suitable for making sure trades within a large client portfolio are netted and margined efficiently.

On exchange options of the above (a.k.a. Standard Par IR Swaptions) are included in the preferred embodiment of the Adapted For Exchange New Interest Rate Swaps invention.

Constituent Products Design Overview

The Traded Swap Rates as quoted in the front office represent the on exchange equivalent of ISDA based interest rate swaps (IRSs). IRS rates vary with the term of the obligation and are simply the market price for a zero cost exchange of interest rate exposure from fixed to floating or vice versa. More specifically IRS deals commit traders to enter into a) a periodic obligation to receive (or pay) a fixed interest rate in exchange; in exchange for b) a periodic obligation to pay (or receive) amounts based on a floating interest rate index (e.g. 3 month BBA LIBOR), where all the interest rate amounts payable are calculated based on the notional size of the deal.

As with other exchange traded contracts the Traded Swap Rate in its preferred embodiment will have a standard notional unit of trading (e.g. $1 mln, € 1 mln, ¥100 mln etc).

In the Standard Par IRS Product the Traded Swap Rates obey a listing and expiry cycle modelled on the Traded Credit Product cycle of the Adapted For Exchange New Credit Derivatives invention. The appropriate length of the listing cycle will mirror the demand from dealers in each currencies. Thus major currencies such as $, € or ¥ may have thirty to fifty years of Traded Swap Rates available for trading whilst emerging markets may not have products listed beyond three to five year terms. The standard listing cycle will also mirror the Traded Credit Product cycle with March and September expiries plus one additional quarterly month so the nearest three expiry months are consecutive quarterly expiries. The Standard Par IRS Product expiries will be x business days prior to the effective date which is defined as the twentieth calendar day of the expiry month or if such a day is not a business day on the next following business day. The x business days depends in principle on the currency in question but is typically 2 days (e.g. in $, €, ¥ etc).

Both the Fixed and Floating Coupon Products follow the same expiry cycle as the Traded Swap Rates obey but include all consecutive quarterly expiries i.e. March, June, September and December and not just March and September plus one additional quarterly month expiry at the front of the curve. Each Coupon Product has a notional maturity that is the effective date of the following Coupon Product expiry.

The standard notional unit size of the Floating Coupon Products will be the same as the notional unit of trading for Traded Swap Rates (e.g. $1 mln, €1 mln, ¥100 mln etc). However the standard notional unit size of the Fixed Coupon Products will be the smallest unit size of the currency i.e. only $0.01, €0.01, ¥1 etc.

Non-Standardised Dates and Spot

Towards the front of the curve there may be demand for non-standardised dates and it is envisaged that this could be accommodated by listing these non-standard expiries only for OTC-style telephone trading with access to clearing via a wholesale trading facility.

At present the current ISDA market trades spot plus one year, spot plus two years, etc. It may be necessary in order to meet demand to list a new spot curve every trading day as well as the standard expiry cycle described above.

It may happen that there is also a demand for trading in non-standard notional units and this can be accommodated simply by shrinking the notional unit sizes until the Trade Swap Rate notional unit of trading reaches the appropriate granularity.

Implied Calendar Spread Pricing and the Outright Traded Swap Rate

Traded Swap Rate forwards cannot easily be traded along the interest rate term structure in a manner analogous to the Adapted For Exchange New Credit Derivatives invention. However, one embodiment of the invention would separately list certain forward Traded Swap Rate curves on the matching engine in order to encourage relative value trading against normal calendar spreads of the outright Traded Swap Rate curve. These calendar spreads together with butterfly spreads etc will be available just as they are in existing standardised Short Term Interest Rate futures markets provided the matching engine supports them.

Traded Swap Rate, Fixed Coupon Products, Floating Coupon Products and Associated Mappings The mappings that are part of the Standard Par IRS Product link the front office Traded Swap Rate with the back office Fixed and Floating Coupon Products directly. We now give a detailed description of these with reference to FIG. 8 where each mapping exists between the boundary of the sub-products at points indicated by circles numbered 1-5. In this case circles 1 and 2 can be ignored as no mappings take place there for the Adapted For Exchange New Interest Rate Swaps invention.

Mapping 3

Figure 17:
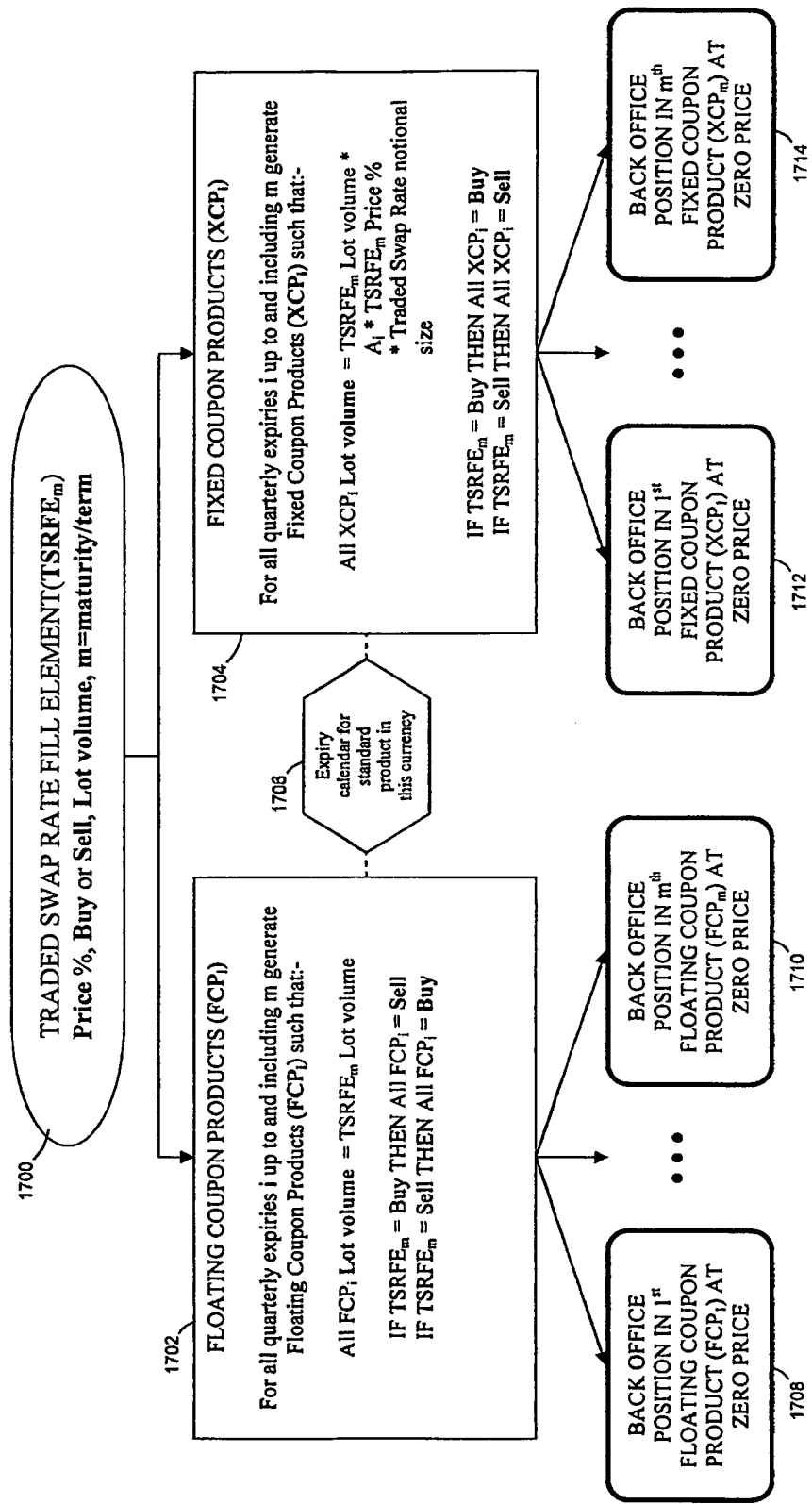
FIG. 17 shows the Adapted For Exchange New Interest Rate Swap invention flow diagram for Floating and Fixed Coupon Product position breakdown.

Mapping 3 occurs at the numbered circle point 3 in FIG. 8. FIG. 17 shows the details of the one to many mapping which converts from the Traded Swap Rate Fill Element (TSRFE$_m$) (see 1700 of FIG. 17) into the relevant back office Floating Coupon Products (FCP$_i$) (shown as a set spanned by 1708 and 1710 in FIG. 17) on the one hand and the offsetting positions in back office Fixed Coupon Products (XCP$_i$) (shown as a set spanned by 1712 and 1714 in FIG. 17) on the other.

The Floating Coupon Product positions (FCP$_i$) are assigned with opposite long/short sign as the Traded Swap Rate but in exactly the same lot volume for all quarterly expiries i up to and including m (see 1702 of FIG. 17):—

All i=1 to m,
FCP$_i$ Lot volume=TSRFE$_m$ Lot volume
All i=1 to m, FCP$_i$ Price=0
IF TSRFE$_m$=Buy THEN All FCP$_i$=Sell, ELSE
IF TSRFE$_m$=Sell THEN All FCP$_i$=Buy The Fixed Coupon Product positions (XCP$_i$) are assigned with the same long/short sign as the Traded Swap Rate but in proportion to lot volume and traded price for all quarterly expiries i up to and including m (see 1704 of FIG. 17):—

All i=1 to m, XCP$_i$ Lot volume=TSRFE$_m$ Lot volume*
  A$_i$*TSRFE$_m$ Price %
  *Traded Swap Rate notional size
All i=1 to m, XCP$_i$ Price=0
IF TSRFE$_m$=Buy THEN All XCP$_i$=Buy, ELSE
IF TSRFE$_m$=Sell THEN All XCP$_i$=Sell The accrual factor, A$_i$, are simply the fraction of a year that the number of days between the i$^{th}$ effective date and the i$^{th}$ notional maturity date represent. The accrual factor calculation method will vary with currency and will probably be specified in the particular Par IRS Product design. The calculation will often be made consistent with the conventional quotation method in any existing ISDA based swap markets in that currency. Thus for a $ or € product for example the A's would be defined in day fractions of a $30/360$ day count basis. The mappings therefore have to be parameterised by the expiry calendar for product so that a full strip of both types of Coupon Product are assigned (see 1706 of FIG. 17).

Mapping 4

Mapping 4 occurs at the numbered circle point 4 in FIG. 8. This is identical to the mapping at numbered circle point 3 as described above and in FIG. 17. It is used to convert wholesale trades agreed over the telephone into the back office representation directly.

Mapping 5

Mapping 5 occurs at the numbered circle point 5 in FIG. 8.

Figure 18:
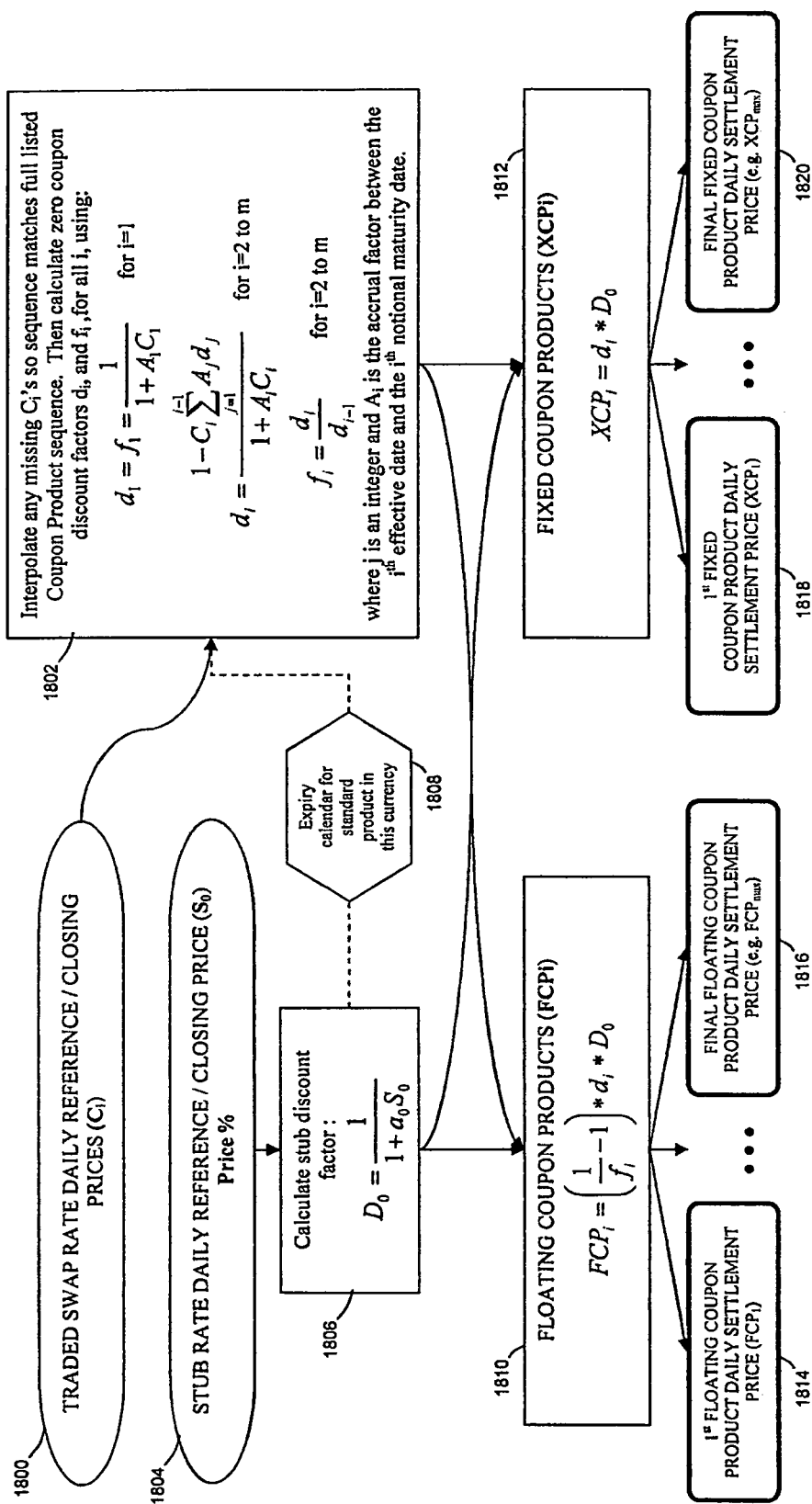
FIG. 18 shows the Adapted For Exchange New Interest Rate Swap invention flow diagram for Floating and Fixed Coupon Product daily settlement calculation.

FIG. 18 shows the details of the conversion of the front office Traded Swap Rate Reference Prices (see 1800 of FIG. 18) as set by the market supervisor into the actual back office Floating Coupon Product (shown as a set spanned by 1814 and 1816 in FIG. 18) and Fixed Coupon Product daily settlement prices (shown as a set spanned by 1818 and 1820 in FIG. 18) needed for variation margin calls. This is a relatively complex process which also requires a daily stub rate reference price (see 1804 of FIG. 18) and is key to the product design as a Par IRS Product.

The Traded Swap Rate Reference Prices do not in principle need to respect the Traded Swap Rate Tick and may be calculated from some objective averaging function of trading conditions just prior to the daily settlement time.

Module 1804 of FIG. 18 illustrates the bootstrapping process used to calculate the required discount factors. The first step in module 1804 of FIG. 18 is to use interpolation to determine Traded Swap Rate settlements in time periods for which an express rate does not exist i.e. at the June and December points. Linear interpolation, exponential interpolation, cubic spline interpolation, exponential spline interpolation, or any other desired type of interpolation may be used. The result is that a Traded Swap Rate Reference Price is available for every Fixed Coupon Product and Floating Coupon Product effective date i. By definition of the product design the Traded Swap Rate Reference Prices form a par swap curve.

In the next step of module 1804 of FIG. 18 we calculate two series of forward zero coupon discount factors. The first series, $d_i$, are from the first effective date to every notional maturity date i. The second series, $f_i$, are from every effective date i to the corresponding notional maturity date i. The discount factor $d_i$ represents the zero coupon discount factor calculated from the par swap rate applicable for the period between the first effective date and the $i^{th}$ notional maturity date. For time period i=1, the following formula is used to determine $d_1$:

$$d_1 = f_1 = \frac{1}{1 + A_1 C_1}$$

where $A_1$ and $C_1$ are the accrual factor and the swap rate, respectively, for the first time period (i=1).

For all time periods from i=2 to i=m, bootstrapping is applied, using the following formula to determine $d_i$:

$$d_i = \frac{1 - C_i \sum_{j=1}^{i-1} A_j d_j}{1 + A_i C_i}$$

where j is a positive integer, and $A_i$ and $A_j$ are the accrual factors in time period i and j, respectively. This process is commonly known as bootstrapping because $d_{i-1}$ has to be determined in order to determine $d_i$ just as boot and skate laces need to be tightened from the bottom before they can be tightened at the top.

The $f_i$ can then be determined directly from the $d_i$ as follows:

$$f_i = \frac{d_i}{d_{i-1}}$$

We also need the stub discount factor $D_0$ which is the zero coupon discount factor calculated from the money market stub reference rate applicable for the period between trade date plus x business days (typically 2 days) and the first effective date (see 1806 of FIG. 18):

$$D_0 = \frac{1}{1 + a_0 S_0}$$

where $a_0$ and $S_0$ are the money market accrual factor and the stub rate, respectively, for the period from spot to the first effective date. Preferably, the stub rate source is a identical to the floating rate used in the swap market (e.g. the BBA $ LIBOR panel for $ Traded Swap Rates). The accrual factor $a_0$ is calculated using the daycount basis conventional in the relevant money market e.g. Actual/360 for a $ or € product. The mappings therefore have to be parameterised by the expiry calendar for product so that a full strip of both types of Coupon Product are assigned (see 1808 of FIG. 18).

We may now finally give the formulae for the Floating Coupon Product, $FCP_i$, and Fixed Coupon Product, $XCP_i$, daily settlement prices needed for variation margin calls:

$$FCP_i = \left(\frac{1}{f_i} - 1\right) * d_i * D_0$$

$$XCP_i = d_i * D_0$$

respectively shown in modules 1810 and 1812 of FIG. 18.

Expiry of Fixed and Floating Coupon Products

Figure 5:
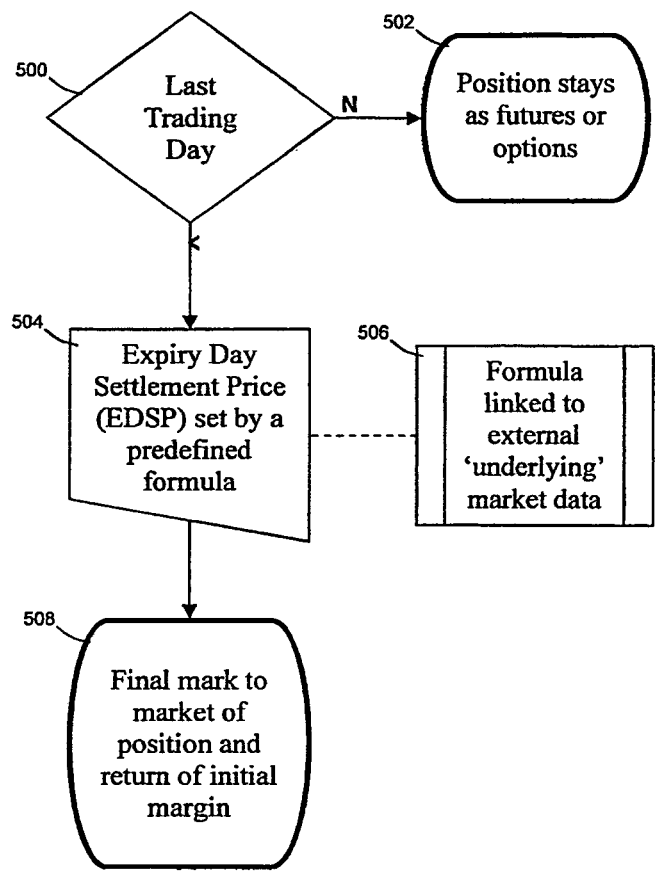
FIG. 5 is a flow diagram representing existing cash settled exchange traded futures and options.

Fixed and Floating Coupon Products are cash settled at expiry (see FIG. 5). The settlement uses a standard floating rate benchmark, L, that varies according to currency e.g. the $ Traded Swap Rates will use 3 month BBA $ LIBOR.

The Floating Coupon Product is cash settled using the formula (see $$FCP\ EDSP = \frac{a * L}{1 + a * L}$$

where a is the relevant money market convention accrual factor.

The Fixed Coupon Product is cash settled using the formula (see 506 of FIG. 5):

$$XCP\ EDSP = \frac{1}{1 + a * L}$$

where a is the relevant money market basis accrual factor.

A Note on Margin Calculations FOR the Adapted for Exchange New Interest Rate Swaps Invention Granularity The very small notional unit size of the Fixed Coupon Products poses some technical issues to do with rounding error in both the calculations of daily settlement price and indeed EDSPs. If rounding errors are not addressed the invention will deliver random variations from a true par swap. It is therefore a requirement of the invention that variation margin calls are calculated for each position holder using Fixed Coupon Product DSPs and EDSPs of high accuracy i.e. not rounded to the nearest cent, pence, yen etc. Only after the relevant mark to market has been calculated in this way should total position variation margin calls be calculated with rounding.

In the circumstances described above there is however a possibility that the clearing house will end up with a small shortfall of variation margin cashflows. Three solutions present themselves:—

1. Ignore the issue as even in the case of many thousand position holders the mismatch of cashflows is likely to be exceedingly small and insignificant relative to initial margin held; and/or
2. Reduce and for practical purposes eliminate the risk of a shortfall when final cash settlement margin calls are calculated by rounding the EDSP differently for net long and net short positions i.e. in the clearing house's favour; or
3. Handle rounding errors in detail via the front office position markers held in the clearing house's trade registration systems (see Reconciliation, efficient give ups and open interest markers).

Which of these options is adopted depends on the commercial considerations of customers and the clearing house.

Give Ups

As the preferred embodiment of the invention has both Fixed and Floating Coupon Products created at zero price and in offsetting pairs there will be a one-off pair of large but offsetting variation margin calls calculated for each different type of coupon upon their first daily settlement. It is therefore important to keep the coupon products together prior to this point and not allow them to be allocated to different accounts (see Reconciliation, efficient give ups and open interest markers).

Second Generation Deliverable Bond-Like Futures

Overview

The Adapted For Exchange New Interest Rate Swaps invention and the Adapted For Exchange New Credit Derivatives invention can be used to create deliverable bond-like futures. These would therefore be second generation products very much in the mould of traditional bond futures but that give robust exposure to the two aforementioned inventive products in a convenient form.

Advantages

This second generation deliverable bond-like futures invention brings significant practical benefits:—
- Convenience of trading—As already explained in the event that the market prefers the current ISDA market spot plus one year, spot plus two years, etc format for listings it would be necessary to list a new spot IRS product curve every trading day every day. Rather than in addition to this listing the standardised Par IRS Product on a March, June, September, December expiry cycle as described previously, it may be more convenient to list 2-year, 5-year and 10-year deliverable swap future as described below.
- Convenience of hedging—Listing a complex of 2-year, 5-year and 10-year deliverable credit-linked futures as described below will create a very convenient hedge for non government (i.e. risky) bond positions.
- Appropriate fee structure—The exchange listing more traditional 2-year, 5-year and 10-year deliverable bond-like futures will be able to charge an appropriate bond future-like fee. The low fee will allow the very cost sensitive independent scalpers (i.e. office based locals) to participate in providing liquidity as effectively as they do for existing bond futures. Meanwhile those who want continuing exposure to the actual Adapted For Exchange New Interest Rate Swaps and the Adapted For Exchange New Credit Derivatives products can do so at a higher fee appropriate to the long term nature of these derivatives.

Deliverable Swap Futures

We have already described in the "Background to the Invention" section how the M-year CBoT Swap future design has a cash settlement upon expiry formula:—

$$CBoT \text{ Swap Future } EDSP = \frac{C}{S} + \left(1 - \frac{C}{S}\right) * \left(1 + \frac{S \%}{2}\right)^{\frac{1}{2*M}}$$

where,
S represents the ISDA Benchmark Rate for the M-year U.S. dollar interest rate swap on the last day of trading, expressed in percent terms; and
C represents the notional coupon for the future, expressed in percent terms (currently C=6 for both the 5-year and 10-year Swap futures that are listed)

An alternative approach would be to reverse the above formula and create a deliverable design. This would set the EDSP by reference the market close of the swap future on the last trading day in the same way that bond futures are expired. Once the EDSP is known the EDSP Swap Rate, S, is calculated. Finally delivery is made via the Adapted For Exchange New Interest Rate Swaps invention. Specifically the delivery counterparties are assigned by the normal bond future method. Then a front office trade in the Traded Swap Rate is delivered with traded price set to the EDSP Swap Rate, S, adjusted as necessary for coupon and compounding consistency.

Deliverable Credit-Linked Futures

In exact analogy to the deliverable swap futures just described other futures could be listed linked to credit indices such as the Dow Jones CDX North America and iTraxx Europe or even sector indices.

These would set the EDSP by reference the market close of the relevant future on the last trading day in the same way that the corresponding swap futures was expired and crucially do so at the same time. Once the EDSP is known the EDSP Credit-linked Rate, R=S+P, is calculated in the same way. Finally delivery is made via the Adapted For Exchange New Interest Rate Swaps and the Adapted For Exchange New Credit Derivatives inventions. Specifically the delivery counterparties are assigned by the normal bond future method. Then a front office trade in the Traded Swap Rate is delivered with traded price set to the EDSP Swap Rate, S. In addition a front office trade in the relevant Traded Spread Product is delivered with traded price set to the EDSP Credit-linked Rate minus the EDSP Swap Rate, R−S=P. There may be better more sophisticated ways to calculate, P, but the principle will be the same.

One problem for deliverable credit linked futures is how to deal with a relevant notional credit event prior to expiry, and perhaps the best solution for a single name product is simply to suspend trading in the linked future and force an early expiry and delivery based on its most recent daily settlement price. The problem is more complex for multi-name products such as indices and baskets and perhaps the best solution here is to avoid the problem by construction—The problem would not arise these credit linked futures reference either a resetting index or a newly composed index at its expiry.

The DETAILS of the Adapted for Exchange New Money Market Derivatives Invention

Overview

The Adapted For Exchange New Money Market Derivatives invention as both OIS and/or FRA Product are similar in complexity to the Adapted For Exchange New Interest Rate Swaps invention. On the one hand these products have a single expiry and do not need the breakdown into coupon type products. On the other hand the introduction of the money market convention and non-standard notional units of trading add considerable complexity.

Advantages

The ISDA based money market derivatives have been established far longer than the ISDA based credit derivative market. The former are thus correspondingly far more efficient than the latter. The invention nonetheless brings significant benefits in the fields of:—
  Counterparty credit risk—The invention will effectively remove the need for counterparty credit lines via central clearing of the ISDA-like exchange traded products. It will therefore eliminate a costly and complicated part of the trading and risk management process and broaden access to these markets still further. This will find particular applicability in emerging market economies where counterparty credit issues are generally speaking far more significant than in the developed world.
  Forwards and spot—The invention is particularly effective in meeting end user needs. Whereas the existing standardised Short Term Interest Rate futures markets are professional forward-forward markets with esoteric expiry dates unrelated to business needs, the invention makes forward and spot money market derivatives available within a genuine exchange for the first time.
  OTC-style trading—By virtue of the product designs continuously quoted central markets will only be available on the exchange at money market conventional on-the-run points. Block trades and basis trades thresholds will therefore be zero for off-the-run points allowing them to be freely traded in an OTC-style phone market yet still benefit from the exchange's infrastructure.
  Daily settlements and straight through processing—A significant uptake of the invention will result in slashed back office and middle office costs.
  Position and risk management—Both leg types of the OIS Product are designed to make sure trade ticket history does not dominate position accounting so that both within a large client portfolio and at the clearing house itself netting and margining will take place very efficiently.

Listing Convention and Units of Trading

Implied Pricing and the Money Market Convention

Both OIS and FRA Product varieties of the Adapted For Exchange New Money Market Derivatives invention use the money market convention that has already been described in the "Background to the invention" section. Thus each trading day a restricted subset of on-the-run points will be made available for trading on the matching engine even though the full set will remain available for trading via OTC-style wholesale trading facilities. This will require:—
  daily listing and delisting of product for matching engine trading; and
  daily adjustments to block trade thresholds for listed and delisted product.
The latter point is required so that traders can if they wish trade where no matching engine listing exists i.e. the block trade threshold must be zero for off-the-run points.

Non-Standard Notional Units of Trading and Rounding Issues

When managing short term exposures the exact notional sizes required tend to be known with greater accuracy. It is therefore appropriate to allow greater flexibility in the notional units of trading in the Adapted For Exchange New Money Market Derivative invention than for the other longer dated ISDA-like derivative products.

The preferred embodiment of this Adapted For Exchange New Money Market Derivatives invention for both OIS and FRA Product would therefore allow notional front office trading lot size to be to the smallest unit size of the currency i.e. only $0.01, €0.01, ¥1 etc. The very small notional unit size of the traded product might in principle raise fears of some technical issues to do with rounding error. However as with the Adapted For Exchange New Interest Rate Swaps Invention this is not ultimately a problem as long as all positions and variation margin calls are calculated to high accuracy (i.e. not rounded to the nearest cent, pence, yen etc). This is especially true of back-office products who's notional size is a function of on screen traded price and not just front office volume.

Only after the relevant mark to market has been calculated to high accuracy should total position variation margin calls be calculated with rounding per product. Specifically when margin calls or final cash settlement are calculated the rounding should be done differently for net long and net short positions i.e. in the clearing house's favour.

OIS Product

The OIS Product is one embodiment of the Adapted For Exchange New Money Market Derivatives invention. It does not utilise the full potential mapping points available in the generic ISDA-like invention design (see FIG. 8) there being no distinction between the front office and internal matching product:—
  The front office product is called the Traded OIS Rate (TOR) that appears on trading and information systems is expressed in annualised percentage points according to market convention. The quotation convention here is the one most suitable for showing this product's relationship to rates in the cash money markets. The Traded OIS Rate is also important for audit trail purposes.
  There are two distinct back office product types formed by the splitting of the front office Traded OIS Rate into a so called Fixed Rate OIS Product (FROP) and an Overnight Indexed Product (OIP) for booking at the clearing house etc. Both the Fixed Rate OIS and the Overnight Indexed Products are designed to make sure trade ticket history does not dominate position accounting so that within a large client portfolio netting and margining takes place efficiently.
  On exchange options of the above (a.k.a. OI Swaptions) are included in the preferred embodiment of the Adapted For Exchange New Money Market Derivatives invention.

Traded OIS Rate, Fixed Rate OIS Product, Overnight Indexed Product and Associated Mappings etc The mappings that are part of the OIS Product link the front office Traded OIS Rate with the back office Fixed Rate OIS and Overnight Indexed Products directly. We now give a detailed description of these with reference to FIG. 8 where each mapping exists between the boundary of the sub-products at points indicated by circles numbered 1-5. In this case circles 1 and 2 can be ignored as no mappings take place there for the Adapted For Exchange New Money Market Derivatives invention.

Mapping 3

Mapping 3 occurs at the numbered circle point 3 in FIG. 8.

Figure 19:
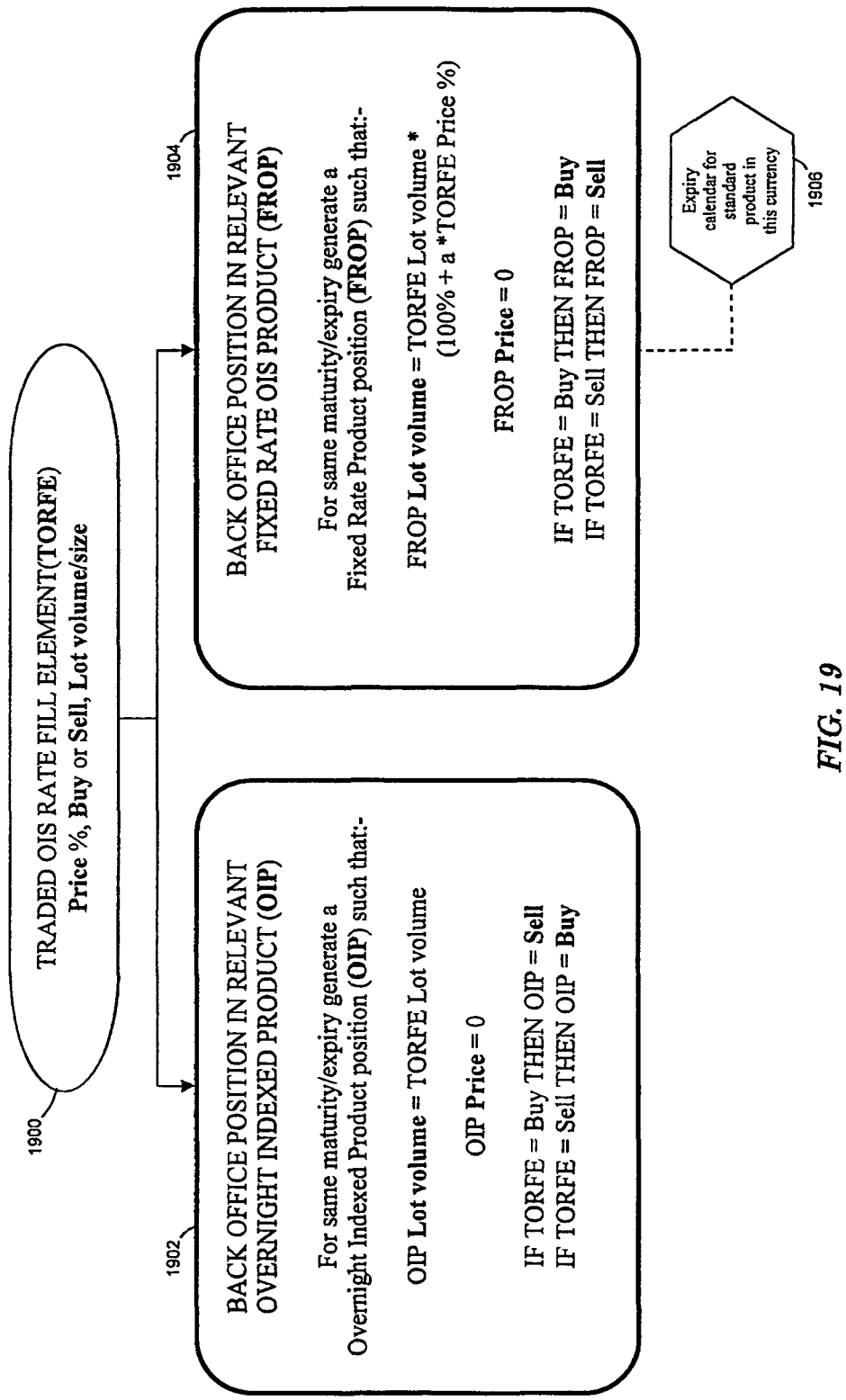
FIG. 19 shows the Adapted For Exchange New Money Market Derivatives invention flow diagram for Overnight Indexed and Fixed Rate OIS Product position breakdown.

FIG. 19 shows the details of this one goes to two mapping that converts from the Traded OIS Rate Fill Element (TORFE) (see 1900 of FIG. 19) into the relevant back office Overnight Indexed Product (OIP) (see 1902 of FIG. 19) and offsetting back office Fixed Rate OIS Product (FROP) (see 1904 of FIG. 19).

The Overnight Indexed Product (OIP) position is assigned with the opposite long/short sign as the Traded OIS Rate but in exactly the same lot volume and for exactly the same expiry (see 1902 of FIG. 19):—

OIP Lot volume=TORFE Lot volume
OIP Price=0
IF TORFE=Buy THEN OIP=Sell, ELSE
IF TORFE=Sell THEN OIP=Buy The Fixed Rate OIS Product (FROP) position is assigned with the same long/short sign as the Traded OIS Rate both in proportion to lot volume and also as a function of actual matched Traded OIS Rate price as de-annualised for the appropriate expiry (see 1904 of FIG. 19):—

FROP Lot volume=TORFE Lot volume*(100%+a*TORFE Price %)
FROP Price=0
IF TORFE=Buy THEN FROP=Buy, ELSE
IF TORFE=Sell THEN FROP=Sell The accrual factor, a, is simply the fraction of a year that the number of days between the spot date (T+x, where x is most typically 2 business days) and the expiry date represent. The accrual factor calculation method will vary with currency and will be specified in the particular OIS Product design. The calculation will usually be made consistent with the conventional quotation method in the existing ISDA based OIS markets in that currency. Thus for a $ or € product for example the a's would be defined in day fractions of an Actual/360 day count, spot=T+2 basis. This mapping therefore has to be parameterised by the expiry calendar for product so that this accrual factor can be calculated (see 1906 of FIG. 19).

Mapping 4

Mapping 4 occurs at the numbered circle point 4 in FIG. 8. This is identical to the mapping at numbered circle point 3 as described above and in FIG. 19. It is used to convert wholesale trades agreed over the telephone into the back office representation directly.

Mapping 5

Mapping 5 occurs at the numbered circle point 5 in FIG. 8.

Figure 20:
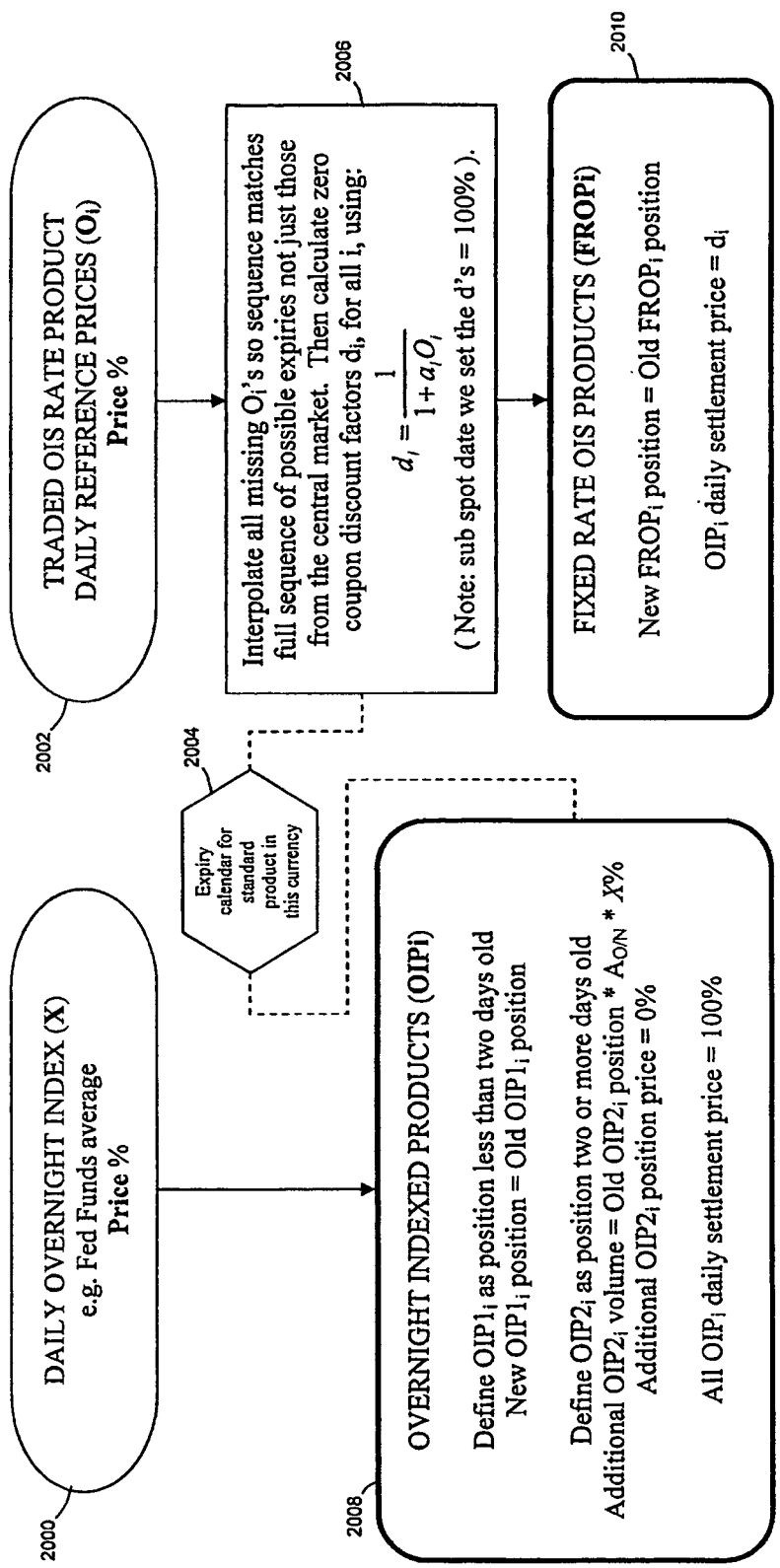
FIG. 20 shows the Adapted For Exchange New Money Market Derivatives invention flow diagram for Overnight Indexed and Fixed Rate OIS Product daily settlement and indexation calculation.

FIG. 20 shows amongst other things the details of the mapping that converts the front office Traded OIS Rate Reference Prices (see 2002 of FIG. 20) as set by the market supervisor into the actual back office back office Fixed Rate OIS Product (see 2010 of FIG. 20) and Overnight Indexed Product (see 2008 of FIG. 20) daily settlement prices needed for variation margin calls.

The Traded OIS Rate Reference Prices do not in principle need to respect the Traded OIS Rate tick and may be calculated from some objective averaging function of trading conditions just prior to the daily settlement time.

Module see 2006 of FIG. 20 illustrates the two steps needed to calculate the discount factors required to settle the Fixed Rate OIS Product. The first step is to use interpolation to determine Traded OIS Rate settlements in time periods for which an express rate does not exist i.e. at off-the-run points. Exponential interpolation, cubic spline interpolation, exponential spline interpolation, or any other desired type of interpolation may be used. The result is that a Traded OIS Rate Reference Price, $O_i$, is available for every possible expiry date i.

In the next step we calculate zero coupon discount factors, $d_i$, calculated from Traded OIS Rates, $O_i$, for the period between the spot date and the relevant expiry date. The following formula is used:

$$d_i = \frac{1}{1 + a_i O_i}$$

where the $a_i$ are the accrual factor for the relevant period. For the period up to the spot date we set the d's=100%. This mapping therefore has to be parameterised by the expiry calendar for product so that this accrual factor can be calculated (see 2004 of FIG. 20).

The formulae for the daily settlement prices needed for variation margin calls for the Overnight Indexed Product, $OIP_i$, and Fixed Rate OIS Product, $FROP_i$, are thus:

$OIp_i = 100\%$ $FROP_i = d_i$ as indicated in modules 2008 and 2010 of FIG. 20 respectively.

Overnight Indexation

Module 2008 of FIG. 20 also shows the process required for indexation to a daily overnight index rate, X, such as the Fed Funds rate. It is key to the product design as a true OIS Product. Although the daily settlement prices of the Overnight Indexed Products, $OIP_i$, remain 100% for the entire life of a position, each evening the position size is augmented as follows:—

For all j=1 to m, non-compounding positions, $OIP1_j$, less than x days old: New $OIP1_j$ position=Old $OIP1_j$ position For all i=1 to m, compounding positions, $OIP2_i$, x or more days old:

New $OIP2_i$ position=Old $OIP2_i$ position*(100%+$A_{O/N}$*X %)

i.e. Addition $OIP2_i$ volume=Old $OIP2_i$ position*$A_{O/N}$*X % and Addition $OIP2_i$ price=0 where $A_{O/N}$ is the accrual factor applied to the overnight index rate, X, is (in $'s usually a 1/360 or a 3/360 for a Friday etc). Also x is the number of business days defining spot (T+x) for this currency (usually x=2). Notice that the accuracy to which the Overnight Indexed Product position will be held is higher than the smallest unit size of the currency i.e. only $0.01, €0.01, ¥1 etc. even though this is the notional trading lot size. This process therefore requires the calendar so that the overnight accrual factors can be calculated (see 2004 of FIG. 20).

Position Keeping Efficiency

We have stated without explanation that both position and risk will be more efficiently managed in the current design than in the existing ISDA-style one.

As previously explained the on-the-run market exists at maturities of a whole number of weeks, months or years i.e. spot plus 1 week, spot plus 2 weeks, spot plus 3 weeks, spot plus 1 months, spot plus 2 months, spot plus 3 months, spot plus 4 months, spot plus 5 months, spot plus 6 months, spot plus 7 months, spot plus 8 months, spot plus 9 months, spot plus 10 months, spot plus 1 months, spot plus 1 year etc. In all this makes 15 or more different classes of trade ticket. For each given expiration day there are therefore an increasing density of different classes expiring with reducing time to expiry each of which have to be valued separately. Furthermore the lack of unbundling of the legs will further multiply the position and risk management overhead and ticket management burden.

By contrast there is only one Fixed Rate OIS Product (FROP) for each expiry and one compounding Overnight Indexed Product (OIP2) for each expiry plus times x non-compounding Overnight Indexed Product (OIP2) for newer positions where x is the number of business days defining spot.

Give Ups

As the preferred embodiment of the invention has both Fixed Rate OIS Product and Overnight Indexed Product created at zero price and in offsetting pairs there will be a one-off pair of large but offsetting variation margin calls calculated for each different leg type upon their first daily settlement. It is therefore important to keep the two product types together prior to this point and hence restrict give ups (see Reconciliation, efficient give ups and open interest markers).

Expiry of Fixed and Overnight Indexed Products

Fixed Rate OIS and Overnight Indexed Products are both cash settled to 100% at expiry (see 506 of FIG. 5).

FRA Product

The FRA Product is extremely closely related to the Par IRS Product (see page 75). In fact the FRA product is identical to the front quarterly Par IRS Product which breaks down into a single pair of back-office products (i.e. no strip) except that:—
  The equivalent of the Traded Swap Rate known as the Traded FRA Rate will be quoted using the money market day count convention and not the swap market convention.
  FRA Products are not restricted to quarterly terms.
  As with the OIS Product daily listing and delisting of product for matching engine trading of on-the-run points will occur.

In practice only three month and six month terms will need to be listed as these are the most liquid in the ISDA based market. Thus on any given day 1×4 (=one month forward for three months), 2×5, 3×6, 4×7, 5×8 and 6×9 will be listed amongst the three month FRA Products and 1×7, 2×8, 3×9, 4×10, 5×11 and 6×12 will be listed amongst the six month FRA Products. Hence six different stub rates will be needed.

To prevent duplication we won't recast the discussion of the Par IRS Product here for the sake of the FRA product which is identical to it.

Introduction to the Enhanced Clearing House Flexibility Invention

Description and Novelty of this Part of the Invention

Some clearing house changes have already been discussed as part of the ISDA-like invention above. However the Enhanced Clearing House invention takes the standard futures exchange's clearing house and with a few minor changes transforms it into something far broader i.e. a) a central cash money market; or b) a securitisation of loans venue; or indeed c) a rival to existing securities depositories; and in particular d) a rival issuance venue for securities normally issued by special purpose vehicles.

The extent to which some of these innovations are attractive to the market remains to be seen. However to broaden the role of the traditional futures and options exchange trading and clearing venue in order to streamline the operations of the financial industry is entirely consistent with the preceding ISDA-like product part of invention. The first part of the invention sought to replace ISDA's coordinating role with a truly central market in the main derivative products traded by the market. This part of the invention concerns the well-worn yet untested assumption that operational risk can best be managed by coordination of piecemeal projects distributed across the industry. The harnessing of existing efficiencies within futures exchanges and the clearing house's in a broader context to create a truly central provider of operational services across the industry challenges orthodoxy. It is this contrasting approach that is presented here and not surprisingly it is linked to the first part of the invention in several places.

The Details of the Clearing House System Innovations Already Needed for the First Part of the Invention Order of Margining Calculations and Rounding The small notional units of trading in the invention require that margin calls and position sizes are calculated with high accuracy i.e. not rounded to the nearest cent, pence, yen etc. during intermediate steps. Only after the relevant mark to market and positions have been calculated to high accuracy in this way should total position margin calls be calculated with rounding.

Reconciliation, Efficient Give Ups and Open Interest Markers

As already stated since the product designs of the first part of the invention lead to each individual front office trade being split into two or more back office positions this will require system changes for efficient post trade management. Thus the preferred embodiment of the invention will conserve information appropriately and allow for efficient manipulation of it:
  All front office product fill reports on a dealer's trading system will be accompanied by the relevant back office product breakdowns to help with front office versus back office reconciliation.
  All front office product matched trades will be passed through to the clearing house. These filled front office trades will appear on the clearing house's trade register as normal contracts but will not be charged any initial or variation margin.
  Front office position markers held at the clearing house can be used to assist with front office versus back office reconciliation. They will also be used for calculating open interest reports for front office systems.
  Front office position markers held at the clearing house will also be used for efficient give ups. The preferred embodiment of the invention will allow back office managers to give up and take in products by reference to the front office position markers held in the clearing house's trade registration systems alone. The associated back office products referenced to a particular front office trade would be transferred as a group that moves wherever their front office position marker goes.

The Delivery of Loans into the Recovery Auction or Rate Product

The delivery of loans into the Recovery Auction or Rate Product of the Adapted For Exchange New Credit Derivatives may be deemed essential by the market. How this can be achieved is discussed separately in the details of the clearing house securities part of the invention section below.

The Details of the Internal Fungibility Invention

Overview

A modern futures and options exchange is a highly efficient primary market in a certain subset of derivatives contracts. However even these modern electronic exchanges must have predefined trading hours and times when the market is closed. This contrasts with the flexibility of the OTC ISDA based market which trades on demand at any time globally.

Electronic linkages with foreign exchanges have been attempted to solve this problem. The lead example is the CME/SIMEX MOS link but other similar linkages followed. However this approach has hit some genuine limitations. No single link-up can sensibly cover the entire 24-hour trading period yet competitive considerations between different financial centres makes a worldwide linkage system almost impossible to set up, with attempts to do so hit by regulatory and legal complications.

Given the opportunities of electronic trading to give access to the same exchange across global time zones in recent years exchanges have attempted to expand their trading sessions to become near 24-hour a day markets. The idea is to preserve local business flows and attract business generated on foreign shores. However these exchanges have failed to address the operational difficulties caused by the long day markets they have created.

By intelligently introducing three or more different daily settlement times for each near 24-hour a day market operational difficulties can be fully addressed.

Advantages

This part of the invention introduces three or more different daily settlement times for each near 24-hour a day market which has the advantage of:—
  Avoiding all clearing members being forced to either a) maintain expensive 24 hour back offices; or b) outsource part of their back offices coverage to a costly global service provider; and
  Allowing traders and institutions to sensibly mark to market across product classes within each region; and
  Avoiding many of the regional competition pitfalls that lead to politically motivated regulatory and legal complications.

Internal Fungibility and Multiple Daily Settlement Times Membership Structure

Basic Structure

This part of the Enhanced Clearing House invention requires simple but significant changes that introduce:— a) Three or more different daily settlement times within the same clearing house for each near 24-hour a day market e.g. an Asian close, a European close and an Americas close; and
b) Hence three or more different daily variation margin collection cycles; and
c) A clearing membership qualification by region. Any clearing member would have to demonstrate the capacity to staff it's back office for the relevant daily settlement and clearing cycle before being qualified. Thus ABC Corp might be a clearing member only for the European close for example. However XYZ bank might be a clearing member for all time zones.
d) Each individual clearing house account reference will also carry a time zone designation and all trades within that individual clearing house account will settle in the same time zone. Note that a clearing member cannot own account references for regions in which it is not qualified e.g. ABC Corp cannot own Asian close account references.
e) A system for monitoring variation margin mismatches over the trading day caused by the splitting of settlement times and open positions across regions.

The clearing house needs only to be confident that its own capital fund or credit lines will not be exhausted by variation margin mismatches over the trading day caused by the splitting of settlement times in order to provide such a service. With the above changes a truly global exchange that is operationally efficient is finally possible.

Introduction to the Pooled Risk Deposit Market Invention

Description and Novelty of this Part of the Invention

Bank lending has been the corner-stone of financial activity for centuries and an active interbank market is considered vital to any modern economy. There are however periodic crises in which a bank may fail and the ensuing chaos takes a considerable amount of time to unwind and for the risk of contagion to pass.

There are two separate streams of effort attempting to keep the financial system in order:
  1. Individually the banks expend a large amount of resources setting counterparty credit exposure limits amongst themselves which helps to control risk of contagion; and
  2. Also regulatory authorities focus considerable resources setting and policing capital adequacy rules and reserve requirements to prevent bank failures in the first place.

The present invention recognises that these two streams of effort should be overhauled, modernised and replaced by a single fully robust system springing from an adapted futures exchange type environment.

The Details of the Pooled Risk Deposit Market Invention

Overview

A modern futures and options exchange is a highly efficient primary market in a certain subset of derivatives contracts. Because of the central counterparty services created by the exchange's clearing house these derivatives contracts behave almost like securities. By introducing immediate cash currency payments plus an alternative method of handling default risk as compared to the current margin based system a highly operationally efficient central money deposit market can be created.

Advantages

The object of this part of the invention is to:
repackage and vastly simplify counterparty credit exposures amongst the top tier banks; and
reduce the operational risks associated with traditional cash money markets i.e. depos.

This is done by once again harnessing the efficiency of the electronic futures exchange-like environment. Apart from the obvious and extensive advantages associated with removing the need to separately manage large fractions of the overall counterparty risk in these markets this part of the invention allows the efficient intervention of central banks in times of a bank failure.

Pooled Risk Deposit Product Market Structure

This part of the Enhanced Clearing House invention requires system changes that introduce 'payment versus delivery' into primary market for the first time. We are therefore moving away from leveraged products to fully funded products and indeed away from derivatives towards the underlying cash. This Pooled Deposit Product nonetheless is very similar to the previous products described though it does not utilise the full potential mapping points available in the modified exchange design (see FIG. 8) there being no distinction between the internal matching product and back office product:

The front office product is called the Traded Rate Product (TRP) that appears on trading and information systems its price is expressed in annualised percentage points according to the money market day count convention. The Traded Rate Product volume is basically the amount of money being borrowed or lent and so its notional lot size has to be the smallest unit size of the currency i.e. only $0.01, €0.01, ¥1 etc.

The internal matching product is called the Forward Value Product (FVP) and remixes the price and volume information of the Traded Rate Product into the most appropriate form for use of existing exchange implied book matching technology. The Forward Value Product price is the same as the discount factor associated with the Traded Rate Product price and term expressed to high accuracy. The Forward Value Product volume is basically the amount of money being repaid at the forward date given the Traded Rate Product price, term and volume. Thus the notional lot size must also be the smallest unit size of the currency i.e. only $0.01, €0.01, ¥1 etc.

All expiries going out to two years will be listed for back office purposes.

Traded Rate Product, Forward Value Product and Associated Mappings

The mappings that are part of the Pooled Deposit Product link the front office Traded Rate Product with the internal matching and back office Forward Value Product as already described in general terms above. We now turn to specifics and describe these with reference to FIG. 8 where each mapping exists between the boundary of the sub-products at points indicated by circles numbered 1-5. However in this case circle 3 can be ignored as no mapping takes place there for the Pooled Deposit Product invention.

Mapping 1—Inbound

Mapping 1 occurs at the numbered circle point 1 in FIG. 8.
The top half of FIG. 21 shows the details of the one to one inbound mapping that converts a dealer's front office Traded Rate Product Orders (see 2100 of FIG. 21) into an Forward Value Product Order (see 2102 of FIG. 21) for internal matching.

Traded Rate Product orders (TROs) are mapped onto outright Forward Value Product order (FVOs) for internal matching as follows (see 2102 of FIG. 21):
FVO Lot volume=TRO Lot volume*(100%+a*TRO Price %)
IF TRO=Buy THEN FVO=Sell, ELSE
IF TRO=Sell THEN FVO=Buy
FVO Price=100%/(100%+a*TRO Price %)

Figure 21:
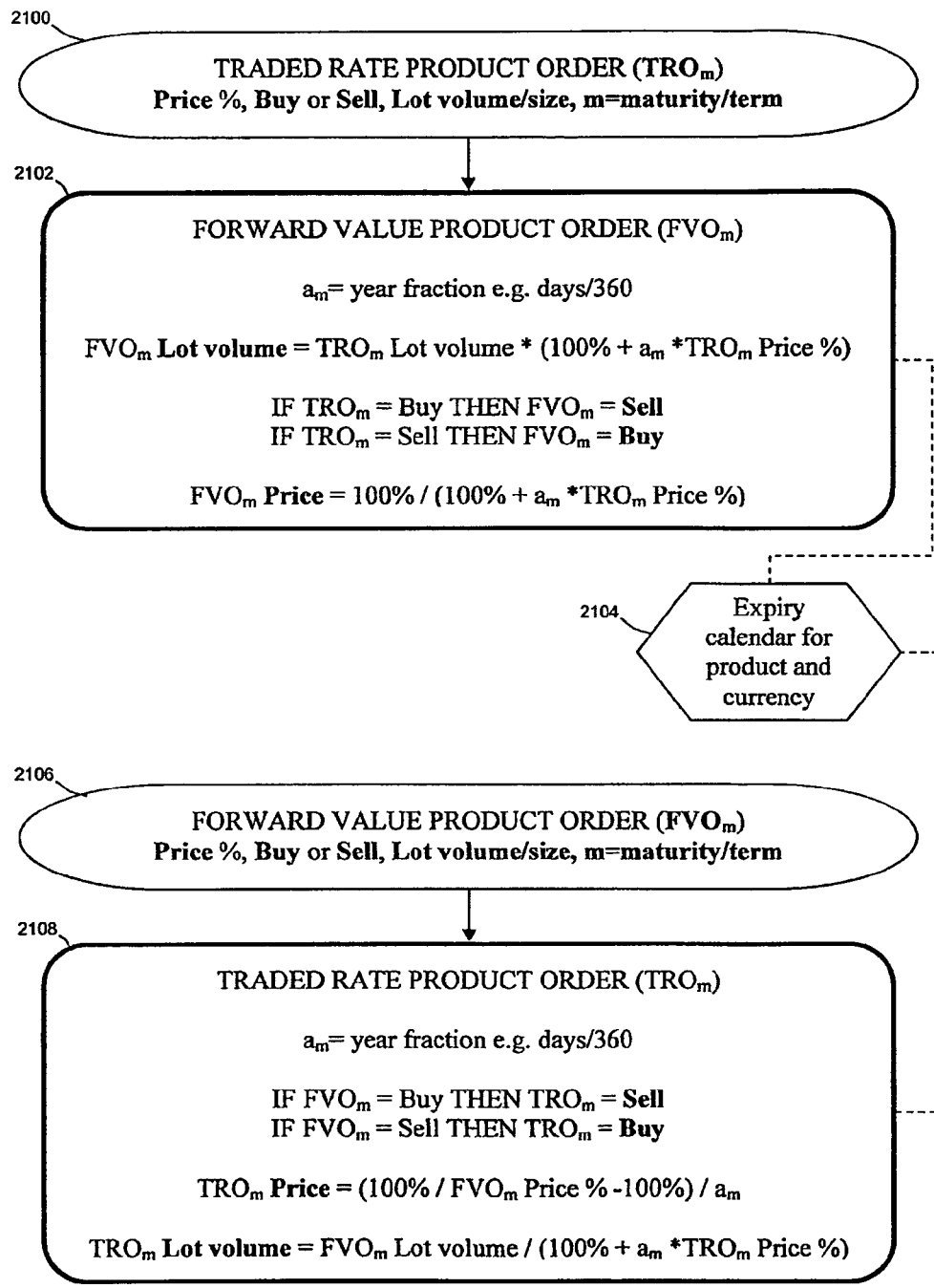
FIG. 21 shows the Exchange Traded Pooled Deposit Market Invention flow diagram for mapping and reverse mapping.

The mapping has to be parameterised by the expiry dates of the products and the trade date (see 2104 of FIG. 21). The accrual factor, a, is simply the fraction of a year that the number of days between the spot date (T+x) and the expiry date represent (x is usually 2 days). The accrual factor calculation method will vary with currency consistent with the conventional quotation method in the existing markets. Thus for a $ or € product for example the a's would be defined in day fractions of an Actual/360 day count basis.

Mapping 1—Outbound Orderbook and Fill Reporting

Mapping 1 occurs at the numbered circle point 1 in FIG. 8.
The bottom half of FIG. 21 shows the details of the one to one outbound mapping converts the Forward Value Product Order or Fill (see 2106 of FIG. 21) as used during internal matching back to the Traded Rate Product (see 2108 of FIG. 21) in the natural reverse mapping. mapping:
IF FVO=Buy THEN TRO=Sell, ELSE
IF FVO=Sell THEN TRO=Buy
TRO Price=(100%/FVO Price %−100%)/a
TRO Lot volume=FVO Lot volume/(100%+a*TRO Price %)

Where again the mapping has to be parameterised by the expiry dates of the products and the trade date (see 2104 of FIG. 21), with 'a' being the relevant accrual factor. It may be simpler computationally to simply store the front office product details with the Forward Value Product orderbook or fill as used for internal matching rather than calculate the reverse mapping.

Mapping 2

Mapping 2 occurs at the numbered circle point 2 in FIG. 8.
This is identical to the first outbound mapping at numbered circle point 1 in FIG. 8 but for quote vendor screens.

Mapping 4

Mapping 4 occurs at the numbered circle point 4 in FIG. 8.
This is identical to the inbound mapping at numbered circle point 1 in FIG. 8. It is used to convert wholesale trades agreed over the telephone into the Forward Value Product for back office use directly.

Mapping 5

Mapping 5 occurs at the numbered circle point 5 in FIG. 8.

This is the conversion of the front office Traded Rate Product settlement prices as set by the market supervisor into the actual back office Forward Value Product daily reference prices needed for mark to market if required. No variation margin nor initial margin calls are however applied to the Forward Value Product.

The Traded Rate Product settlement prices do not in principle need to respect the Traded Rate Product tick and may be calculated from some objective averaging function of trading conditions just prior to the daily settlement time.

The first step is to use interpolation to determine Traded Rate Product settlements in time periods for which an express rate does not exist i.e. at off-the-run points. Exponential interpolation, cubic spline interpolation, exponential spline interpolation, or any other desired type of interpolation may be used. The result is that a Traded Rate Product settlement price, $I_i$, is available for every possible expiry date i.

In the final step we calculate zero coupon discount factors, $d_i$, which are used as the actual daily reference prices for the Forward Value Product, $FVP_i$. The discount factors are calculated from Traded Rate Product settlement prices, $I_i$, for the period between the spot date and the relevant expiry date. The following formula is used:

$$FVP_i = d_i = \frac{1}{1 + a_i I_i}$$

where the $a_i$ are the accrual factor for the relevant period.

Initial Payment Versus Delivery, Forward Value Product Expiry Payments, Credit Pooling and a Potential Role for Central Banks Whenever a Traded Rate Product trades it results in a 'immediate' delivery from TRP shorts to TRP longs of cash currency equivalent to the Traded Rate Product lot size traded. In this case immediate means spot dated except for overnight and tom-next trades etc. Likewise when a Forward Value Product position expires it results in a delivery from FVP shorts to FVP longs of cash currency equivalent to the Forward Value Product position size held.

Now this Pooled Deposit Product market will have rules only allowing top quality banks of highest creditworthiness to participate. For each exchange member all payments due would be made net to the clearing house. Should a default occur and a cash currency payment not be made available by an exchange member to the clearing house the shortfall in funds to pay-out to other members would be distributed pro rata after netting. This is the essence of credit pooling and any trade in this Pooled Deposit Product market would therefore carry the same credit rating.

If the market's rules allow a short grace period after a default then the defaulting member might be able to make good the shortfall of funds plus interest. However after a true default the culpable member would be expelled and the clearing house would trade out of their remaining Forward Value Product position as quickly and efficiently as possible. Again any loss incurred in unwinding or transferring positions would be distributed among the other members according to principles established at the time of the market's founding.

One variant of this invention would reintroduce the concept of initial margin to cover borrowing (i.e. short Forward Value Product) positions. This would then be used as a cushion against default. There is an interesting analogy with reserve requirements here. One advantage the Pooled Deposit Product market approach is that it allows the central bank to efficiently monitor the market at normal times and intervene quickly at times of a member bank failure. Thus for example as a defaulting bank is expelled from the system instead of the clearing house unwinding or transferring positions to other normal members it could in principle transfer the entire defaulting bank's position to the central bank.

The Money Market Convention and Implied Pricing

Pooled Deposit Product invention uses the money market convention that has already been described in the "Background to the invention" section. Thus each trading day a restricted subset of on-the-run points will be made available for trading on the matching engine even though the full set will remain available for trading via OTC-style wholesale trading facilities. This will require:—

- daily listing and delisting of product for matching engine trading; and
- daily adjustments to block trade thresholds for listed and delisted product.

The latter point is required so that traders can if they wish trade where no matching engine listing exists i.e. the block trade threshold must be zero for off-the-run points.

Ratio calendar spreads constructed so that there is zero immediate delivery of funds are basically the same as deliverable forward trades. No doubt an implied orderbook of these forwards could be constructed from the Forward Value Product internal matching spot market orderbook. These would then compete with FRAs to some considerable extent, at least for Pooled Deposit Product market members.

Introduction to the Enhanced Give Up Invention

Description and Novelty of this Part of the Invention

The thrust of all the inventions presented so far have been to broaden the role of the traditional futures and options exchange trading and clearing venue in order to streamline the operations of the financial industry. The first part of the invention sought to replace ISDA's coordinating role with a truly central market in the main derivative products traded by the market. The second part concerned supporting innovations in the clearing house itself in order to achieve a more efficient global coverage and greater accuracy in the product margining and settlement. The third part of the invention concerned overhauling and replacing the centuries old architecture of the interbank deposit market.

To complete the picture we now look at incorporating genuine securities within the traditional futures and options exchange trading and clearing venue in order to complete this central provider of operational services across the industry we envisage. The extent to which some of these innovations will be attractive to the market remains to be seen but the advantages of having a single coherent system linking derivatives, structured products, traditional securities and interbank lending must surely be obvious from an operational and regulatory efficiency point of view.

The Details of the Clearing House Securities Part of the Invention

Overview

A modern futures and options exchange is a highly efficient primary market in a certain subset of derivatives contracts.

Because of the central counterparty services created by the exchange's clearing house these derivatives contracts behave almost like securities. However during a give up there is genuine transfer of title and if payment versus delivery methodology was introduced into this process a secondary market in 'Clearing House Securities' could be created. A genuine secondary market would of course require a new trading platform to be linked into this modified give up process of a normal futures clearing house. The resulting central securities marketplace will be highly operationally efficient as it will already be deeply linked to the derivatives markets. For example this Clearing House Securities invention allows for the securitisation of loans and hence their efficient delivery into the Adapted For Exchange New Credit Derivatives Recovery Auction or Rate Product. Other applications include the entire range of existing securities and in particular a rival issuance venue for securities normally issued by special purpose vehicles such as credit-linked notes and synthetic CDOs.

Advantages

The advantages of further operational consolidation are hopefully self evident and include:
  Cost savings; and
  More efficient risk management; and
  Greater ease of market monitoring for regulators, especially of SPVs.
The above is not an exhaustive list. However the extent to which this part of the invention is attractive to the market remains to be seen.

Clearing House Securities

Issuance and Payment Versus Delivery for Give Ups

Figure 22:
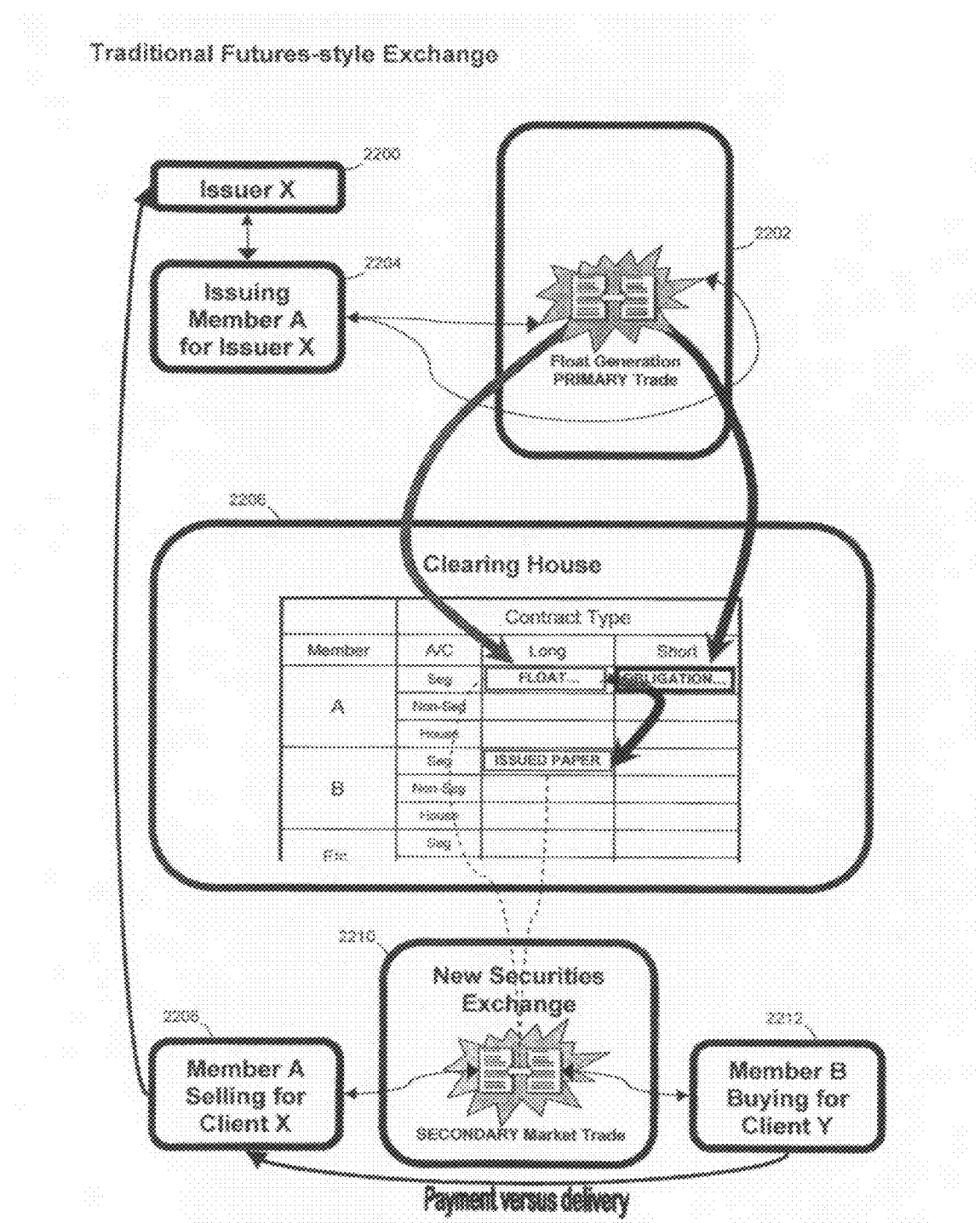
FIG. 22 shows a schematic Representation of the trading of Clearing House Securities.

FIG. 22 shows this part of the invention schematically. In the preferred embodiment of the invention only the issuing member (see 2202 of FIG. 22) acting on behalf of the issuing client (see 2200 of FIG. 22) has access to the generation market of a Clearing House Security. This securities generation market is just what was the normal market of the futures and options exchange (see 2202 of FIG. 22). The open interest (see 2206 of FIG. 22) in the Clearing House Security is created by one or more cross-transactions in the primary market (see 2202 of FIG. 22).

Having been created on securities generation market a primary issuance (or float) of the Clearing House Security occurs when the first payment versus delivery 'give ups' occur via the new securities trading engine (see 2210 of FIG. 22) between the member acting for the issuer in this forum (see 2208 of FIG. 22) and other members acting for their clients (see 2212 of FIG. 22). Technically the new securities secondary trading exchange will look very similar to the existing tradition futures market (see FIG. 4) with access via exchange gateways and straight through processing linked to the clearing house.

All trades in this market are only really modified give ups and only concern long positions with the orphaned short position obligations being passed by the issuing member directly to a specially created account (or indeed membership) at the clearing house. The issuing member (see 2202 of FIG. 22) passes the cash created by the primary issuance to the ultimate issuer (see 2200 of FIG. 22) for which it is acting as agent. The ultimate issuer retains the responsibility for servicing the payments (e.g. coupons or dividends) of their Clearing House Security and must make these payments directly to the clearing house according to the legal terms underlying the security.

In the secondary market payment versus delivery 'give ups' also occur via the securities trading marketplace created as part of the Clearing House Securities invention.

Securitisation and Stripping of Loans

Some market participants may not be able to take delivery of loans at the expiry of an Adapted For Exchange New Credit Derivatives Recovery Auction or Rate Product. This can be solved as already stated by restricting participation in these products. An alternative is for the clearing house to act as a pass through intermediary:
  The receiving long makes the cash payment to the clearing house but receives not the loan but a series of cashflow clearing house securities at zero price and of notional size and payment dates corresponding to the loan repayment dates;
  The short chooses to deliver the loan and the clearing house takes delivery itself in return for passing through the cash payment;
  The cashflow clearing house securities remain marked to market at zero price until clearing house receives a loan repayment when it is obligated to take appropriate action i.e. if the payment is made in full mark to market the relevant cashflow clearing house securities to 100% and fund the variation margin call from the obligation (short leg) to the float (long leg) with the cash received from the loan repayment.
An interesting feature is that a secondary market can occur the moment the cashflow clearing house securities have been created allowing for a fully efficient secondary market in the entire loan or indeed in stripped out components of it.

The Details of the Clearing House Special Purpose Vehicles Proxy Invention

Overview

The example of securities loans can be generalised to include other assets held at the clearing house. In particular this could include the entire range of existing securities and hence generating a rival issuance venue for products normally issued by special purpose vehicles such as credit-linked notes and synthetic CDOs.

Special Purpose Vehicles, Credit-Linked Notes and Synthetic CDOs

Collateralised issuance can simply be performed by delivering the appropriate collateral to the clearing house which in return issues the float at zero price in order that it may be resold as a primary issuance. This collateral could include cash; or treasury bills, notes or bonds; or even derivatives and clearing house securities contracts from the same exchange. In this way the clearing house can act as a special purpose vehicle and generate credit-linked notes, synthetic CDOs, etc., etc. As a trusted pillar of the financial system the exchange and its clearing house could also perform those supervisory activities normally undertaken by the trustees of SPVs.

I claim:
1. A method of accessing exact Over-the-Counter (OTC) International Swaps and Derivatives Association (ISDA) overnight indexed swap exposures within an electronic futures exchange environment comprising at least one exchange computer and associated computer-readable memory accessible by that exchange computer, the method comprising:

provided via the at least one exchange computer a listed for trading derivative product which gives overnight indexed swap exposure;

executing a trade of the listed for trading product pursuant to a user command received via a user interface at the at least one exchange computer;

creating on the at least one exchange computer positions based on the executed trade in two different types of post trade for clearing products, wherein each distinct position so created consists of a Fixed Rate Overnight Indexed Swap (OIS) Product paired and offset with Overnight Indexed Products of the same expiry, with each position created at zero price and in volumes based on the executed swap rate quotation product trade as determined by an algorithm comprising a set of parameterized mapping formulae;

after a specified number of business days associated with the definition of spot in the relevant money market, using a standard overnight index rate benchmark to augment via a parameterized formula the position sizes of the Overnight Indexed Products with additional contract positions created at zero price via the at least one exchange computer to have an effect of compounding;

providing end of day valuation and risk management through variation and initial margin calls of a central counterparty, wherein daily settlement prices for both Fixed Rate OIS and Overnight Indexed Products for clearing are set based on a parameterized algorithm using as its input the set of daily mark to market reference prices from the listed for trading swap rate quotation product market; and at expiry cash settling both the overnight indexed and fixed contracts.

2. The method according to claim 1, wherein the executed trade in the listed for trading swap rate quotation product that is executed by the at least one exchange computer is passed as a give up marker through to the exchange's post trade management system and ultimately the clearing house, wherein an executed trade marker that is given up by one member to another will act as a reference in the exchange's post trade management system allowing the paired Fixed Rate OIS and Overnight Indexed Products based on the marker trade to be transferred along with it as a group, thereby guaranteeing no accidental large variation margin calls associated with a splitting of the paired fixed and overnight indexed products into different clearing accounts prior to their first daily settlement.

3. The method according to claim 1, wherein the algorithm used by the at least one exchange computer to turn the executed swap rate quotation product trade into the appropriate Fixed Rate OIS and Overnight Indexed Product positions for clearing comprises:

for the overnight indexed leg:—
OIP Lot volume=TOR Lot volume;
OIP Price=0;
IF TOR=Buy THEN OIP=Sell, ELSE; and
IF TOR=Sell THEN OIP=Buy;
where,
OIP=The relevant Overnight Indexed Product;
TOR=The executed swap rate quotation product trade; and for the fixed leg:—
FRP Lot volume=TOR Lot volume*(6%+a*TOR Price %)
FRP Price=0
IF TOR=Buy THEN FRP=Buy, ELSE
IF TOR=Sell THEN FRP=Sell
where,
FRP=The relevant Fixed Rate OIS Product;
TOR=The executed swap rate quotation product trade;
a=The money market accrual factor or year fraction that the number of days between the spot date and the expiry date represent;

wherein the mappings are parameterised by the expiry calendar for the product in order to calculate the accrual factors, a.

4. The method according to claim 1, wherein the parameterized formula used by the at least one exchange computer comprises:

for compounding overnight indexed positions:—
All i=1 to m, where m is an integer value greater than 1,
Addition $OIP_1$ volume=Prior Old $OIP_i$ position size*$A_{O/N}$*X %
All i=1 to m,
Addition $OIP_i$ price=0
where,
$OIP_i$=The $i^{th}$ Overnight Indexed Product;
X=The daily overnight index rate e.g. Fed Funds rate; and
$A_{O/N}$=The accrual factor applied to the overnight index rate.

5. The method according to claim 1, wherein the algorithm, used by the at least one exchange computer to turn the daily mark to market reference prices in the listed for trading swap rate quotation products into the appropriate daily settlement prices for both types of contracts, comprises:

1. using interpolation to determine any missing daily mark to market reference prices in the traded swap rate quotation product that will be required, such that a mark to market swap rate quotation reference price, $O_i$, is available for every Fixed Rate OIS Product and Overnight Indexed Product expiry date i; and 2. calculating the daily settlement prices needed for variation margin calls according to the following:
$O1P_i$=is undiscounted $$OIP_i = 100\%$$
$$FRP_i = \frac{1}{1 + a_i O_i}$$

where,
$OIP_i$=The daily settlement price for the $i^{th}$ Overnight Indexed Product;
$a_i$=The accrual factor for the relevant period;
$O_i$=The daily mark to market reference price for the relevant period; and
$FRP_i$=The daily settlement price for the $i^{th}$ Fixed Rate OIS Product.

* * * * *